(12) United States Patent
Lawande et al.

(10) Patent No.: US 6,934,740 B1
(45) Date of Patent: Aug. 23, 2005

(54) METHOD AND APPARATUS FOR SHARING COMMON DATA OBJECTS AMONG MULTIPLE APPLICATIONS IN A CLIENT DEVICE

(75) Inventors: Sachin Lawande, Schaumburg, IL (US); William Zielinski, Wauconda, IL (US); Gordon Molek, Vernon Hills, IL (US); Ray Winninger, South Holland, IL (US)

(73) Assignee: 3Com Corporation, Marlborough, MA (US)

( * ) Notice: Subject to any disclaimer, the term of this patent is extended or adjusted under 35 U.S.C. 154(b) by 823 days.

(21) Appl. No.: 09/664,667

(22) Filed: Sep. 19, 2000

(51) Int. Cl.$^7$ .............................................. G06F 13/00
(52) U.S. Cl. ...................... 709/213; 709/219; 719/329; 707/104
(58) Field of Search ................................ 709/203, 213, 709/217, 219, 201, 202, 250; 719/328, 329, 318, 319; 707/104, 102, 103

(56) References Cited

U.S. PATENT DOCUMENTS

| | | | |
|---|---|---|---|
| 4,432,057 A | 2/1984 | Daniell et al. | ............... 364/300 |
| 4,866,611 A | 9/1989 | Cree et al. | ................... 364/300 |
| 5,142,619 A | 8/1992 | Webster, III | ................ 395/157 |

(Continued)

OTHER PUBLICATIONS

Borenstein et al, "*MIME (Multipurpose Internet Mail Extensions): Mechanisms for Specifying and Describing the Format of Internet Message Bodies*", Network Working Group, RFC 1341, Jun. 1992, pp. i–77.

(Continued)

*Primary Examiner*—Viet Vu
(74) *Attorney, Agent, or Firm*—McDonnell Boehnen Hulbert & Berghoff LLP

(57) ABSTRACT

Disclosed is software architecture and method for sharing data objects among multiple applications in a client device. The architecture includes a server process in the client device for processing a template, such as a SHTML template for the Extended Markup Language (XML), based on a template identifier value received from a user application. Each of multiple applications has a template. Each template identifies a series of objects identified by tag values, such as XML entities, that are to be incorporated into a display page. A database of objects, such as a database of XML entities identified by tag values, is maintained that contains data objects for the applications. An update process periodically establishes a communication link with a remote server and requests download of a data document containing content data corresponding to at least a portion of several of the templates. The data document is parsed into the database of objects based on the structure of the data document, which generally conforms to a data type definition. When the server process processes different templates that reference the same data object, it will retrieve the data object from the database. Each template may then be rendered into a page of output data for display to a user. The architecture and method according to the present invention thus permit data objects to be shared by multiple applications and to be automatically updated. Each time a data object is updated, the data will be current for each user application that references the data object.

8 Claims, 26 Drawing Sheets

U.S. PATENT DOCUMENTS

| | | | |
|---|---|---|---|
| 5,251,291 A | 10/1993 | Malcolm | 395/146 |
| 5,261,045 A | 11/1993 | Scully et al. | 395/161 |
| 5,261,094 A | 11/1993 | Everson et al. | 395/600 |
| 5,392,390 A | 2/1995 | Crozier | 395/161 |
| 5,434,994 A | 7/1995 | Shaheen et al. | 395/500 |
| 5,475,833 A | 12/1995 | Dauerer et al. | 395/600 |
| 5,727,202 A | 3/1998 | Kucala | 395/610 |
| 5,737,739 A | 4/1998 | Shirley et al. | 707/512 |
| 5,787,441 A | 7/1998 | Beckhardt | 707/201 |
| 5,832,489 A | 11/1998 | Kucala | 707/19 |
| 5,884,323 A | 3/1999 | Hawkins et al. | 707/201 |
| 5,884,324 A | 3/1999 | Cheng et al. | 707/201 |
| 5,973,696 A | 10/1999 | Agranat et al. | 345/357 |
| 5,983,228 A | 11/1999 | Kobayashi et al. | 707/10 |
| 6,000,000 A | 12/1999 | Hawkins et al. | 707/201 |
| 6,006,242 A | 12/1999 | Poole et al. | 707/531 |
| 6,006,274 A | 12/1999 | Hawkins et al. | 709/248 |
| 6,047,284 A * | 4/2000 | Owens et al. | 707/4 |
| 6,453,329 B1 * | 9/2002 | Dodgen | 715/516 |
| 6,546,554 B1 * | 4/2003 | Schmidt et al. | 717/176 |
| 6,565,609 B1 * | 5/2003 | Sorge et al. | 715/503 |
| 6,604,100 B1 * | 8/2003 | Fernandez et al. | 707/3 |
| 6,643,652 B2 * | 11/2003 | Helgeson et al. | 707/10 |
| 6,751,778 B1 * | 6/2004 | Broman et al. | 715/517 |
| 6,785,891 B1 * | 8/2004 | Allen et al. | 719/313 |

OTHER PUBLICATIONS

T. Berners–Lee, "*Universal Resource Identifiers in WWW—A Unifying Syntax for the Expression of Names and Addresses of Objects on the Network as used in the World–Wide Web*", Network Working Group, RFC 1630, Jun. 1994, pp. 1–28.

Berners–Lee et al, "*Hypertext Transfer Protocol—HTTP/1.0*", Network Working Group, RFC 1945, May 1996, pp. 1–60.

Fielding et al, "*Hypertext Transfer Protocol—HTTP/1.1*", Network Working Group, RFC 2068, Jan. 1997, pp. 1–162.

Douglas C. McArthur, *World Wide Web & HTML'*, Dr. Dobb's Journal, Dec. 1994, pp. 18–26 and 86.

Berners–Lee et al., "*The World–Wide Web*", Communications of the ACM, vol. 37, No. 8, Aug. 1994, pp. 76–82.

IETF, W3C, "*Information technology–Document description and processing languages–HyperText Markup Language (HTML)*", ISO/IEC 15445:2000/DCOR 1:2001(E), Dec. 16, 2000, pp. 1–19.

Bray et al., "*Extensible Markup Language (XML) 1.0*", W3C Recommendation, REC–xml–19980210, Feb. 10, 1998, pp. 1–28.

T–Berners–Lee, "*Hypertext Markup Language—2.0*", Network Working Group, RFC 1866, Nov. 1995, pp. 1–77.

* cited by examiner

METHOD AND APPARATUS FOR SHARING COMMON DATA OBJECTS AMONG MULTIPLE APPLICATIONS IN A CLIENT DEVICE

CROSS REFERENCES TO RELATED APPLICATIONS

The present application is related to co-pending and commonly assigned U.S. patent application Ser. No. 09/664,613, for METHOD AND APPARATUS FOR AUTOMATICALLY UPDATING INFORMATION IN A CLIENT DEVICE, filed on even date herewith, herein incorporated by reference for all purposes. The present application is also related to co-pending and commonly assigned U.S. patent application Ser. No. 09/665,635, for METHOD AND SOFTWARE ARCHITECTURE FOR ACCESSING AND DISPLAYING DATA IN A CLIENT DEVICE, filed on even date herewith, herein incorporated by reference for all purposes.

FIELD OF INVENTION

The present invention relates to software architecture and, more particularly, to a software architecture for data use in multiple user applications in a client device.

BACKGROUND OF THE INVENTION

The present invention is concerned with application programs running on a client device that display information obtained from a wide area network to a user through a user interface.

Users of computer systems use their computers to perform a variety of tasks, such as word processing, spread sheets, games, and email. Each of these tasks typically involves activating a user application program that interacts with the user to perform the task. An application is a software program that carries out a task, i.e. a database manager, a spreadsheet, a communications package, a graphics program or a word processor. User input is received from the user via user input devices, such as a mouse and keyboard, and information is output to the user by outputting information to the user via a display, such as a monitor.

Each user application typically has its own user interface. In other words, each application accesses data that is typically specific to the application, processes the data, and assembles and formats textual and graphical data for display to the user. The data for each application is typically formatted and structured specifically for the application, so, unless multiple applications are designed to share data, it is often difficult for one application program to access and utilize the data from another application program. Furthermore, the task of assembling and formatting data for output to the user can be complex. Each user application typically uses the interface drivers provided by the operating system of the computer system to output information to the display of the computer system. However, the user interface software for each program is often substantially custom for that program and can represent a significant amount of the code for each application.

Another type of user application is a browser application, which provides users of computer systems access to a vast amount of information through their network connections to the Internet. The Internet is a wide area network that interconnects computer networks around the world and provides a user client device connected to the Internet with access to a broad array of resources connected to the Internet, i.e. access to servers that are also connected to the Internet. In order for information to be accessible to a wide number of client devices and servers, a body of software, a set of protocols and a set of defined conventions are generally needed that permit intercommunication. The World Wide Web is one example of such a body of software, set of protocols and set of defined conventions.

The World-Wide-Web and similar private architectures, such as internal corporate LANs, provide a "web" of interconnected document entities. On the World-Wide-Web, these document entities are located on various sites on the global Internet. The World-Wide-Web is also described in "The World-Wide Web," by T. Berners-Lee, R. Cailliau, A. Luotonen, H. F. Nielsen, and A. Secret, Communications of the ACM, 37 (8), pp. 76–82, August 1994, and in "World Wide Web: The Information Universe," by Berners-Lee, T., et al., in Electronic Networking: Research, Applications and Policy, Vol. 1, No. 2, Meckler, Westport, Conn., Spring 1992. On the Internet, the World-Wide-Web is a collection of documents (i.e., content), client software (i.e., browsers) and server software (i.e., servers) which cooperate to present and receive information from users. The World-Wide-Web is also used to connect users through the content to a variety of databases and services from which information may be obtained.

The World-Wide-Web is based on a conventional client-server model. Content is held in documents accessible to servers. Clients can request, through an interconnect system, documents which are then served to the clients through the interconnect system. The client software is responsible for interpreting the contents of the document served, if necessary.

Among the types of document entities in a "web" are documents and scripts. Documents in the World-Wide-Web may contain text, images, video, sound or other information sought to be presented, in undetermined formats known to browsers or extensions used with browsers. The presentation obtained or other actions performed when a browser requests a document from a server is usually determined by text contained in a document which is written in Hypertext Markup Language (HTML). HTML is described in HyperText Markup Language Specification—2.0, by T. Berners-Lee and D. Connolly, RFC 1866, proposed standard, November 1995, and in "World Wide Web & HTML," by Douglas C. McArthur, in Dr. Dobbs Journal, December 1994, pp. 18–20, 22, 24, 26 and 86. HTML documents stored as such are generally static, that is, the contents do not change over time except when the document is manually modified. Scripts are programs that can generate HTML documents when executed.

HTML is one of a family of computer languages referred to as mark-up languages. Mark-up languages are computer languages which describe how to display, print, etc., a text document in a device-independent way. The description takes the form of textual tags indicating a format to be applied or other action to be taken relative to document text. The tags are usually unique character strings having defined meanings in the mark-up language. Tags are described in greater detail, below.

HTML is used in the World-Wide-Web because it is designed for writing hypertext documents. The formal definition is that HTML documents are Standard Generalized Markup Language (SGML) documents that conform to a particular Document Type Definition (DTD). An HTML document includes a hierarchical set of markup elements, where most elements have start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

A site, i.e. an organization having a computer connected to a network, that wishes to make documents available to network users is called a "Web site" and must run a "Web server" program to provide access to the documents. A Web server program is a computer program that allows a computer on the network to make documents available to the rest of the World-Wide-Web or a private web. The documents are often hypertext documents in the HTML language, but may be other types of document entities as well, as well as images, audio and video information.

The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft-.RTM. MS-DOS operating system and the Microsoft.RTM. Windows.TM. operating environment.

A user typically accesses the resources of the World Wide Web through the use of a browser application program. The browser program allows the user to retrieve and display documents from Web servers. Some of the popular Web browser programs are: the Navigator browser from NetScape Communications Corp., of Mountain View, Calif.; the Mosaic browser from the National Center for Supercomputing Applications (NCSA); the WinWeb browser, from Microelectronics and Computer Technology Corp. of Austin, Tex.; and the Internet Explorer, from Microsoft Corporation of Redmond, Wash. Browsers exist for many platforms, including personal computers with the Intel Pentium processor running the Microsoft.RTM. MS-DOS operating system and the Microsoft.RTM. Windows.TM. environment, and Apple Macintosh personal computers.

A browser typically executes on a client device connected to Internet. The Web server and the Web browser communicate using the Hypertext Transfer Protocol (HTTP) message protocol and the underlying transmission control protocol/internet protocol (TCP/IP) data transport protocol of the Internet. HTTP is described in Hypertext Transfer Protocol—HTTP/1.0, by T. Berners-Lee, R. T. Fielding, H. Frystyk Nielsen, Internet Draft Document, Oct. 14, 1995, and is currently in the standardization process. At this writing, the latest version is found in RFC 2068 which is a draft definition of HTTP/1.1. In HTTP, the Web browser establishes a connection to a Web server and sends an HTTP request message to the server.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) are a standardized way for describing the content of messages that are passed over a network. HTTP request and response messages use MIME header lines to indicate the format of the message. MIME is described in more detail in MIME (Multipurpose Internet Mail Extensions): Mechanisms for Specifying and Describing the Format of Internet Message Bodies, Internet RFC 1341, June 1992.

The user enters a resource identifier value that identifies a desired web resource through a command input line of the user interface of the browser. The resource identifier value is typically a Uniform Resource Identifier (URI) or a Uniform Resource Locator (URL) that is resolved into an address for a server device having the desired object. See Request for Comment (RFC) 1630 available through the Internet Engineering Task Force at URL www.ietf.org.

When a URL value has been input to the browser, the browser transmits a command containing the URL value. The command is typically formatted according to a Hypertext Transfer Protocol (HTTP) that provides a convention for commands and replies over the web. The URL value in the command is typically resolved to an address for a server connected to the web and to a resource on the server, such as a document. See RFC 1945. The server that receives the command will typically respond with an HTTP reply message containing information. This information is typically in the form of a document that uses the Hypertext Mark-up Language (HTML).

In response to an HTTP request message, the server performs any requested action and returns an HTTP response message containing an HTML document resulting from the requested action, or an error message. The returned HTML document may simply be a file stored on the Web server, or it may be created dynamically using a script called in response to the HTTP request message. For instance, to retrieve a document, a Web browser residing in a client device sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed.

The server constructs the HTML reply message by retrieving an HTML document corresponding to the URL value. The HTML document typically includes markup data that encodes a description of the HTML document's graphical layout and logical structure and includes a set of tags that identify data entities that are to be retrieved and inserted into the HTML document as indicated by the tag. The server typically obtains the data for the HTML document by performing a Server Side Include (SSI) request for each tag value. The SSI request is sent to a database manager that may be internal to the server itself or may be connected to the server via a backend network. The database manager uses the tag value to search aid retrieve the data object corresponding to the tag value. The data object is returned to the server for incorporation into the HTML document. When the server has completed the population of the HTML document with the data entities for each tag of the HTML document, the server will transmit the HTML document in the reply to the client device.

As another example, a user may fill in a form requesting a database search, the Web browser will send an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

When the client device receives the response from the server containing the HTML document, the browser will process the document according to the HTML standard and display the resulting page to the user via the display of the user's computer system.

U.S. Pat. Nos. 5,973,696; 6,006,242; 5,983,228; and 5,737,739 provide additional examples of web architectures and applications and are herein incorporated by reference.

FIG. 1 is a functional block diagram illustrating an example of an architecture 10 involving a client device 20, e.g. a user's computer system, and a server device 60 that can communicate via a network, such as the Internet. Client device 20 includes a keyboard 24 and a mouse 26 as user input devices and a display 28 for user output. Client 20 has a communications port, such as a network interface card, through which it is connected to a local area network (LAN) 30 via communication link 22. LAN 30 is connected to a public Internet Protocol (IP) network 50, i.e. a wide area network, that provides access to a broad range of network resources including those of server 60, which is connected to public IP network 50 via communication link 62. Client device 20 is controlled by a user through a combination of command inputs via mouse 26 in concert with keyboard 24 to execute application programs in client device 20 that display output to the user via display 28.

FIG. 2 is a functional block diagram illustrating an example of another architecture 15 involving a client device 20, e.g. a user's computer system, and a server device 60 that can communicate via a network, such as the Internet. In architecture 15, client device 20 includes a communications device, such as a modem, capable of communicating through public switched telephone network (PSTN) 35 to a network access server (NAS) 40. NAS 40 is connected to IP network 50 and enables client device 20 to communicate with server 60.

FIG. 3 is a simplified functional block diagram illustrating an embodiment of an architecture 100 for a central processing unit (CPU) for client device 20. The CPU includes a processor 110 connected to a system bus 120. Processor 110 accesses several subsystems via bus 120 including a memory subsystem 130 for storage of data and code. A network interface subsystem 140 is connected to bus 120 and is used to communicate with the network via connection 22. The network interface may, for example, be a network interface card or a modem device that communicates with a network access server connected to public IP network 50.

The CPU outputs information to the user via a display interface 150 connected to bus 120 that sends video information to display monitor 28. The CPU receives user input via user interface 160 that receives user input via keyboard 24 and mouse 26 and forwards the user input to processor 110 via bus 120.

FIG. 4 is a simplified software architecture diagram illustrating an embodiment of a software architecture 200 for a typical client device 20. At the center of architecture 200 is an operating system (OS) 210 that controls access to the resources of the client device, including memory, display and communications, and activation of application programs 260 and 270. Output to display monitor 28 of client 20 is accomplished using the display driver primitives 230 provided through OS 210. User input from keyboard 24 and mouse 26 is detected by user interface drivers 240, which receive, interpret, and forward the user input signals to OS 210 for further action. Communications with the network connection 22 are handled through communications drivers 250.

A user of client device 20 selects one of user application programs 260 and 270 through a combination of user inputs. For example, the user may double click an icon displayed on monitor 28 with mouse 26 to activate user application 260. OS 210, upon receiving the user's selection, spawns a process for the selected application.

The application 260 will typically operate with a data store 262, which is a portion of memory subsystem 130 allocated to the application. For example, application 260 may be a word processor that retrieves a document from long term storage, such as a disk drive that is part of memory subsystem 130, and buffers the document in a random access memory (RAM) that is also part of the memory subsystem. The data in data store 262 is typically formatted for use only by the application. For another application to share data, it must be designed to read the data. For example, a word processor application may be configured so that it can read data from a spreadsheet application or import a graphic created by a graphics application.

As an application processes data, it also formats the data for display to the user and outputs the display data using display drivers 230. Above the display driver level, each application essentially includes its own graphical display capability. When, for example, application 260 is a word processor, it formats the ASCII codes and control characters from a document along with the menu and control bars for display via monitor 28 and outputs the formatted document to the user using display drivers 230. When, for example, application 270 is a browser application, it communicates through communication drivers 250 to send a HTTP request containing a URL over the network and receive an HTML document in response. The browser application then renders the graphics and text of the HTML document into a page and outputs the page to the display monitor 28 using display drivers 230.

The separate graphics capability required for each of the applications residing on a client device can become a significant limitation in a client device having limited resources. Likewise, the inability to efficiently share data across multiple applications can also pose a problem. Therefore, the need remains for a software architecture that efficiently uses the resources available in a client device.

SUMMARY OF THE INVENTION

In accordance with preferred embodiments of the present invention, some of the problems associated with selecting a network resource in the prior art are overcome.

An embodiment of a software architecture for a client device, according to the present invention, includes a data store for storing a predefined data structure having a first data object and a predefined first template having a first identifier value and a first field, where the first field of the first template is tagged as corresponding to the first data object of the data structure. A first application process is configured to output information to a user of the client device in a format defined by the first template, where the first application process, responsive to a user command, is configured to format and send a template population request message that includes an identifier field having the first identifier value for the first template, and is further configured to render the first template, when populated with data, for display to a user of the client device. The architecture also includes a server process within the client device, the server process being configured to receive the template population request message from an application and, responsive thereto, use the value from the template identifier value from the template population request message to retrieve a corresponding template from the data store, use the tag from the first field of the corresponding template to retrieve a value from a corresponding data object of the data structure corresponding to the tag value from the corresponding template, and return the corresponding template populated with the value from the data object to the application that sent the template population request message. In a further refinement of the architecture, the data store includes a predefined second template having a second identifier value and a first field, where the first field of the second template is tagged as corresponding to the first data object of the data structure and the architecture further includes a second application process configured to output information to the user of the client device in a format defined by the second template, where the second application process, responsive to a user command, is configured to format and send the template population request message having the second identifier value for the second template in the identifier field of the message, and is further configured to render the first template, when populated with data, for display to the user of the client device An embodiment of a method for sharing data between multiple applications in a client device, according to the present invention, calls for defining a first predetermined data type definition, creating a first data structure for storing data, where the first data structure is structured in accordance with the first data type definition, and storing a first data object from a first application in the first data structure, where the first data object of the first application is structured according to the first data type definition. The method further sets forth retrieving the first data object in a second application by accessing the first data structure according to the first: predetermined data type definition and outputting the first data object from the second application to a user of the client device.

An embodiment of a data display device, according to the present invention, includes a communication interface adapted for connection to a network of computing devices and a memory device containing a first display template corresponding to a first application and a second display template corresponding to a second application, where each of the first and second display template includes an index to a first data object, where the index is defined by a data type definition. The device also includes a microprocessor programmed to execute the first and second applications and a database manager for providing access to a database, where the microprocessor is configured to execute each of the first and second applications by retrieving the first and second display templates, respectively, and using the index to the first data object to access the database in order to retrieve a value for the first data object, where the microprocessor is further configured to execute an update routine for receiving periodic data updates to the first data object via the communication interface and storing the data updates to the first data object in the database. The device also has a display generator for generating display data from the first and second templates and the first data object data and a display device for receiving said display data and displaying images.

The foregoing and other features and advantages of the present invention will be more readily apparent from the following detailed description of an embodiment of the present invention, which proceeds with references to the accompanying drawings.

BRIEF DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

Figure 5:
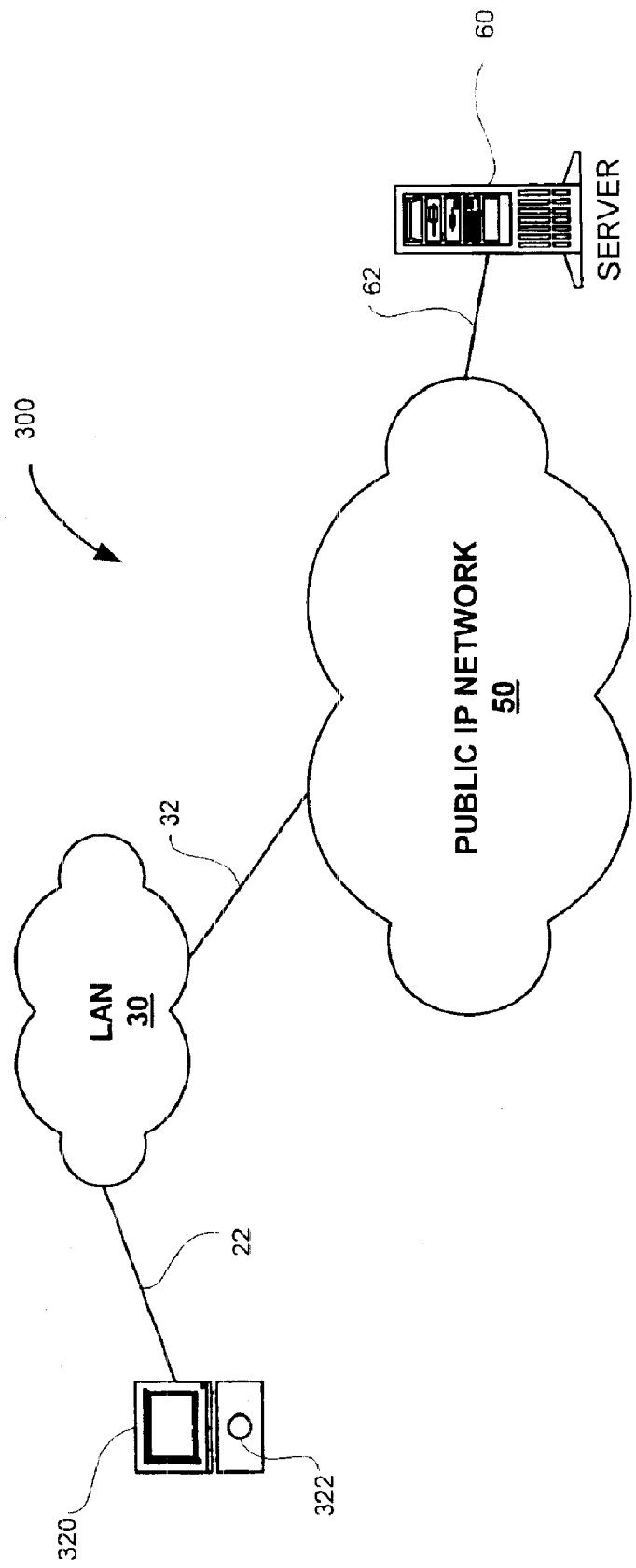
FIG. 5 is a functional block diagram illustrating an example of an architecture for communication of a client device according to the present invention with a server connected to a public IP wide area network, where the client communicates through a LAN also connected to the IP network.
Figure 6:
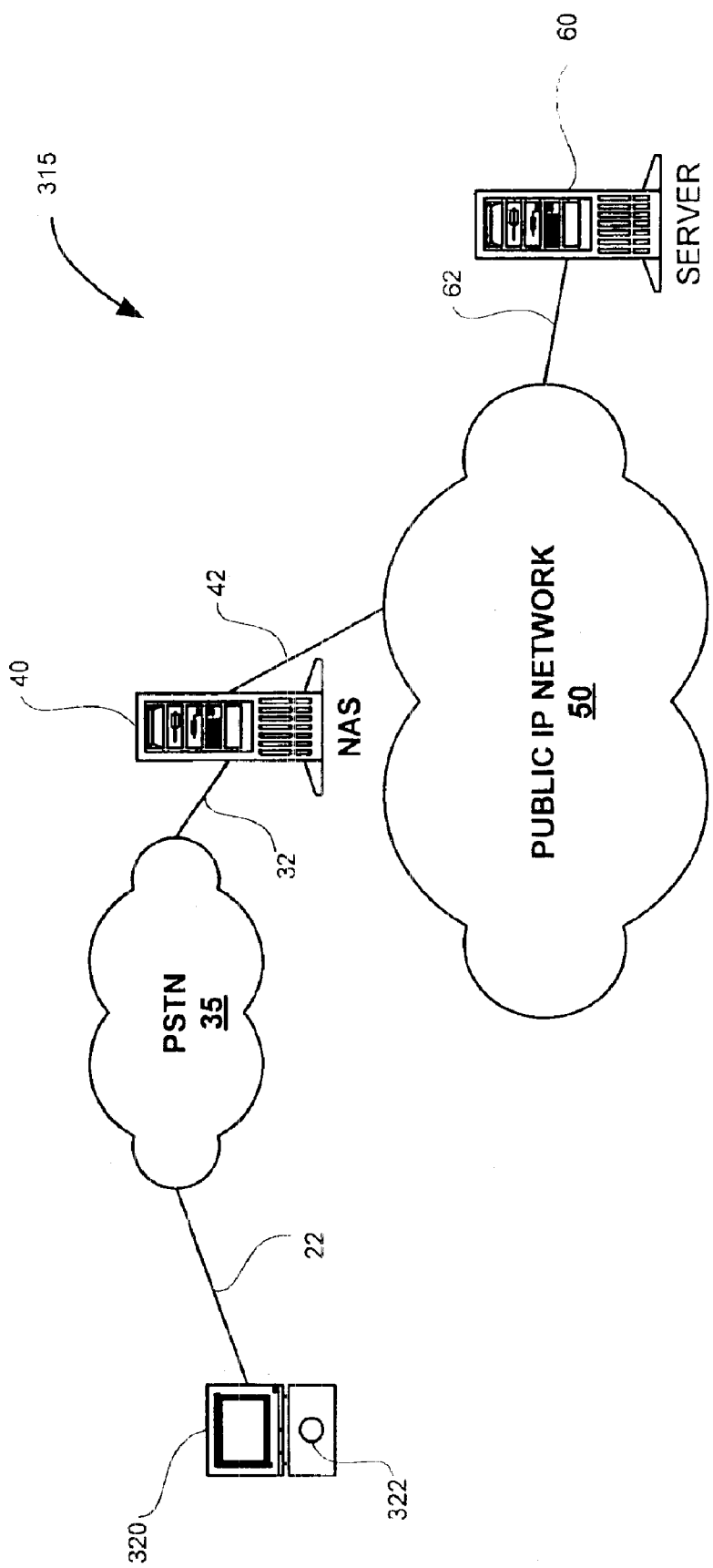
FIG. 6 is a functional block diagram illustrating another example of an architecture for communication of a client device according to the present invention with a server connected to a public IP wide area network, where the client communicates through a public switched telephone network to a network access server also connected to the IP network.

The present invention is directed toward a software architecture for a client device and method for accessing and displaying data FIG. 5 is a functional block diagram illustrating an embodiment of an architecture 300 that includes an embodiment of a client device 320 according to the present invention. The client device 320 includes a communications port, such as a network interface card, that is connected to LAN 30 via communication connection 22. Client device 320 includes a user input knob 322 for selecting network resources accessible through public IP network 50, such as those residing on server 60. FIG. 6 is a functional block diagram illustrating another embodiment of an architecture 315 that includes an embodiment of the client device 320 according to the present invention. In architecture 315, client 320 includes a communication port, such as a modem, for establishing a communication session with network access server 40 connected to IP network 50 that enables the client device to communicate with a server on the IP network, such as server 60.

Figure 7:
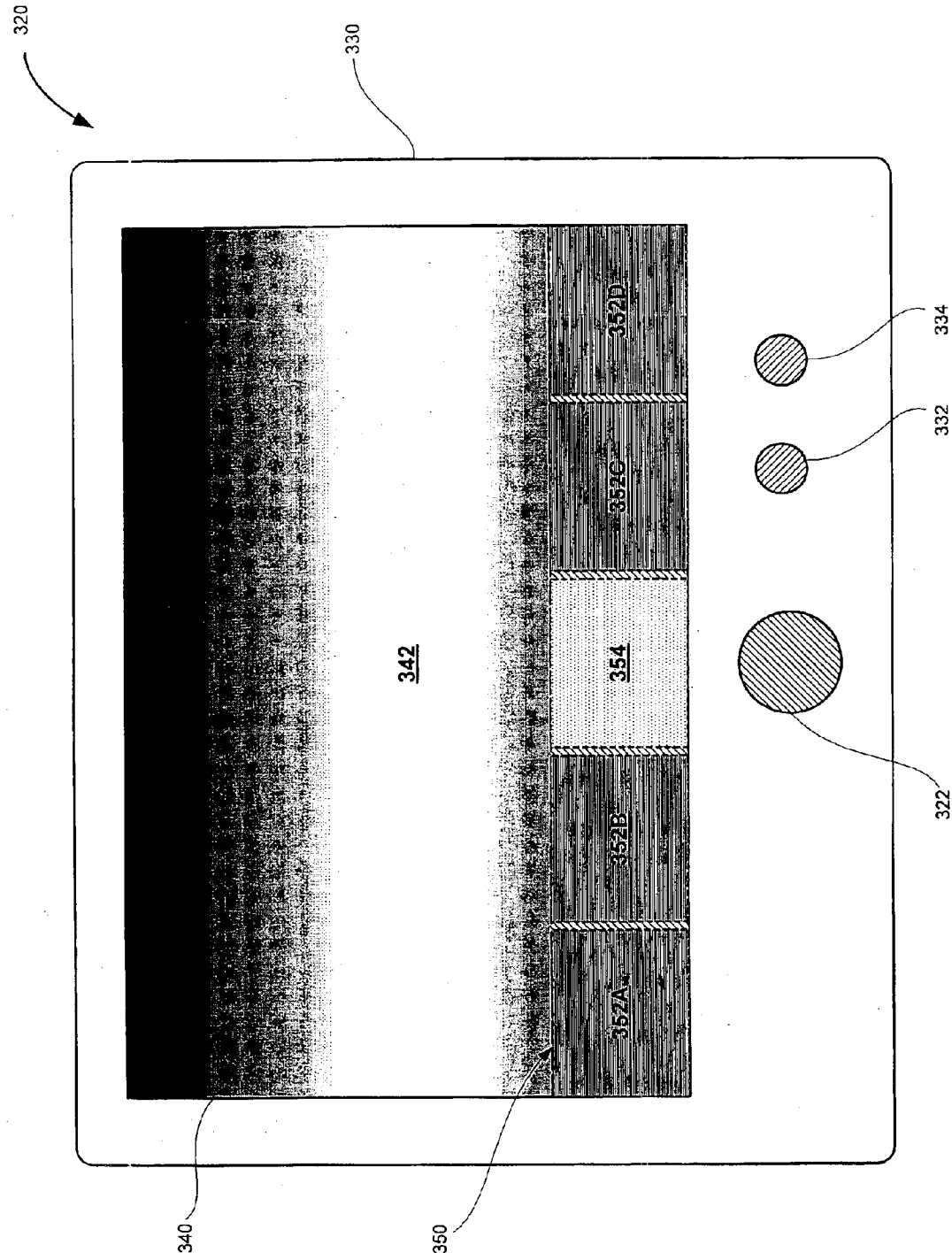
FIG. 7 is a diagram illustrating a front view of an embodiment of the client device, according to the present invention, shown in FIGS. 5, 6 and 7.

FIG. 7 is a frontal view of a preferred embodiment of client device 320. Client device 320 includes a housing 330 that houses the user input knob 322, input buttons 332 and 334, which are optional, and a display 340. Display 340 is a graphical display device, such as a digital liquid crystal display (LCD), that includes a viewing area 342 in which is displayed an output page for a currently selected channel or, at initialization, a default page. Certain inventive aspects described herein may be embodied in a client device that utilizes a separate display device, such as a television. In still further embodiments, such as that shown in FIG. XX, Display 340 also includes a previewing area 350 that includes previewing frames 352A–D and selection frame 354. Previewing frames 352A–D and selection frame 354 display graphical images representing channels accessible using the client device 320 within a predetermined previewing window. In the embodiment shown in FIG. 7, the previewing window consists of five frames. Selection frame 354 corresponds to a channel at the center of previewing window. Previewing frames 352A and 352B represent channels preceding the channel at the center of the previewing window in a predefined hierarchy of channels that may be selected. Similarly, previewing frames 352C and 352D represent channels following the channel at the center of the previewing window in the predefined hierarchy of channels that may be selected. The previewing frames 352A–D and selection frame 354 may be removed from the display 340 once a channel has been selected and re-displayed, for example, when the user rotates knob 322.

An embodiment of user input knob 322 includes a rotary encoder device that outputs a clock signal and a data signal that indicate rotational motion of the knob. The rotary encoder device may include a selection switch for generating a selection signal in response to a user depressing a shaft of the rotary encoder. As selection knob 322 is rotated, the channel at the center of the previewing window changes, with the center of the previewing window moving up or down the hierarchy of channels depending upon the direction of rotation. As the center of the previewing window is changed, graphical images, such as gif files, corresponding to the channels are scrolled through the previewing frames 352A–D and the selection frame 354. Thus, as the knob is rotated and the channels within the previewing window change, the graphical images displayed within previewing area 350 change correspondingly so as to scroll the graphical images through the previewing frames 352A–D and the selection frame 354. The user rotates the user input knob in order to preview graphical representations of the channel options in the hierarchy. The resulting effect is somewhat like a filmstrip projection.

In order to select a channel, the user rotates selection knob 322 to scroll graphical images until the graphical image corresponding to a desired channel is displayed in selection frame 354. Then, the user depresses knob 322 in order to select the desired channel. A channel identifier corresponding to the channel at the center of the previewing window is sent to an operating system executing within client device 320.

Alternatively, the user may make a selection by rotating the selection knob 322 until the desired channel is displayed in selection frame 354 and then wait for a predetermined time period to expire, e.g. a time-out event. When the time-out event occurs, e.g. through the expiration of a timer, then the channel identifier corresponding to the channel in selection frame 354 is sent to the operating system for further processing. As a further alternative, depressing the selection knob 322 when client device 320 is displaying an application program, such as a calendar or datebook application, may result in the channel application being activated with the most recently selected channel displayed.

Figure 8:
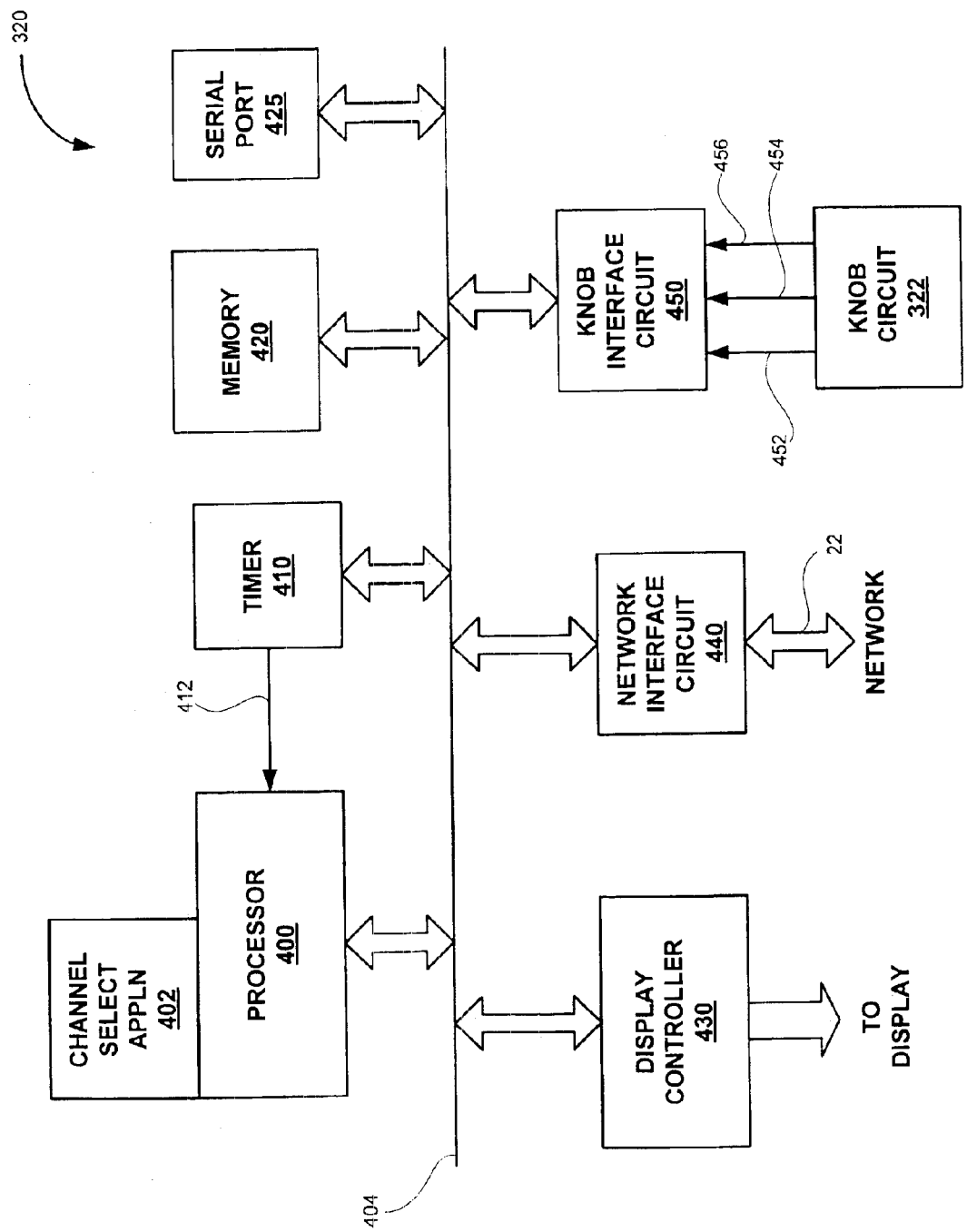
FIG. 8 is a functional block diagram illustrating an example of a client system architecture for the client device of the present invention.

FIG. 8 is a functional block diagram illustrating one embodiment of a processor system of the client device 320 shown in FIGS. 5–7, where the processor system is configured to receive user input via the user input knob 322 and display information to the user via display 340. The embodiment of a processor system shown in FIG. 8 includes a processor 400 that is coupled to various peripheral devices through processor bus 404. The peripheral devices coupled to processor 400 include a programmable timer 410, a memory subsystem 420, a display controller 430, a network interface circuit 440, and a knob interface circuit 450.

One of ordinary skill in the art will readily recognize that a variety of computer systems may be adapted provide the hardware platform for the client device 320. In one embodiment of the present invention, a Geode GX1 processor from National Semiconductor Corporation (Santa Clara, Calif.: www.national.com) may be used as processor 400. The GX1 processor may communicate through a Peripheral Component Interconnect (PCI) bus to a CS5530 Geode I/O Companion Multifunction South Bridge device to drive display and communications subsystems. For example, a CS9211 Graphics Companion Flat Panel Display Controller may be used as display controller 230 to drive display 140. A Universal Serial Bus (USB) interface of the CS5530 may be attached to an ethernet adapter in order to provide an interconnection to a broadband communication interface device for highspeed communication with the Internet. Examples of broadband communication interface devices are digital subscriber line (DSL) gateways and cable modems. For PSTN access, a modem device may be connected to the PCI bus. One example of a modem that may be connected to the PCI bus is composed of the Analog Devices (Norwood, Mass.: www.analogdevices) Model 1807 modem processor and Model 1804 data access arrangement (DAA).

Programmable timer 410 is programmed with a time-out value by processor 400 and, when the time-out value is reached, generates an interrupt signal 412 that is input to the processor. Memory subsystem 420 stores data and executable code for processes running on processor 400, such as channel application 402. Display controller 430 drives a display device, such as the display 340 of client device 420 shown in FIG. 7, and receives display updates under the control of processor 400. A network interface circuit 440, such as a network interface card (NIC) or a modem, sends and receives data packets, such as HTTP commands and responses, over network connection 22. Knob interface circuit 450 receives and decodes the user selection information that is input via knob circuit 322, as illustrated in FIGS. 5–7.

In the embodiment of FIG. 8, knob circuit 322 outputs three signals, a clock signal 452, and a data signal 454, and a selection signal 456. When the user rotates the knob, the clock signal 452 will transition between logic states, such as a logical "1" and logical "0". When knob interface circuit 450 detects a transition in the clock signal, such as a falling edge, then it checks the value of the data signal 454. If the data signal is a logic 1, then the knob has been rotated in one direction, and when the data signal is a logic 0, then the knob has been rotated in the opposite direction. By counting the number of clock pulses and sensing the data signal value, a count representing the position of the knob is maintained by knob interface circuit 450.

The user input from knob 322 is received and processed by a channel selection application 402. An example of a design approach for channel selection application 402 to detect the changes in the position of knob 322 is an interrupt routine based upon a polling approach. This approach assumes that the system of client 320 has been initialized at power-up such that a data index, e.g. a data pointer, indexes or points to a default start value for the center of the selection window discussed above and the data index points to a portion of a data structure containing the predetermined hierarchy of channels. This approach further assumes that the knob 322 is an incremental device, e.g. there is not an absolute relationship between the knob position and an output value of the knob circuit, and that a previous count value is initialized at start-up to the same value present in the counter within knob interface circuit 450.

When timer 410 times-out and interrupts processor 400, the interrupt routine is entered and the processor will read the current count value from the knob interface circuit 450. Processor 400 compares the current count value to the previous count value. If the current count and previous count values are the same, then the knob has not been moved and no further action is required.

If the current count and previous count values are not the same, then knob 322 has been turned and the pointer to the center of the preview window in the predetermined hierarchy of network resources is incremented or decremented according to the change in counter value.

Channel application 402 causes processor 400 to obtain the graphics corresponding to the channels within the preview window and updates the graphics in the preview areas 352A–D and selection frame 354 of display 340, accordingly, which results in the graphics scrolling across the preview area 350. The previous count value is then set to the current count value to prepare for the next polling period and the process continues on to check for additional user input.

The processor 400 then checks whether the selection signal 456 is set. If signal 456 is not set, then processor 400 resets timer 410 and returns from the interrupt routine. However, if signal 456 is set, then process 400 obtains the channel value pointed to by the pointer to the hierarchy of channels for processing by channel application 402, as discussed in further detail below. The register or flip-flop within knob interface circuit 450 that stores the selection signal 456 is then reset.

Figure 9:
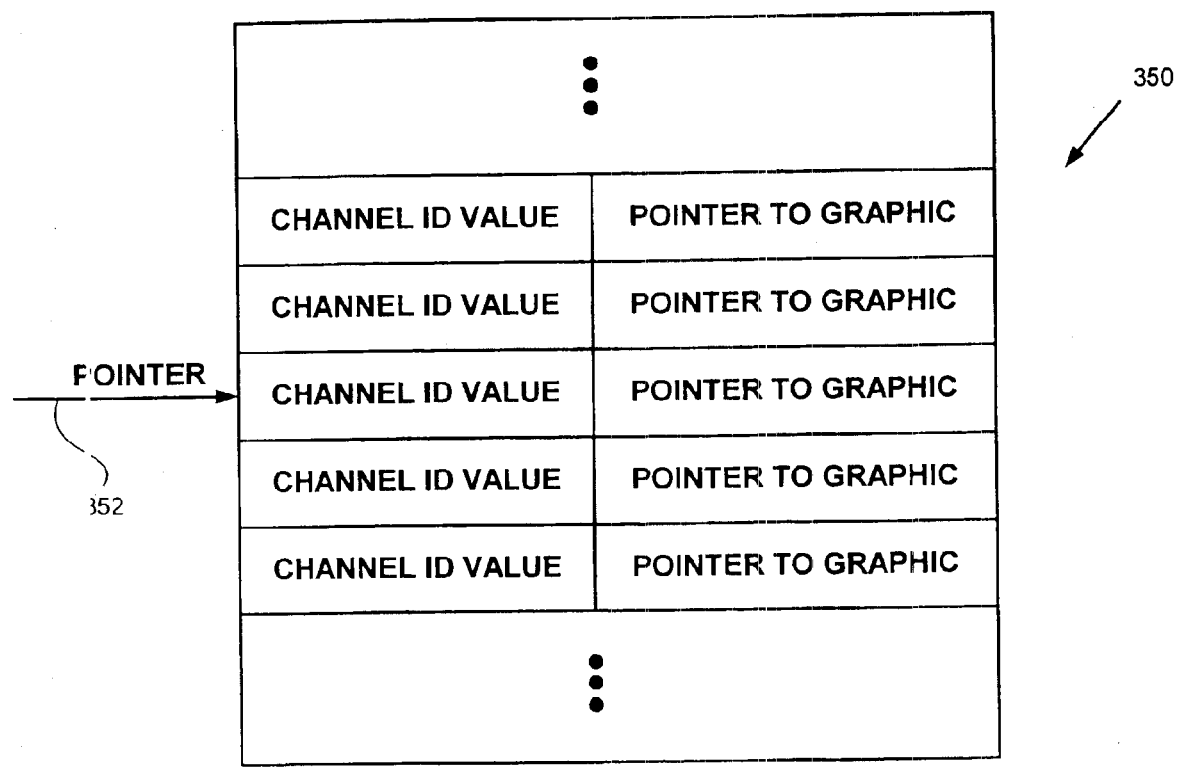
FIG. 9 is a data diagram illustrating a channel ID value table for the client device of the present invention.

FIG. 9 is a block diagram of an embodiment of a data structure 460 for the hierarchy of channels used in one embodiment of the present invention. Data structure 460 is shown in FIG. 9 as a table containing multiple channel identifier pairs composed of a channel ID value and a pointer to a graphic. The structure 460 can take on a variety of other forms, such as a linked list, as one of ordinary skill in the art will readily understand. Pointer 462 is the pointer to the center of the preview window and generally points to the channel identifier pair for the network resource shown in the select area 354 of FIG. 7. The channel identifier pairs stored in the data structure 460 for the hierarchy include a channel ID value for the channel and a pointer to a graphic for the channel. The graphic for the channel identifier pair pointed to by pointer 462 is displayed in selection frame 354. The graphics for the other network resource identifier pairs within the preview window, i.e. the network resource identifier pairs that are adjacent to the network resource identifier pair currently indexed by -pointer 462, are displayed in the preview windows 352A–D of FIG. 7. In the embodiment shown in FIG. 7, the preview window is plus and minus two pairs relative to pointer 462 for a total of five graphics displayed in preview area 350.

As selection knob 322 is rotated, the position of pointer 462 moves up or down the hierarchy depending upon the direction and magnitude of the knob rotation. As the preview window is changed by the knob rotation to include channel identifier pairs not previously displayed, the pointer to the graphic in each new channel identifier pair is used to retrieve the graphic for the channel for output to the display 340 by processor 400. As the knob 322 is rotated clockwise or counterclockwise, the graphics for the network resources within the preview window are scrolled forwards or backwards, respectively, through the preview area 350. When the selection signal 456 is activated by depressing the knob 322, then the channel ID value from the channel identifier pair indexed by pointer 462 is retrieved for processing by channel application 402. Data structure 460 resides in memory subsystem 420, which preferably includes persistent memory elements, such as flash memory, for storing the hierarchy. Likewise, the graphics for the channels may also be stored in persistent memory elements within memory subsystem 420.

As noted above, the selection signal 456 may be replaced with a time-out event from a timer, such as time-out signal 412 from timer 410 of FIG. 8. Thus, the user rotates knob 322 until the icon or graphic representing the desired channel is displayed in selection window 354. The user then stops rotating knob 322 and waits for a predetermined time period, which may be user selectable. In this embodiment, processor 400 resets timer 410 with the predetermined time period each time it processes the signals from the knob interface circuit. When the user stops turning knob 322, the timer does not get reset and, when the predetermined time period expires, timer 410 generates timer signal 412. As a result, the channel ID value from the channel identifier pair indexed by pointer 462 is retrieved for processing by channel application 402. When an application other than channel selection application 402, such as a calendar application, is currently running, then processor. 400 may be configured to interpret selection signal 456 activated by knob 322 as a command to activate the channel selection application 402

The channel identifier pairs within data structure 460 may be predetermined by a manufacturer of the client device 320, defined by the user of client device 320, or both. A user interface application may be included that allows a user to update the contents of data structure 460. Alternatively, channel selection application 402 may be used to access a particular channel that provides for the request and download of a new channel identifier pair and associated data, such as in a XML file, as is discussed below, and a graphic representing the new channel in the data structure.

By using an incremental rotary encoder device for user selection knob 322, the number of selections available to the user is not limited by the number of positions of the knob 322. Consequently, the number of selections available to the user is determined by the number of channel identifier pairs provided for by data structure 460. Thus, the amount of available memory substantially determines the number of selections available to the user.

The clock and data signals generated by the rotary encoder of knob 322 may also be referred to as quadrature signals and one embodiment of the knob interface circuit 450 is a quadrature decoder circuit. When knob 322 is rotated forward, e.g. in a clockwise direction, the phase of the clock signal 452 leads the phase of the data signal 454 and the data signal is in a logic zero state at the rising edge of the clock signal. When knob 322 is rotated backwards, e.g. counter-clockwise, then the phase of the data signal 454 leads the phase of the clock signal and the data signal is in a logic one state at the rising edge of the clock signal.

Figure 10:
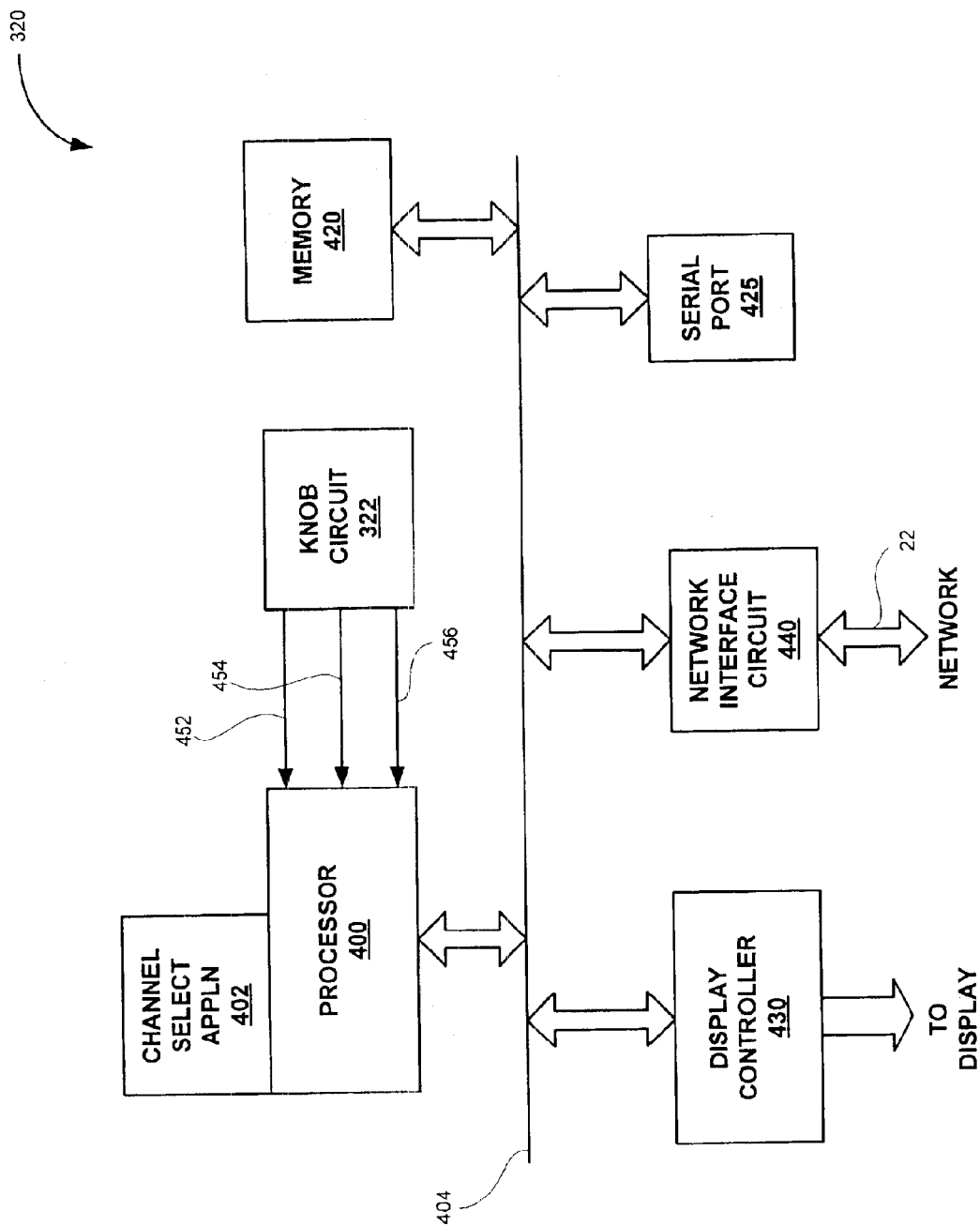
FIG. 10 is a functional block diagram illustrating another example of a client system architecture for the client device of the present invention.

While the architecture of FIG. 8, and the corresponding interrupt routine, is configured to monitor user manipulation of knob 322 by periodically polling the knob interface circuit 450, an interrupt driven approach may also be employed with respect to channel selection application 402. In FIG. 10, an architecture is shown whereby the processor 400 directly monitors user input via knob 322 through the use of the processor's interrupt scheme. In FIG. 10, clock signal 452 is coupled to a first interrupt input of processor 400, such as a non-maskable interrupt (NMI) input and selection signal 456 is coupled to a second interrupt input of processor 400, such as an interrupt request (IRQ) signal. Data signal 454 may be coupled to an interrupt level input or be read through bus 404 as an interrupt vector or simply as data. One of ordinary skill in the art will appreciate that there are a variety of interrupt based approaches and corresponding designs and that the present embodiment is illustrative of one such approach.

As an example of an interrupt routine for directly monitoring the rotation of knob 322 using processor 400 using clock signal 452 to generate an interrupt. In this approach, the interrupt routine is entered when clock signal 452 transitions to an active state, e.g. a rising edge of clock signal 452. At step 452, the value of data signal 454 is read. As noted above, data signal 454 may be input to processor 400 in various ways, including using a buffer, such as a flip-flop. If the value of data signal 454 is a logic zero, then the pointer to the center of the preview window in the hierarchy of network resources is incremented. If the value of data signal 454 is a logic one, then the pointer is decremented. In either case, the preview area 350 is updated with graphics for the channels within the preview window. Once this processing is completed, the interrupt routine returns and awaits the next transition of clock signal 452.

Another interrupt routine may be used to process an interrupt caused by selection signal 456. This interrupt routine is entered when selection signal 456 transitions to an active state, e.g.. a rising edge of selection signal 456. At this point, any rotation of knob 322 has been handled by the interrupt routines discussed above. As a result, the selection signal interrupt routine only needs to process the selected channel, which is pointed to by the current position of the pointer to the center of the preview window. Therefore, the channel ID value indicated by the pointer is processed by channel application 402 for further processing, as discussed in further detail below, and the channel selected by the user is displayed to the user in the display area. 340. The user selection interrupt routine then returns to normal processing.

Figure 4:
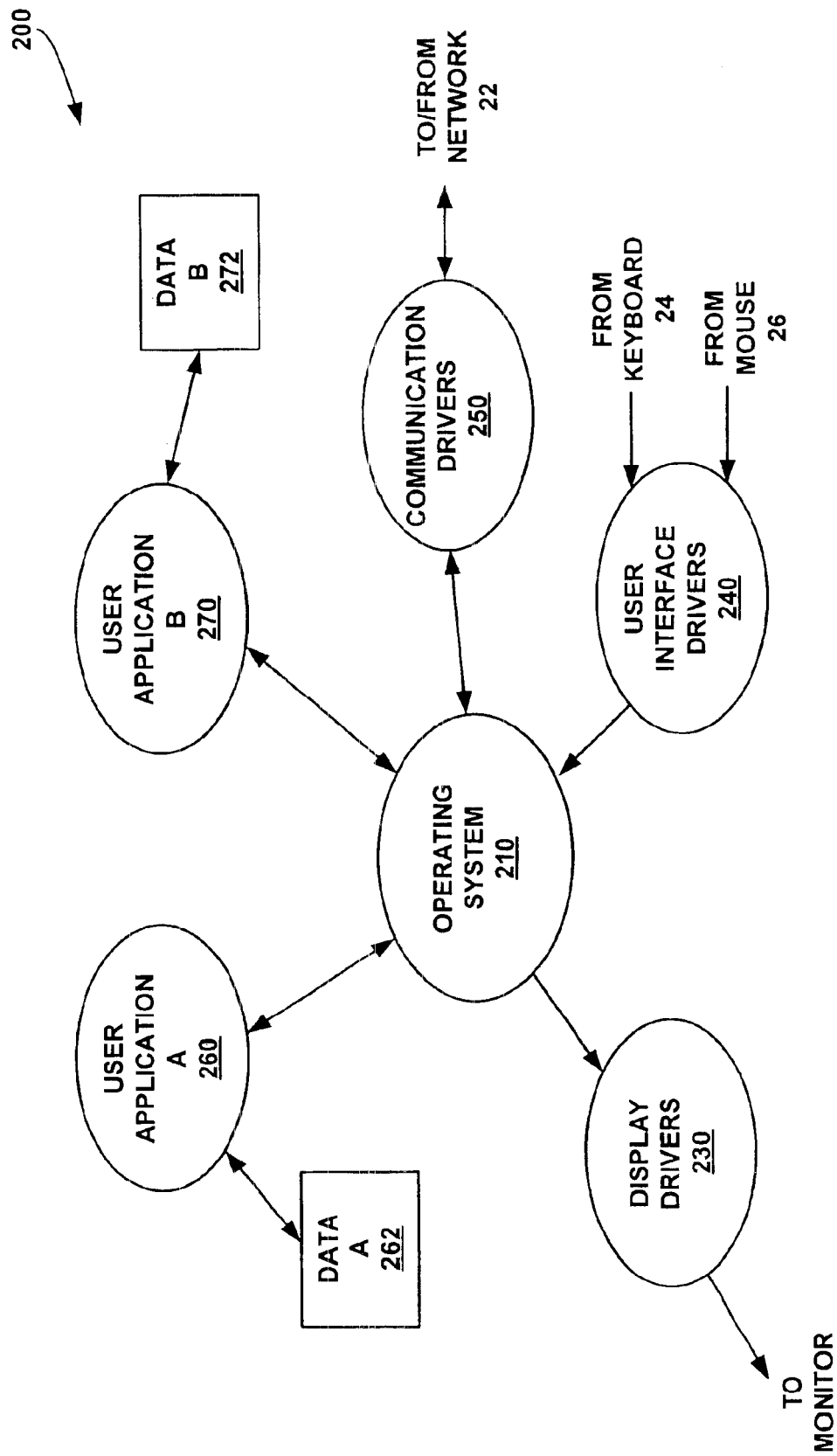
FIG. 4 is a software architecture diagram illustrating an example of an operating system for the client system architecture of FIGS. 1–3.
Figure 11:
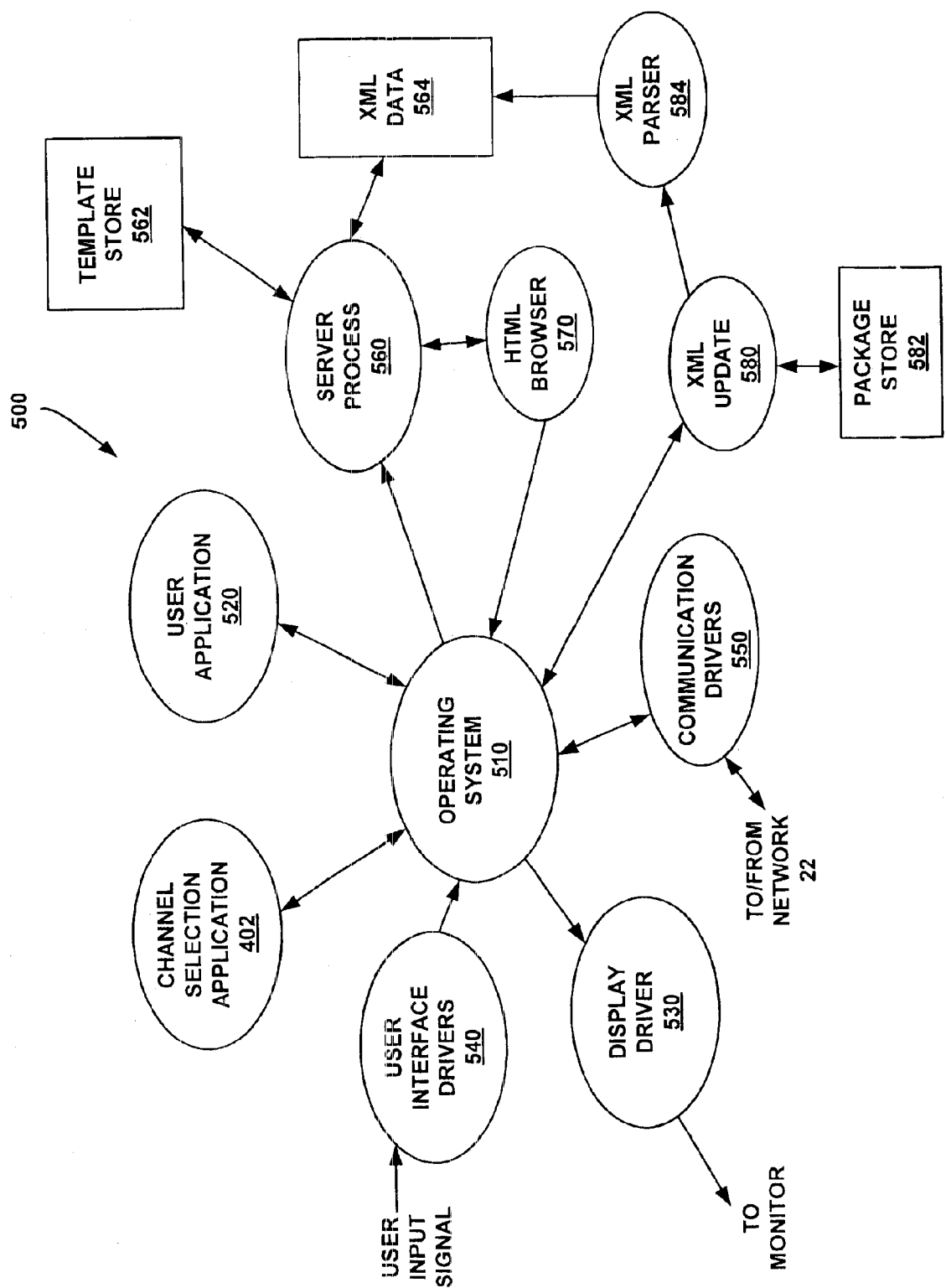
FIG. 11 is a software architecture diagram illustrating an example of an operating system for the client device of the present invention.

FIG. 11 is a software architecture diagram illustrating an embodiment of a software architecture 500 for client device 320. Similar to software architecture 200 of FIG. 4, architecture 500 includes an operating system 510 for controlling the resources of the client device and activating application program 520 and channel application 302. Architecture 500 also includes a display driver 530 for driving the display monitor of client device 530, user interface drivers 540 for receiving and processing user input signals from a user interface, including knob 322, and a communications driver 550 for handling a communications via network interface circuitry for connection 22.

An example of an operating system suitable for use as OS 510 in client device 320, according to the present invention, is the QNX operating system available from QNX, 175 Terence Matthews Crescent, Kanata, Ontario Canada, k2M 1W8. See www.gnx.com for further details regarding the QNX OS.

The QNX OS includes features such as multitasking, threads, priority-driven preemptive scheduling, synchronization, and fast context switching that enhance its real-time performance. Preferably, the OS has a small memory footprint for execution and storage to keep cost and complexity down in the client device.

For networking services, the preferred device also is configured to provide a full implementation of the TCP/IP protocol suite and utilities, including PPP, DHCP, NFS, RPC, and SNMP, that make it possible to run a variety of Internet services over a wide choice of networks. Using Ethernet with a network interface card, or serial lines, with a modem, users can connect to the Internet, the private wide area networks, and log-in to remote systems. The network services may also be scaled back to a small TCP/IP stack.

The device also includes a customized windowing system that permits high-end graphics to be displayed even on small memory-constrained devices. This graphical user interface (GUI) has a small memory footprint.

Architecture 500 also includes a thin server process 560, which is a server process residing in the client device rather than a remote server, that accesses a template store 562 and an Extended Markup Language (XML) database 564. The QNX OS discussed above includes a server that may be modified for use as the thin server process 560. XML and the more familiar Hypertext markup language (HTML) are both restricted forms of the Standard Generalized Markup Language (SGML) defined by the International Standards Organization (ISO) standard 8879 (1986). XML 1.0 (Feb. 10, 1998), herein incorporated by reference, is defined by the World Wide Web Consortium (W3C) and is available at www.w3c.com.

XML describes a class of data entities called XML documents and generally describes the behavior of computer programs that process these documents. XML documents are made up of storage units called entities that contain either parsed or unparsed data. Parsed data is made up of characters, some of which form character data and some of which form markup. Markup encodes a description of the document's storage layout and logical structure. XML provides a mechanism to impose constraints on the storage layout and logical structure. An XML processor is a program configured to read and interpret XML documents according to the XML standard and process them into a viewable format on behalf of an application program.

Each XML document is structured according to a document type definition (DTD) that contains or points to markup declarations that describe a class of documents. The DTD can point to an external subset of entities containing markup declarations or can contain the markup declarations directly in an internal subset, or both. The DTD for a document consists of both subsets taken together. Each XML document also contains one or more elements that are delimited by tags. Each element has a type, identified by a name and sometimes called its generic identifier. Table 1 below is an example of a DTD file used for defining a channel, according to the present invention, for weather information.

TABLE 1

Weather.dtd

```
<!--
    Import the common Ergo element/attribute/entity definitions.
-->
<!ENTITY % ErgoTypesDTD SYSTEM "ErgoTypes.dtd">
%ErgoTypesDTD;
<!--
```

TABLE 1-continued

Weather.dtd

```
    Import the Media element/attribute/entity definitions.
-->
<!ENTITY % MediaDTD SYSTEM "Media.dtd">
%MediaDTD;
<!ENTITY % TempScaleEnt "
    unit    (C|F)          #REQUIRED
">
<!ENTITY % WxcodeEnt "
    wxcode (
        01 | 02 | 03 | 04 | 05 | 06 | 07 | 08 | 09 | 10 |
        11 | 12 | 13 | 14 | 15 | 16 | 17 | 18 | 19 | 20 |
        21 | 22 | 23 | 24 | 25 | 26 | 27 | 28 | 29 | 30 |
        31 | 32 | 33 | 34 | 35 | 36 | 37 | 38 | 39 | 40 |
        41 | 42 | 43 | 44
    ) #IMPLIED
">
<!ELEMENT Locale (#PCDATA)>
<!ELEMENT DayName      (#PCDATA)>
<!ELEMENT Conditions   (#PCDATA)>
<!ATTLIST Conditions
    %WxcodeEnt;
>
<!ELEMENT Temperature  (#PCDATA)>
<!ATTLIST Temperature
    %TempScaleEnt;
>
<!ELEMENT Pressure     (#PCDATA)>
<!ATTLIST Pressure
    unit   (INHG|KPS)        #REQUIRED
>
<!ELEMENT Winds (#PCDATA)>
<!ATTLIST Winds
    unit   (KPH|MPH)         #REQUIRED
    speed  CDATA             #IMPLIED
>
<!ELEMENT Windfrom     (#PCDATA)>
<!ELEMENT Pollen (#PCDATA)>
<!ELEMENT Airquality   (#PCDATA)>
<!ELEMENT High         (#PCDATA)>
<!ATTLIST High
    %TempScaleEnt;
>
<!ELEMENT Low          (#PCDATA)>
<!ATTLIST Low
    %TempScaleEnt;
>
<!ELEMENT Day      (DayName, Conditions, (
    (Temperature, Pressure, Winds, Pollen, Airquality) |
    (High?, Low))
)>
<!ATTLIST Day
    _ID (
        Current   |
        Day1.1|
        Day1.2 |
        Day2 |
        Day3 |
        Day4 |
        Day5
    ) #REQUIRED
    %DateEnt;
>
<!--
    Definition of a weather forecast.
    The images must have their "_ID" attributes set to either
    "NationalMap" or "RegionalMap".
-->
<!ELEMENT Weather (
    Locale,
    PrettyDayTime,
    Day+,
    Copyright,
    Image*
)>
<!ATTLIST Weather
    _Version CDATA       #FIXED "0.2"
```

TABLE 1-continued

Weather.dtd

```
    Partner CDATA        #FIXED       "Weather.com"
>
```

XML entities may refer to other entities to cause their inclusion into the document. Entities may be resolved through inference resolution to incorporate the content of data objects external to the XML document into the document. For example, the Weather.dtd file of Table 1 defines a Weather entity that includes subelements Locale, PrettyDayTime, one or more Day subelements, a copyright element, and may include one or more Image subelements. The subelement Day, in turn, is composed of further subelements DayName, Conditions, Temperature, Pressure, Winds, Pollen, Airquality, High and Low and includes an_ID attribute that can take on a value from the set of Current, Day1.1, Day1.2, Day2, Day3, Day4, and Day5. The Day subelement also includes a datestamp attribute called DateEnt. Several of the subelements also include subelements, such as Temperature, which includes a text portion that contains parsed character data (PCDATA) and a TempScaleEnt entity that requires that the units for the text portion be defined as either "C" of "F".

The definitions for some entities can be obtained from other files. For example, the Weather.dtd file of Table 1 references another DTD file called ErgoTypes.dtd that is used to define entities that are used by multiple channels and/or applications. For instance, a data structure may be used by a news channel and also by a calendar application. The inclusion of the ErgoTypes.dtd, in this example, causes the entity PrettyDayTime to be defined for use in Weather.dtd. Table 2 shows an example of the ErgoTypes.dtd file.

TABLE 2

ErgoTypes.dtd

```
<!-- Definition of Parameter entities for use below -->
<!--
    Tracking information. Elements with this attribute
    will have hit times reported back to the channel partner.
    NOTE: Can not have un-escaped commas present.
-->
<!ENTITY % TrackEnt "
    _TrackID    CDATA       #IMPLIED
">
<!--
    Date provides the normalized date. The format is YYYYMMDD.
-->
<!ENTITY % DateEnt "
    Date    CDATA       #IMPLIED
">
<!--
    Time provides the normalized time. The format is:
    HHMM[SS][Z]"-12" . . . "-01" . . . "+00" . . . "+01" . . . "+12"].
-->
<!ENTITY % TimeEnt "
    Time    CDATA       #IMPLIED
">
<!--
    Timestamp provides the normalized date (and time if available).
    The format is <DATE>[T<TIME>]. For "<DATE>", see "Date"
    above, for "<TIME>", see "Time" above.
-->
<!ENTITY % TimeStampEnt"
    TimeStamp   CDATA       #IMPLIED
">
<!--
    Common attribute to express a URL.
-->
```

TABLE 2-continued

ErgoTypes.dtd

```
<!ENTITY % URLEnt "
    _Source     CDATA       #IMPLIED
    _Cache (
        True    |
        False
    ) #IMPLIED
    %TrackEnt;
">
<!-- Definition of common data objects -->
<!--
    Human readable, free-form day, time or day-time information.
-->
<!ELEMENT PrettyDayTime(#PCDATA)>
<!--
    ContentTag is the Generator Tag the object is associated with
    and consists of a '.' separated list of identifiers prefixed by:
    "com.macromedia.generator.commands"
-->
<!ELEMENT ContentTag    (#PCDATA)>
<!--
    ReferenceTable is a table of DTD element references (e.g. a reference
    to a CalendarEntry from within a Story, etc.). Element is the
    name of the referenced element (e.g. "CalendarEntry"), and Path is
    the "DTD path" to the referenced element.
-->
<!ELEMENT Element       (#PCDATA)>
<!ELEMENT Path          (#PCDATA)>
<!ELEMENT Reference     (Element, Path)>
<!ATTLIST Reference
    _ID     CDATA       #REQUIRED
>
<!ELEMENT ReferenceTable    (Reference+)>
<!ATTLIST ReferenceTable
    _Type CDATA         #FIXED      "Table"
>
<!-- The attribute "Units" is specified using ISO 4217 format -->
<!ELEMENT Money (#PCDATA)>
<!ATTLIST Money
    Units CDATA                     "USD"
>
<!ELEMENT Email (#PCDATA)>
<!ELEMENT Phone (#PCDATA)>
<!ELEMENT Country       (#PCDATA)>
<!ELEMENT City          (#PCDATA)>
<!ELEMENT State         (#PCDATA)>
<!ELEMENT Street        (#PCDATA)>
<!ELEMENT Zip           (#PCDATA)>
<!ELEMENT Address       (Street, City, State, Zip, Country)>
<!-- What's in a name? Here's the definition -->
<!ELEMENT FirstName     (#PCDATA)>
<!ELEMENT LastName      (#PCDATA)>
<!ELEMENT Name          (FirstName?, LastName?)>
<!ELEMENT Company       (#PCDATA)>
<!ELEMENT Note          (#PCDATA)>
<!ATTLIST Note
    _MaxLength CDATA            #FIXED      "4096"
>
<!ELEMENT Title         (#PCDATA)>
<!-- Table definition. Used for Sports scores, etc. -->
<!ELEMENT Cell          (#PCDATA)>
<!ATTLIST Cell
    %URLEnt,
>
<!ELEMENT Row       (Cell+)>
<!ELEMENT Table     (Row+)>
<!-- Ergo/Palm database elements -->
<!-- Ergo DB keys -->
<!ELEMENT DBKey(#PCDATA)>
<!-- Ergo/Palm DB owner's name. -->
<!ELEMENT DBName        (#PCDATA)>
<!-- Palm DB record ID -->
<!ELEMENT RecordId      (#PCDATA)>
<!-- Palm DB record index -->
<!ELEMENT RecordIndex   (#PCDATA)>
<!-- Attributes, implemented (of course) as attributes. -->
<!ELEMENT RecordAttributes EMPTY>
```

TABLE 2-continued

ErgoTypes.dtd

```
<!ATTLIST RecordAttributes
    Deleted     (True|False)   "False"
    Dirty       (True|False)   "False"
    Secret      (True|False)   "False"
    Archived    (True|False)   "False"
>
<!-- Archives -->
<!ELEMENT Archive       EMPTY>
<!ATTLIST Archive
    _ID       CDATA      #REQUIRED
    _Type     CDATA      #FIXED      "Archive"
    _Format (
        pkzip |
        tar
    ) "tar"
    %URLEnt;
>
<!-- An applet (e.g. for channel configuration. -->
<!ELEMENT Applet EMPTY>
<!ATTLIST Applet
    _Type CDATA         #FIXED      "Applet"
    Format (
        html |
        swf
    ) "html"
    %URLEnt;
>
```

When the thin server process 560 is activated by channel selection application 402 or user application 520, it receives an index in template store 562 that identifies a template file corresponding to the calling application. Alternatively, the channel selection application may include a channel selector process and a channel browser process. The channel selector process is configured to receive and interpret the user input signals and pass to the channel browser a path to an index.shtnl file corresponding to the user's selection. The channel browser process then sends an HTTP request to local thin server 560.

The template store 562 contains template files, which are SHTML files in this embodiment, that may act as templates for channels and applications residing on client device 320. The SHTML files utilize server side include statements or entities (SSIs). During processing of an SHTML file, an entity, such as a SSI statement, is "included" or resolved when its replacement text is retrieved and further processed in place of the entity reference itself as tho ugh it were part of the document at the location the entity reference was recognized. Table 3 below shows an example of an SHTML template for a weather channel that has SSI statements conforms to the Weather.dtd of Table 1.

TABLE 3

Weather SHTML

```
<html>
<head>
</head>
<body bgcolor="#FFFFFF" marginwidth="0" marginheight="0" topmargin="0"
leftmargin="0">
<!--#config cmdecho="ON" --> <!--#exec cmd="SetXMLPath/" --> <img
border=0 height=60 src="logo.jpg" width=640>
<table bgcolor=#ffffff border=0 cellpadding=5 cellspacing=0 width=640
height="220">
    <tr align="left">
        <td colspan="3" height="40"><b><font color=#000066 face=Arial size=+1>
Weather®
        5-DAY FORECAST FOR <!--#exec cmd="GetXMLPCData
Content/Weather/Primary/Locale" -->
        </font> </b> </td>
    </tr>
    <tr>
        <td align=middle width="75%">
            <table border=0 cellpadding=0 cellspacing=0 width="100%">
                <tr align="left"> <!-- Timestamp -->
                    <td colspan=2> <b> <font color="#000066" face="Arial" size="+1">
CURRENT
            (<!--#exec cmd="GetXMLPCData/.updateTimes/Weather" -->)
                    </font> </b> </td>
                </tr>
                <tr> <!-- Current Icon -->
                    <td align=center> <img border=0 src="Icons/<!--#exec
cmd="GetXMLAttribute Content/Weather/Primary/Current/Conditions wxcode" -
->/<!--#exec cmd="GetXMLAttribute
Content/Weather/Primary/Current/Conditions wxcode" -->.gif">
                    </td>
                    <!-- Current Condition/Temperature/Barometer -->
                    <td> <b> <font face=Arial> <!-#exec cmd="GetXMLPCData
Content/Weather/Primary/Current/Conditions" -->
                    <br>
                    TEMP: <!--#exec cmd="GetXMLPCData
Content/Weather/Primary/Current/Temperature" -->
                    <br>
                    BAROMETER: <!--#exec cmd="GetXMLPCData
```

TABLE 3-continued

Weather SHTML

```
Content/Weather/Primary/Current/Pressure" -->"
        </font> </b> </td>
    </tr>
    <tr> <!-- Current Winds -->
        <td colspan=2> <b> <font face=Arial>WIND: <!--#exec
cmd="GetXMLPCData Content/Weather/Primary/Current/Wind_from" -->
AT <!--#exec cmd="GetXMLPCData
Content/Weather/Primary/Current/Windspeed" -->MPH
        </font> </b> </td>
    </tr>
    <tr> <!-- Current Air Quality/Pollen -->
        <td colspan=2> <b> <font face=Arial>AIR QUALITY: <i> <font
color=#009900>
            <!--#exec cmd="GetXMLPCData
Content/Weather/Primary/Current/Airquality" -->
        </font> </i> POLLEN: <i> <font color=#ff0000> <!--#exec
cmd="GetXMLPCData Content/Weather/Primary/Current/Pollen" -->
        </font> </i> </font> </b> </td>
    </tr>
  </table>
 </td>
 <td align=middle width="25%">
   <table border=0 cellpadding=0 cellspacing=0>
    <tr>
        <td align=middle bgcolor=#ffffff> <font face=Arial size=-1> <b> TODAY
        </b> </font> </td>
    </tr>
    <tr> <!-- Today Forecast Icon -->
        <td align=middle> <img border=0 src="Icons/<!--#exec
cmd="GetXMLAttribute Content/Weather/Primary/Day1.1/Conditions wxcode" -
->/<!--#exec cmd="GetXMLAttribute
Content/Weather/Primary/Day1.1/Conditions wxcode" -->.gif">
        </td>
    </tr>
    <tr> <!-- Today Forecast Conditions/Temperature -->
        <td align=middle bgcolor=#ffffff> <b> <font face=Arial size=-1> <!--
#exec cmd="GetXMLPCData Content/Weather/Primary/Day1.1/Conditions" -->
        <br>
            <!--#exec cmd="GetXMLPCData
Content/Weather/Primary/Day1.1/High" -->/<!--#exec cmd="GetXMLPCData
Content/Weather/Primary/Day1.1/Low" -->
        </font> </b> </td>
    </tr>
   </table>
  </td>
  <td bgcolor=#f2ffff> </td>
 </tr>
 <tr>
   <td align=middle colspan="3" height="20"> </td>
 </tr>
</table>
<table border=0 cellpadding=0 cellspacing=0 height="120">
  <tr>
    <td align=middle bgcolor=#ffffff width=128> <font face=Arial size=-1> <b>
       TONIGHT </b> </font> </td>
    <!-- Day2 Name -->
    <td align=middle bgcolor=#ffffff width=128> <font face=Arial size=-1> <b>
       <!--#exec cmd="GetXMLPCData Content/Weather/Primary/Day2/DayName"
-->
       </b> </font> </td>
    <!-- Day3 Name -->
    <td align=middle bgcolor=#ffffff width=128> <font face=Arial size=-1> <b>
       <!--#exec cmd="GetXMLPCData Content/Weather/Primary/Day3/DayName"
-->
       </b> </font> </td>
    <!-- Day4 Name -->
    <td align=middle bgcolor=#ffffff width=128> <font face=Arial size=-1> <b>
       <!--#exec cmd="GetXMLPCData Content/Weather/Primary/Day4/DayName"
-->
       </b> </font> </td>
    <!-- Day5 Name -->
```

TABLE 3-continued

Weather SHTML

```
      <td align=middle bgcolor=#ffffff width=128> <font face=Arial size=-1> <b>
        <!--#exec cmd="GetXMLPCData Content/Weather/Primary/Day5/DayName"
-->
        </b> </font> </td>
    </tr>
    <tr> <!-- Day 1.2 Icon -->
      <td align=middle width=128> <img border=0 src="Icons/<!--#exec
cmd="GetXMLAttribute Content/Weather/Primary/Day1.2/Conditions wxcode" -
->/<!--#exec cmd="GetXMLAttribute
Content/Weather/Primary/Day1.2/Conditions wxcode" -->.gif">
      </td>
      <!-- Day2 Icon -->
      <td align=middle width=128> <img border=0 src="Icons/<!--#exec
cmd="GetXMLAttribute Content/Weather/Primary/Day2/Conditions wxcode" --
>/<!--#exec cmd="GetXMLAttribute Content/Weather/Primary/Day2/Conditions
wxcode" -->.gif">
      </td>
      <!-- Day3 Icon -->
      <td align=middle width=128> <img border=0 src="Icons/<!--#exec
cmd="GetXMLAttribute Content/Weather/Primary/Day3/Conditions wxcode" --
>/<!--#exec cmd="GetXMLAttribute Content/Weather/Primary/Day3/Conditions
wxcode" -->.gif">
      </td>
      <!-- Day4 Icon -->
      <td align=middle width=128> <img border=0 src="Icons/<!--#exec
cmd="GetXMLAttribute Content/Weather/Primary/Day4/Conditions wxcode" --
>/<!--#exec cmd="GetXMLAttribute Content/Weather/Primary/Day4/Conditions
wxcode" -->.gif">
      </td>
      <!-- Day5 Icon -->
      <td align=middle width=128> <img border=0 src="Icons/<!--#exec
cmd="GetXMLAttribute Content/Weather/Primary/Day5/Conditions wxcode" --
>/<!--#exec cmd="GetXMLAttribute Content/Weather/Primary/Day5/Conditions
wxcode" -->.gif">
      </td>
    </tr>
    <tr> <!-- Day 1.2 Text -->
      <td align=middle bgcolor=#ffffff valign=top width=128> <b> <font face=Arial
size=-1>
        <!--#exec cmd="GetXMLPCData
Content/Weather/Primary/Day1.2/Conditions" -->
        </font> </b> </td>
      <!-- Day2 Text -->
      <td align=middle bgcolor=#ffffff valign=top width=128> <b> <font face=Arial
size=-1>
        <!--#exec cmd="GetXMLPCData
Content/Weather/Primary/Day2/Conditions" -->
        </font> </b> </td>
      <!-- Day3 Text -->
      <td align=middle bgcolor=#ffffff valign=top width=128> <b> <font face=Arial
size=-1>
        <!--#exec cmd="GetXMLPCData
Content/Weather/Primary/Day3/Conditions" -->
        </font> </b> </td>
      <!-- Day4 Text --->
      <td align=middle bgcolor=#ffffff valign=top width=128> <b> <font face=Arial
size=-1>
        <!-#exec cmd="GetXMLPCData
Content/Weather/Primary/Day4/Conditions" -->
        </font> </b> </td>
      <!-- Day5 Text -->
      <td align=middle bgcolor=#ffffff valign=top width=128> <b> <font face=Arial
size=-1>
        <!--#exec cmd="GetXMLPCData
Content/Weather/Primary/Day5/Conditions" -->
        </font> </b> </td>
</tr>
<tr> <!-- Day1.2 Temperature -->
  <td align=middle bgcolor=#ffffff width=128> <b> <font face=Arial size=-1>
    Low: <!--#exec cmd="GetXMLPCData
Content/Weather/Primary/Day1.2/Low" -->
    </font> </b> </td>
  <!-- Day2 Temperature -->
  <td align=middle bgcolor=#ffffff width=128> <b> <font face=Arial size=-1>
    <!--#exec cmd="GetXMLPCData Content/Weather/Primary/Day2/High" --
>/<!--#exec cmd="GetXMLPCData Content/Weather/Primary/Day2/Low" -->
    </font> </b> </td>
```

TABLE 3-continued

Weather SHTML

```
    <!-- Day3 Temperature -->
    <td align=middle bgcolor=#ffffff width=128> <b> <font face=Arial size=-1>
       <!--#exec cmd="GetXMLPCData Content/Weather/Primary/Day3/High" --
>/<!--#exec cmd="GetXMLPCData Content/Weather/Primary/Day3/Low" -->
       </font> </b> </td>
    <!-- Day4 Temperature -->
    <td align=middle bgcolor=#ffffff width=128> <b> <font face=Arial size=-1>
       <!--#exec cmd="GetXMLPCData Content/Weather/Primary/Day4/High" --
>/<!--#exec cmd="GetXMLPCData Content/Weather/Primary/Day4/Low" -->
       </font> </b> </td>
    <!-- Day5 Temperature -->
    <td align=middle bgcolor=#ffffff width=128> <b> <font face=Arial size=-1>
       <!--#exec cmd="GetXMLPCData Content/Weather/Primary/Day5/High" --
>/<!--#exec cmd="GetXMLPCData Content/Weather/Primary/Day5/Low" -->
       </font> </b> </td>
    </tr>
</table>
<table border="0" cellspacing="0" cellpadding="0" width="640">
    <tr>
       <td colspan="2" height="20"> </td>
    </tr>
    <tr>
<!-- Ad -->
       <td width="468" height="60">
       <a href="<!--#exec cmd="GetXMLPCData
       Content/AccuWeather/Primary/Content/Ad1" -->"><img src=<!--#exec
       cmd="GetXMLImageSrc Content/AccuWeather/Primary/Current/Ad1" -->
       width="468" height="60" border="0"></a>
       </td>
    </tr>
</table>
</body>
</html>
```

SHTML (Server-parsed HTML) is a file extension used to identify HTML pages that contain server-side includes (SSIs). Server-parsed means that the server scans the page for commands that require additional insertion before an HTML page is sent to a client device, where the HTML page is rendered by a browser for display to the user. SHTML files are conventionally found in remote servers and are typically indexed using a URL value provided by a browser application in a client device. A remote server typically uses an SSI command to place up-to-date data or boilerplate text and graphics into an HTML document before sending it to the user. For example, it can be used to retrieve the current date and size of downloadable files that are constantly changing. It can also be used to insert a boilerplate message where only the boilerplate needs to be changed to bring all the pages up-to-date. HTML pages that contain server-side includes typically use the .shtml file extension. The SSI command inserts the contents of another document or variable at the SSI tag location. An echo command inserts the contents of an environment variable. The Fsize and Flastmod commands insert size and date of a file, and the Config command controls the format of the output. The Exec command executes a CGI script.

In the present invention, each SHTML template file in template store 562 typically includes data and graphical object tags that identify entities to be incorporated into the graphical markup format set forth within the SHTML file. For example, the text <body bgcolor="#FFFFFF" marginwidth="0" marginheight="0"
       topmargin="0" leftmargin="0"> contained in Table 1 is markup language describing the background color for the display page and the margins. Each SHTML file also typically includes SSIs in the form of "Get" commands that are used to resolve references within the SHTML to outside data and retrieve the data into the SHTML file to form an HTML document.

Conventionally, a server process in a remote server uses the SHTML file to construct an HTML document for return to the client in an HTTP message, where it is subsequently rendered by a browser for display to a user. However, in the present invention, the SHTML files are template files structured in accordance with a document type definition (DTD) for a corresponding channel or application. The XML database 564, in turn, contains data and graphical entities that are identified by tag values and also structured according to the corresponding DTD. In order for an application in the client device to access content data provided by a remote server, both the application and the remote server process that provide the content data must conform to the DTD in order for the application to be able to find in XML database 564 the data provided by the remote server. This will be discussed in further detail below with respect to the update process 580.

Figure 12:
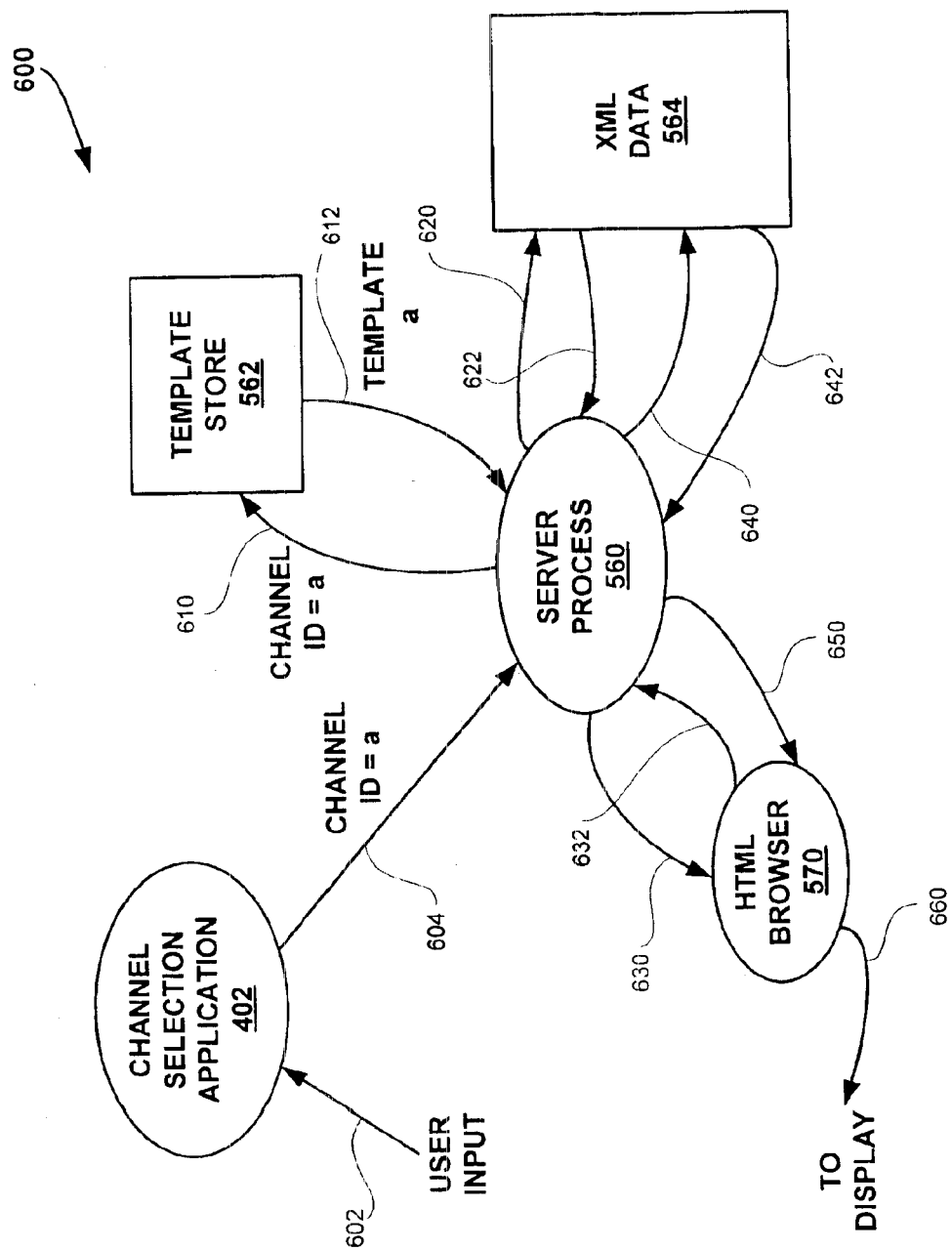
FIG. 12 illustrates an example of an exchange of messages involved in a user channel selection.

As noted above, the thin server process 560 is activated with a template ID that indicates a template file in template store 562. To demonstrate the processing performed in architecture 500, an example of an exchange of messages 600 involved in a user channel selection will be described in the context of FIG. 12, which is a simplified architecture diagram. In FIG. 12, channel selection application 402 receives user input 602 from the input knob 322 as described above. Based on the pointer value and the user input, channel selection application 402 retrieves the channel ID value selected by the user. Channel selection application 402 sends the channel ID value for the selected channel, channel ID="a" in this example, in a message 604 to the server process 560 for further processing or, with respect to the alternative discussed above, a channel selection process passes the channel ID to a channel browser application.

Thin server process 560 receives the channel ID="a" through the operating system 510 or, alternatively, via an HTTP request from the channel browser, and, responsive thereto, searches template store 562 for a corresponding SHTML template file, as represented by arrow 610. When the SHTML template file for channel "a" is found, server process 560 retrieves it, as indicated by arrow 612, for further processing. When the user selects the weather channel, the SHTML file in Table 3 is selected. As discussed above, the SHTML file includes SSI statements that cause the server to retrieve data (as specified by tag values) from the database 564 and contains markup formatting information and may also include javascript and CGI commands and further URLs for additional data and image entities. In other words, the SHTML file is effectively a template for a page of information, similar to an HTML page, to be displayed to the user.

Thin server process 560 processes the SHTML file by identifying each of the tag values in the SHTML file and retrieving a corresponding object from the XML database 564 through a server side include (SSI), represented here as arrow 620. The data for each object, such as text, or an index referencing the object, such as a URL for an image, is retrieved from the XML database 564, represented by arc 622, and inserted into the corresponding portion of the SHTML template.

For example, the SHTML file of Table 3 above includes the following SSI command line: #exec cmd= "GetXMLPCData Content/Weather/Primary/Current/Conditions". This instructs the thin server process 560 to execute the function GetXMLPCData in order to get the data located in directory location Content/Weather/Primary/Current/Conditions in XML database 564. The other SSI commands in Table 3 are similarly processed to obtain the corresponding data object from XML database 564. As is understood by one of skill in the art, when alternative well-known database implementations are used, the SSI statement would conform to that database management implementation.

When all the SSI commands in the SHTML template have been executed and the data retrieved from the XML database 564, then the completed SHTML file, which is, at this point, effectively an HTML document, is forwarded to HTML browser 570 for further processing, as indicated by arc 630.

Also included in architecture 500 of FIG. 11 is HTML browser 570, which is configured to render the completed SHTML file, which is effectively an HTML document, into a display page for output to the user via display driver 530. As noted above, thin server process 560 executes the SSI to insert objects into the SHTML file. However, some SSIs may be resolved into an index to an object, such as a URL to an object in XML database 564, which may require further processing by the browser. That is, when HTML browser 570 encounters such an index or URL, it sends an http "get" request 632 containing the index to server process 560.

In response, server process 560 resolves the index to an object in XML database 564, represented by arc 640, and retrieves the object, represented by arc 642. The object, such as a gif file or graphical object, is returned to HTML browser 570 in an HTTP response, which is represented by arc 650.

Similarly, some SSIs may be resolved into other browser-oriented commands, such as a URL containing a Common Gateway Interface (CGI) call, or a hyperlink to another html page. The html page may be a static html page or another template-based document related to that channel. When HTML browser 570 encounters such an index, it sends an http "get" request 632 typically containing a URL (which may contain a cgi call) to server process 560.

The processing performed by browser 570 is essentially the same as is performed conventionally, except that the server process 560 resides on the client device and not on a remote server. Once HTML browser 570 has performed a get to retrieve the object for each index reference found in the completed SHTML document, it finishes rendering the page and outputs it to the user display through the OS, as represented by arc 660.

Each time the channel selection of the user changes, the process above is repeated using the newly selected channel ID value to obtain the SHTML file for the selected channel.

Figure 1:
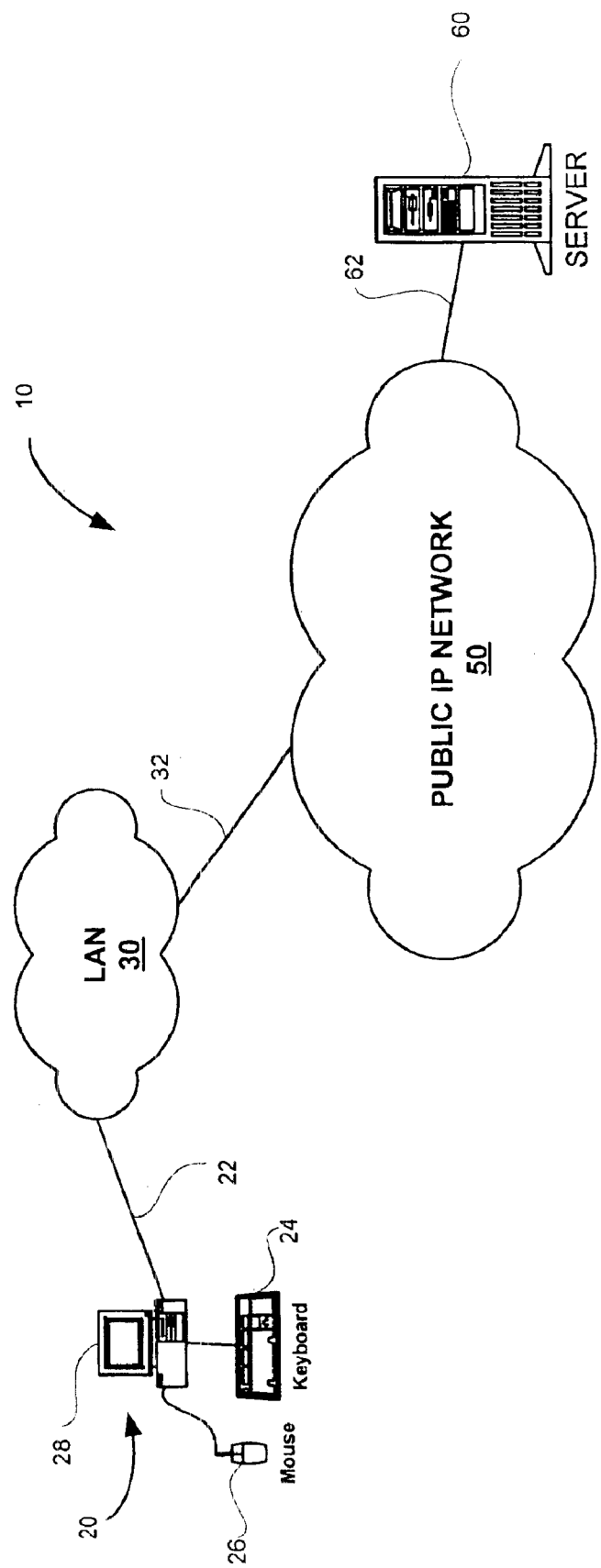
FIG. 1 is a functional block diagram illustrating an example of a conventional architecture for communication of a client device with a server connected to a public IP wide area network, where the client communicates through a LAN also connected to the IP network.
Figure 2:
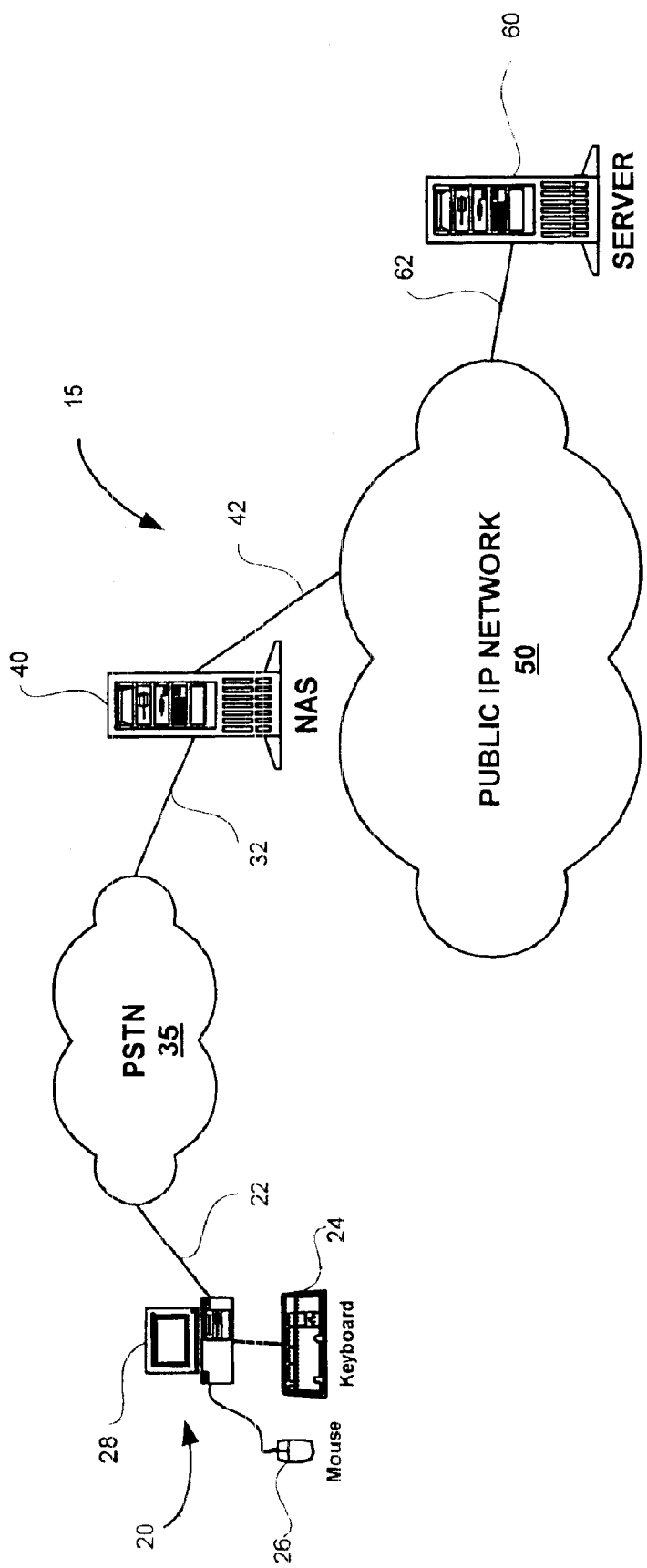
FIG. 2 is a functional block diagram illustrating another example of a conventional architecture for communication of a client device with a server connected to a public IP wide area network, where the client communicates through a public switched telephone network to a network access server also connected to the IP network.
Figure 3:
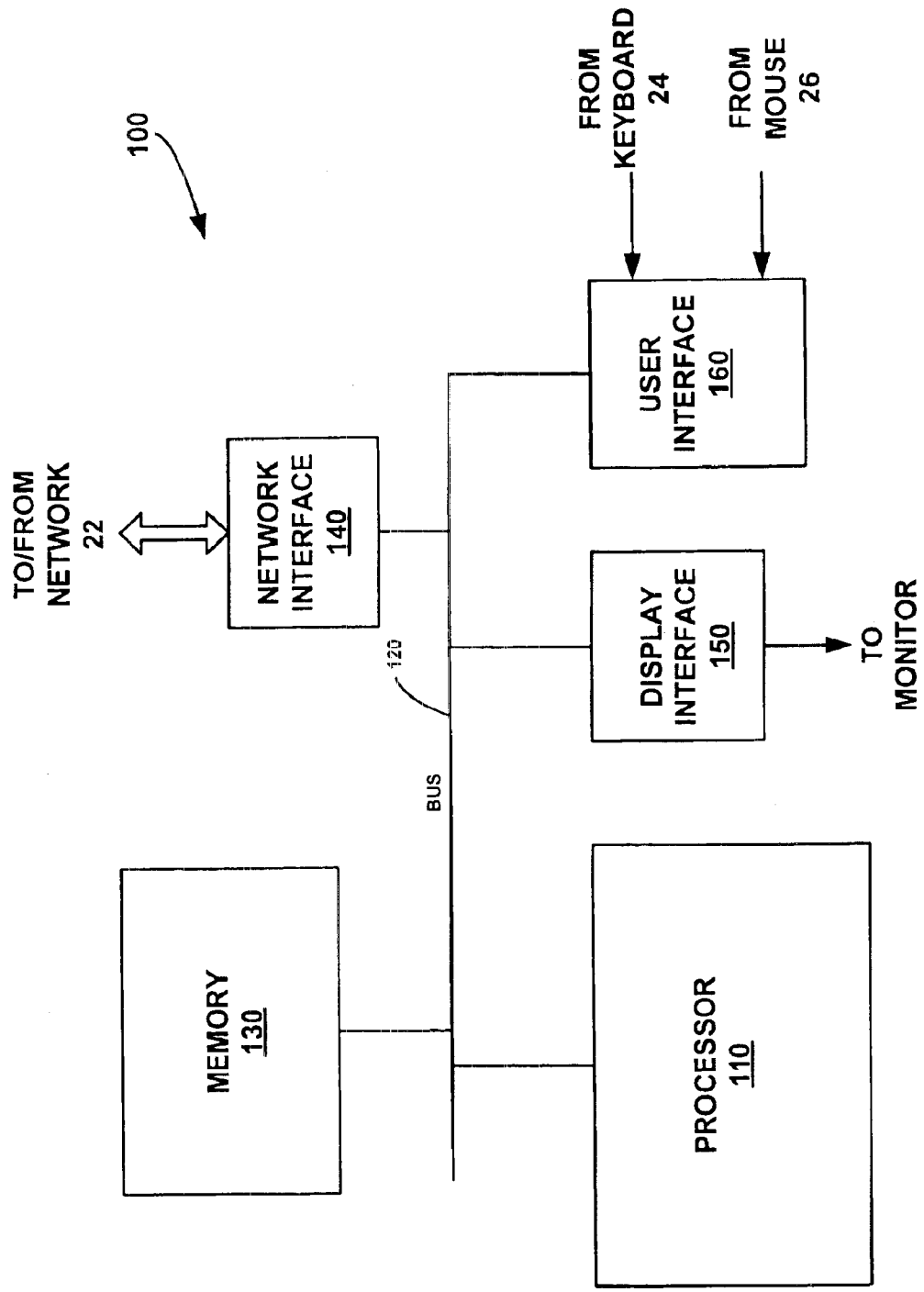
FIG. 3 is a functional block diagram illustrating an example of a client system architecture for the client device of FIGS. 2 and 3.

As noted above, the processing performed by server process 560 is similar to the processing performed by a conventional server, such as server 60, in response to an HTMP request from a conventional client, such as client 20 of FIGS. 1 and 2. The server 60 receives the HTTP request with a URL value for a resource accessible via server 60 and constructs an HTML document containing information corresponding to the URL value. Server 60 constructs the HTML document by performing server-side-includes (SSIs) to obtain the data needed for various parts of the HTML document. The SSIs can be used to obtain data entities for inclusion in the HTML document. The HTML document is then returned to the client device where the HTML document is rendered by a browser application residing at the client device.

Through the combination of templates, e.g. SHTML files, that reference common data objects, e.g. data in XML database 564, and a thin server process, the present invention may function as an efficient mechanism for providing user interface in a client device. For example, applications may be implemented by providing an SHTML file for each application and storing data in the XML database for the application. In this case, each application effectively utilizes the same user interface program, thereby saving the storage space that would otherwise be required to implement a user interface for each application, which reduces the memory footprint for the client device. This approach also simplifies the process of developing applications and channels because the user interface is already provided for other applications and channels. Also, the present invention makes efficient use of memory and bandwidth because, unlike a conventional HTML browser that requires that an entire HTML page of content data and mark-up be downloaded for each user access, only the content data needs to be updated in the XML database 564. Formatting formatting and mark-up information need not be downloaded for each access and may instead be downloaded automatically during periods of low usage, e.g. late at night, as described below.

As was mentioned above, the data content of XML database 564 is provided by a remote server. The data in XML database 564 must be periodically updated to maintain its currency. In addition, the files for the channels for channel selection application 402 may be periodically updated to change the content and appearance of the channel and to add channels.

XML update process 580 maintains the data objects in XML database 564. Update process 580 periodically establishes a connection to a server device, such as server 60, and requests update for the objects in XML database 564. This is accomplished by, for example, sending an HTTP message containing a URL value to a remote server having a content providing process that is configured to use the same DTD as the user application for a given channel. Thus, updated XML documents are retrieved in response to an HTTP request to one or more URLs as specified in the channel definition for the given channel. For example, in the update XML package of Table 4, a URL is defined for the information relating to a primary location indicated by the user's preferences. The URL, in this case, is stored in the database as the <URL> tag value "http://www.Weather.com/voxml/3comus", to which an HTTP request is sent to obtain an XML document containing the weather information for the primary location.

In response to the HTTP request from the update process in the client device, the remote server corresponding to the URL of the HTTP request retrieves the data objects for the request and constructs an XML data document for return to the client update process. The remote server may have its own SHTML template corresponding to the requested URL and, using the tag values from this SHTML template, the remote server performs an SSI with the tag to retrieve the latest version of a data object from a content database accessible from the remote server. The remote server incorporates the current data object for the tag value along with the tag itself in the XML data document sent in the reply to the update process 580 in the client device.

By executing the update process 580 periodically (every 10 minutes, for example) the data for each of the channels and applications in the client device may be made accessible to the user without the need for a connection to the server. The update process 580 may also be adapted to periodically check for updates to the DTD files for the various channels and applications in the client device.

The update process may be further configured to update different types of data at different intervals depending upon the nature of the data. For example, stock quote data may be updated every five minutes, weather data updated hourly, and movie schedules updated weekly. In addition, if a certain type of data changes at known intervals, then the update process may be configured to update the data relative to those intervals, e.g. movie schedules change on Thursday, so the movie channel information is updated on Thursdays. The user may also be provided the opportunity to specify when data is updated, e.g. a user may wish to select that stock quote data be updated every ten minutes and weather data updated every three hours.

The update process may also be configured to perform updates depending upon the communications technology employed by the client device. For example, if the client device uses a modem to communicate over a household telephone line, then the update process may be configured to perform certain update operations late at night or at other times when the household telephone line is typically not in use. Whereas a client device having a high-speed broadband connection, such as through a DSL or cable modem, may perform updates more frequently and with less concern for competing uses.

To perform an update, XML update process 580 accesses package files, residing in package store 582 for each channel or application. Table 4 below is an example illustrating the package file for the weather channel discussed above.

TABLE 4

Update XML package

```
<?xml version="1.0"?>
<!DOCTYPE Channel SYSTEM "./Channel.dtd">
<Channel _ID="Weather" _Version="08.07.2000.10.45">
    <Image _ID="Graphic" _Type="Graphic" _Format="gif" Orientation="Landscape" Height="104" Width="78" ScalePercent="100"
_Source="http://www.vs.aparato.net/demo/Weather/Weather.gif" _Cache="True"/>
    <Image _ID="Icon" _Type="Graphic" _Format="gif" Orientation="Landscape" Height="90" Width="33" ScalePercent="100"
_Source="http://www.vs.aparato.net/demo/Weather/WeatherIcon.gif" _Cache="True"/>
    <Description>The Weather Channel</Description>
    <Archive _ID="Template" _Type="Archive" _Format="tar"
_Source="http://www.vs.aparato.net/demo/Weather/template.tar" _Cache="True"/>
    <URLs>
        <Package _Source="http://www.vs.aparato.net/cgi-bin/Weather_channel_update.cgi"
_Cache="False"/>
        <UpdateTable _Type="Table">
            <Update _ID="AW1">
                <URL>http://www.Weather.com/voxml/3comus</URL>
                <Description>Weather forecast for primary location</Description>
                <Days>All</Days>
                <Times>All</Times>
                <Timezone/>
                <DTDpath>Weather/Primary</DTDPath>
            </Update>
            <Update _ID="AW2">
                <URL>http://www.Weather.com/voxml/3comus</URL>
                <Description>Weather forecast for alternate location 1</Description>
                <Days>All</Days>
                <Times>All</Times>
                <Timezone/>
                <DTDPath>Weather/Alt1</DTDPath>
            </Update>
            <Update _ID="AW3">
                <URL>http://www.Weather.com/voxml/3comus</URL>
                <Description>Weather forecast for alternate location 3</Description>
                <Days>All</Days>
                <Times>All</Times>
                <Timezone/>
```

TABLE 4-continued

Update XML package

```
        <DTDPath>Weather/Alt2</DTDPath>
      </Update>
      <Update _ID="AW4">
        <URL>http://www.Weather.com/voxml/3comus</URL>
        <Description>Weather forecast for alternate location 4</Description>
        <Days>All</Days>
        <Times>All</Times>
        <Timezone/>
        <DTDPath>Weather/Alt3</DTDPath>
      </Update>
    </UpdateTable>
  </URLs>
  <Preferences>
    <Applet _Type="Applet" _Format="html"
_Source="http://www.vs.aparato.net/demo/Weather/prefs.shtml" _Cache="True"/>
    <Global/>
    <PreferenceTable _Type="Table">
      <Preference _ID="AW1">
        <Enabled>Yes</Enabled>
        <UrlSuffix/>
        <Options>place=^ZIP</Options>
      </Preference>
      <Preference _ID="AW2">
        <Enabled>No</Enabled>
        <UrlSuffix/>
        <Options/>
      </Preference>
      <Preference _ID="AW3">
        <Enabled>No</Enabled>
        <UrlSuffix/>
        <Options/>
      </Preference>
      <Preference _ID="AW4">
        <Enabled>No</Enabled>
        <UrlSuffix/>
        <Options/>
      </Preference>
    </PreferenceTable>
  </Preferences>
</Channel>
```

The update XML package in Table 4 is received by the client device and is parsed and stored by the parser application, specifies the channel configuration information for the weather channel example described above. The package is configured according to a channel.dtd shown below in Table 5, as indicated by the DOCTYPE declaration toward the beginning of the file.

TABLE 5

Channel.dtd

```
<!--
    Import the ErgoTypes element/attribute/entity definitions.
-->
<!ENTITY % ErgoTypesDTD SYSTEM "./ErgoTypes.dtd">
%ErgoTypesDTD;
<!--
    Import the TrackingData element definitions.
-->
<!ENTITY % TrackingDataDTD SYSTEM "./TrackingData.dtd">
%TrackingDataDTD;
<!--
    Import the Media element/attribute/entity definitions.
-->
<!ENTITY % MediaDTD SYSTEM "./Media.dtd">
%MediaDTD;
<!-- The channel's (brief) description -->
<!ELEMENT Description   (#PCDATA)>
<!ELEMENT Package       EMPTY>
```

TABLE 5-continued

Channel.dtd

```
<!ATTLIST Package
    %URLEnt;
>
<!-- The channel's tracking upload URL -->
<!ELEMENT Tracking      EMPTY>
<!ATTLIST Tracking
    %URLEnt;
>
<!ELEMENT URL           (#PCDATA)>
<!--
    Format for Days is a "|"-separated list of days on which updates
    should occur. i.e. "Sun"|"Mon"|"Tues"|"Wed"|"Thu"|"Fri"|"Sat"
    or "All".
-->
<!ELEMENT Days          (#PCDATA)>
<!--
    Format for Times is a "|"-separated list of times on which updates
    should occur. The soonest scheduled update after the specified
    time is when the update should occur. Times should be in order,
    and the format for a time entry is HHMM, where HH ranges from
    "00" to "23" and MM ranges from "00" to "59". The string "All"
    can be specified to indicate that every update opportunity should be
    used.
-->
<!ELEMENT Times         (#PCDATA)>
<!--
    The Timezone element can be empty (if the Days and Times elements
    are both "All"), can be set to 'Z' or 'z' if the update times are
```

TABLE 5-continued

Channel.dtd

```
    maintained as UTC, or for any other timezone, the format is
    <STD>[<DST>[,<RULE>]] where:
    the format of <STD> and <DST> is:
        [+-]HH[:MM[:SS]]
    the format of <RULE> is:
        <START>[/<TIME>],<END>[/<TIME>]
    <STD> and <DST> represent (respectively) the value in hours,
    minutes and seconds that must be added to the values in the Times
    element to arrive at UTC. If a '-' is present, the time zone is east of
    the Prime Meridian, otherwise it is west of the Prime Meridian. HH
    ranges from "00" to "24", MM and SS (if present) from "00" to
    "59". If <DST> is not present, then Daylight Savings (Summer)
    Time is not observed.
    <RULE> encodes when the changes to/from daylight savings time
    occur.
    <START> specifies the day the change to summer time happens.
    <END> specifies the day the change to standard time occurs.
    <TIME> specifies the time the change to/from summer time happens.
    the format of <START> and <END> consist of one of the following:
        J<n> - the Julian day <n> (1 <= <n> <= 365). Leap days
        are not counted and cannot be referenced.
        <n> - the zero-based Julian day (1 <= <n> <= 365). Leap
        years are counted and can be referenced.
        M<m>.<n>.<d> - the <d>th day (0 <= <d> <= 6) (day 0 is
        Sunday) of the <n>th week (1 <= <n> <= 5) of the <m>th
        month (1 <= <m> <= 12) of the year. If <n> equals 5, it
        references "the last <d> day in month <m>, which may occur in
        either the 4th or 5th week. Week 1 is the 1st week in which the
        <d>th day occurs.
    the format of <TIME> is:
        HH[:MM[:SS]]
    where the legal values for HH, MM and SS are the same as for
    <STD> and <DST> (above).
    The default for <RULE> when not set (and when <DST> is
    specified) is:
        M4.1.0/02:00:00,M10.5.0/02:00:00
    which translates to daylight savings time starts on the first Sunday
    of April at 2:00 AM and ends on the last Sunday of October at 2:00
    AM.
-->
<!ELEMENT Timezone       (#PCDATA)>
<!--
    DTDPath specifies the DTD sub-hierarchy that will be refreshed.
    May be '.' to indicate the channel's top level.
-->
<!ELEMENT DTDPath        (#PCDATA)>
<!--
    The _ID of an Update element must match the _ID of a
    Preference element from the PreferenceTable.
-->
<!ELEMENT Update (URL, Description, Days, Times, TimeZone,
DTDPath)>
<!ATTLIST Update
    _ID      CDATA       #REQUIRED
>
<!ELEMENT UpdateTable    (Update+)>
<!ATTLIST UpdateTable
    _Type    CDATA       #FIXED      "Table"
>
<!ELEMENT URLs (Package, Tracking?, UpdateTable)>
<!ELEMENT Global (#PCDATA)>
<!ELEMENT Enabled   (#PCDATA)> <!-- Valid values: "Yes"|"No" -->
<!ELEMENT UrlSuffix     (#PCDATA)>
<!ELEMENT Options(#PCDATA)>
<!--
    The _ID of a Preference element must match the _ID of a
    Update element from the UpdateTable.
-->
<!ELEMENT Preference     (Enabled, UrlSuffix, Options)>
<!ATTLIST Preference
    _ID      CDATA       #REQUIRED
>
!ELEMENT PreferenceTable       (Preference+)>
<!ATTLIST PreferenceTable
    _Type    CDATA       #FIXED      "Table"
>
<!--
    Applet MUST have:
        "_Format" & "_Source" set, and
        "_Cache=True"
-->
<!ELEMENT Preferences    (Applet, Global, PreferenceTable)>
<!--
    Channel configuration.
    First Image element MUST have:
        "_ID=Graphic",
        "_Format" & "_Source" set, and
        "_Cache=True"
        "Orientation", "Height", "Width"
        and "ScalePercent" are recommended
    Second Image element MUST have:
        "_ID=Icon",
        "_Format" & "_Source" set, and
        "_Cache=True"
        "Orientation", "Height", "Width"
        and "ScalePercent" are recommended
    Archive MUST have:
        "_ID=Template"
        "_Format" & "_Source" set, and
        "_Cache=True"
-->
<!ELEMENT Channel (
    Image+,
    Description?,
    Archive?,
    URLs?,
    Preferences?,
    TrackingData?
)>
<!ATTLIST Channel
    _ID         CDATA      #REQUIRED
    _Version    CDATA      #REQUIRED
>
```

Note that the Channel.dtd file of Table 5 also references a TrackingData.dtd, which defines a structure for tracking user access to advertisements accessed by a user of the client device, and a Media.dtd, which defines a structure for downloading advertisements and media clips to the client device. These are shown as Tables 6 and 7, respectively.

TABLE 6

TrackingData.dtd

```
<!--
    SystemDataList specifies name-value pairs that will be collected
    and returned as part of the tracking upload. The "Name" is the
    "_ID" attribute and the "Value" is the corresponding #PCDATA.
    "Variables" can be specified (e.g. to retrieve the IP address).
    The "Values" representing "Variables" should be empty when the
    channel configuration is downloaded and will be filled in by the
    system during the upload process.
-->
<!ELEMENT Value                (#PCDATA)>
<!ATTLIST Value
    _ID      CDATA       #REQUIRED
>
<!ELEMENT SystemDataList       (Value*)>
<!ATTLIST SystemDataList
    _Type    CDATA       #FIXED      "List"
>
<!--
    Format for a hit is the same as TimeStampEnt (UTC).
    _ID attribute maps each hit to a particular _TrackId.
    The HitList should be empty when the channel configuration is
    downloaded and will be filled in by the system during use.
```

TABLE 6-continued

TrackingData.dtd

```
-->
<!ELEMENT Hit          (#PCDATA)>
<!ATTLIST Hit
    _ID     CDATA      #REQUIRED
>
<!ELEMENT HitList (Hit*)>
<!ATTLIST HitList
    _Type   CDATA      #Fixed "List"
>
<!ELEMENT TrackingData (SystemDataList, HitList)>
```

TABLE 7

Media.dtd

```
<!--
    Used for the duration of audio and video clips,
    specified in HHMM[SS] format.
-->
<!ELEMENT Duration     (#PCDATA)>
<!ELEMENT Caption(#PCDATA)>
<!ELEMENT Copyright    (#PCDATA)>
<!ELEMENT Header (#PCDATA)>
<!ELEMENT Headline     (#PCDATA)>
<!ELEMENT Summary      (#PCDATA)>
<!ELEMENT Credit (#PCDATA)>
<!--
    If the element "Text" will contain HTML, it must be enclosed
    within a CDATA section to prevent parser errors.
-->
<!ELEMENT Text         (#PCDATA)>
<!ELEMENT Byline (#PCDATA)>
<!ATTLIST Byline
    _ID     CDATA      #REQUIRED
>
<!ELEMENT BylineList   (Byline+)>
<!ATTLIST BylineList
    _Type   CDATA      #FIXED     "List"
>
<!ELEMENT Dateline     EMPTY>
<!ATTLIST Dateline
    City    CDATA      #IMPLIED
    Country CDATA      #IMPLIED
    %DateEnt;
>
<!ELEMENT TextBlock (Text?, Header?, BylineList?, Copyright?,
Dateline?, Credit?)>
<!ATTLIST TextBlock
    _ID     CDATA      #REQUIRED
    _Format (
            html |
            plain
    ) "html"
    %URLEnt;
    %TimeStampEnt;
>
<!ELEMENT Image (Caption?, BylineList?, Copyright?, Dateline?,
Credit?)>
<!ATTLIST Image
    _ID     CDATA      #REQUIRED
    _Type   CDATA      #FIXED     "Graphic"
    _Format (
            bmp |
            gif |
            jpeg |
            tiff
    ) "gif"
    Orientation (
            Portrait|
            Landscape
    ) "Portrait"
    Height      CDATA  #IMPLIED
    Width       CDATA  #IMPLIED
    ScalePercent CDATA #IMPLIED
```

TABLE 7-continued

Media.dtd

```
    %URLEnt;
    %TimeStampEnt;
>
<!ELEMENT AudioClip (Caption?, Duration?, BylineList?, Copyright?,
Dateline?, Credit?)>
<!ATTLIST AudioClip
    _ID     CDATA      #REQUIRED
    _Type   CDATA      #FIXED     "Audio"
    _Format (
            au |
            mp3 |
            ra |
            wav
    ) "ra"
    %URLEnt;
    %TimeStampEnt;
>
<!ELEMENT VideoClip (Caption?, Duration?, BylineList?, Copyright?,
Dateline?, Credit?)>
<!ATTLIST VideoClip
    _ID     CDATA      #REQUIRED
    _Type   CDATA      #FIXED     "Video"
    _Format (
            mov |
            mp1 |
            mp2 |
            swf
    ) "swf"
    %URLEnt;
    %TimeStampEnt;
>
```

The XML package file includes a value for the attribute _ID of the Channel tag, e.g. _ID=Weather, that identifies the channel being updated as the Weather channel. Further, the _Version attribute of the Channel tag, e.g. _Version=08.07.2000.10.45, identifies the version of the channel. When update process 580 performs an update, it first sends an HTTP request to the remote server indicated by the URL value contained in the tag "Package Source=http://ww.vs.aparato.net/cgi-bin/Weatherchannelupdate.cgi", where the HTTP request includes the values for the _ID and _Version attributes. The remote server will check the version value for the channel against the latest version that the remote server possesses.

If the remote server has a newer version for the channel, then a new update XML file for the channel will be downloaded in place of the old version and the upper portion of the new XML file is executed. Using the example of Table 4, an Image tag for a graphical image, e.g. _ID=Graphic, for use in the preview area 350 of the client device 320, see FIG. 7, is downloaded from the source identified by "Image Source", e.g. http:/lwww.vs.aparato.net/demo/Weather/Weather.gif, and the gif file returned from the remote server is cached (_Cache=True). Similarly, an icon (_ID=Icon) for use with a graphical user interface (GUI) is also downloaded and cached. Further, a new SHTML template file (_ID=Template) is downloaded and archived to the template store 562 for subsequent access by thin server process 560.

The update process then proceeds in the same manner as if the package update file had been current. The UpdateTable is processed by requesting data for the primary location, since it is the only enabled preference.

The update process will include a DTDPath value (Weather/Primary) with the update request that will identify the root directory to be used in storing the updated files for the channel as they are parsed from a document received from the remote server. Each URL used to retrieve content from a remote server has a DTD path that provides a unique name space within the XML database 564. The Preference __ID=AW1 is sent to the remote server indicated by Package __Source and the value of ZIP is automatically appended to the source CGI script. A similar CGI script would be processed for each of the other preferences having the tag Enabled set to "Yes".

In response to the update request from update process 580, the remote server will construct an XML data document containing the requested data and return the XML data document to the client device. Table 8 below illustrates an example of a response.

TABLE 8

XML data document

```
<?xml version="1.0"?>
<Weather __Version="0.2" Partner="Weather.com">
  <Locale>ROLLING MEADOWS</Locale>
  <PrettyDayTime>5:40 PM CDT</PrettyDayTime>
        <Day __ID="Current" Date="20000816">
    <DayName>Today</DayName>
       <Conditions wxcode="01">SUNNY</Conditions>
    <Temperature unit="F">  73 </Temperature>
    <RealFeel unit="F">  72 </RealFeel>
    <Pressure unit="INHG"> 30.18 </Pressure> <!-- inches mercury-->
    <Windspeed unit="MPH">  10 </Windspeed>
    <Wind_from> East northeast </Wind_from>
    <Pollen>Low</Pollen>
    <Airquality>Good</Airquality>
<Ad __ID="Ad1" __Type="Graphic" __Format="gif" __Cache="True"
__Source="http://ad.doubleclick.net/ad/Weather.com/Weather;in=home;
pg=home;sz=468x60;tile=2;ord=81673"
__TrackID="2343987">
http://ad.doubleclick.net/jump/Weather.com/Weather;in=home;pg=home;
sz=468x60;tile=2;ord=81673
</Ad>
        </Day>
   <Day __ID="Day 1.1" Date="20000816">
     <DayName>TODAY</DayName>
     <Conditions wxcode="01">SUNNY</Conditions>
     <High unit="F">78</High>
     <Low unit="F">64</Low>
   </Day>
    <Day __ID="Day1.2" Date="20000816">
      <DayName>TONIGHT</DayName>
      <Conditions wxcode="42">Thunderstorms overnight</Conditions>
      <Low unit="F">64</Low>
   </Day>
    <Day __ID="Day2" Date="20000817">
      <DayName>THURSDAY</DayName>
      <Conditions wxcode="15">Cloudy, thunderstorms;
      breezy</Conditions>
      <High unit="F">79</High>
      <Low unit="F">60</Low>
   </Day>
    <Day __ID="Day3" Date="20000818">
      <DayName>FRIDAY</DayName>
      <Conditions wxcode="03">Partly sunny;
      breezy early</Conditions>
      <High unit="F">76</High>
      <Low unit="F">54</Low>
   </Day>
    <Day __ID="Day4" Date="20000819">
      <DayName>SATURDAY</DayName>
      <Conditions wxcode="03">Partly sunny; breezy later</Conditions>
      <High unit="F">70</High>
      <Low unit="F">53</Low>
   </Day>
    <Day __ID="Day5" Date="20000820">
      <DayName>SUNDAY</DayName>
      <Conditions wxcode="03">Partly to mostly sunny</Conditions>
      <High unit="F">67</High>
      <Low unit="F">56</Low>
   </Day>
<Copyright><![CDATA[Copyright Weather, Inc. 2000]]></Copyright>
</Weather>
```

When update process 580 receives the XML data document from the remote server, it passes the XML data document to XML parser 584. In this embodiment, XML parser 584 is a non-validating parser. In other words, XML parser 584 simply parses the contents of the XML data document based on the tags found in the data document and does not verify the structure of the document. As a result, if a poorly formed XML data document is received, e.g. one containing extraneous data, then the parser 584 will create a directory structure containing the extraneous data. However, if the remote server does not construct the XML data document in sufficient conformance with the SHTML file for the channel, then it may not be possible for thin server process 560 to populate some portions of the SHTML file. In other words, the SHTML file for the channel indicates, in the context of the get commands, where to find certain data objects in the XML database 564. If the remote server does not construct the XML data document such that the data object is stored at the location indicated by the SHTML file, then the data object cannot be retrieved.

With respect to Table 8, for example, XML parser 584 will create a directory structure under a predetermined root directory, e.g. ContentlWeather/Primary, that includes a Locale subdirectory that contains files having the text "ROLLING MEADOWS" obtained from the Locale tag in the document. Preferably, each tag from the XML data document corresponds to a directory and the files within the directory are named attributes and .pcdata, where the attributes file contains the data for each attribute of a tag and . pcdata contains the data for the tag itself. For example, the tag <Conditions wxcode="01">SUNNY</Conditions> in Table 8 will cause parser 584 to place the text "wxcode=01" into a attributes file and the text "SUNNY" in a .pcdata file in the subdirectory /Conditions.

Furthermore, for tags representing subelements, where there can be a number of similar subelements, the directories are named using the __ID attribute of the element rather than the exact name of the subelement. This allows multiple instances of the same type of data object to be created without causing the parser to overwrite data objects.

Thus, when the parser encounters the tag, <Day __ID="Current" Date="20000816">, the parser will create a subdirectory called "Current" within the "Weather" directory, based on the value for __ID. The parser then creates child directories under the "Current" subdirectory entitled "Dayname" (with the text "Today" stored in the .pcdata file), Conditions (with wxcode="01" in the attributes file and the text "SUNNY" stored in the pcdata file), Temperature (with unit="F" in the .attributes file and the text "73" stored in the pedata file), Pressure (with unit="INHG" in the .attributes file and the text "30.18" stored in the .pcdata file), Windspeed (with unit="MPH" in the .attributes file and the text "10" stored in the .pcdata file), Wind_from (with the text "East northeast" stored in the .pcdata file), Pollen from (with the text "Low" stored in the .pcdata file), and Airquality (with the text "Good" stored in the .pcdata file). The parser will continue processing to similarly parse and store the remainder of the document.

The XML parser may also be configured to retrieve additional data, such as image data. For example, Table 8 above identifies an Ad tag as follows:

```
<Ad _ID="AD1" _Type="Graphic" _Format="gif" _Cache="True"
_Source="http://ad.doubleclick.net/ad/Weather.com/Weather;in=home;
pg=home;sz=468x60;tile=2;ord=81673"
_TrackID="2343987">
http://ad.doubleclick.net/jump/Weather.com/Weather;in=home;pg=home;
sz=468x60;tile=2;ord=81673
</Ad>
```

The _ID="Ad1" attribute causes the XML parser 584 to create a subdirectory /Content/AccuWeather/Primary/Current/Ad1. The _Source attribute identifies a URL value where the advertisement may be recovered. Using the source URL, XML parser 584 will retrieve the advertisement from the remote server indicated by the URL. Since _Cache="True", the advertisement will be stored in the /Ad1 subdirectory as a gif file, since _Format="gif". The image for the advertisement may then be subsequently retrieved for display.

Note that while the embodiment discussed above is directed toward a directory structure for the XML database 564, other types of databases or data organizations may be adapted for use with the present invention. For example, XML database 564 may be implemented as a Structured Query Language (SQL) based database or a relational database. As yet another alternative, a flat file system may also be adapted for use.

As a further variation, XML data documents downloaded to the client device may be saved in the client device, e.g. as flat files, until needed by a channel or application. In this scenario, an XML data document is parsed at the time that a channel or application is selected that corresponds to the document. An application may also be configured to access the XML data document directly. In this case, the application operates in a manner similar to a full XML processor, reading and rendering the file in accordance with the XML standard into a form for display to the user.

Figure 13:
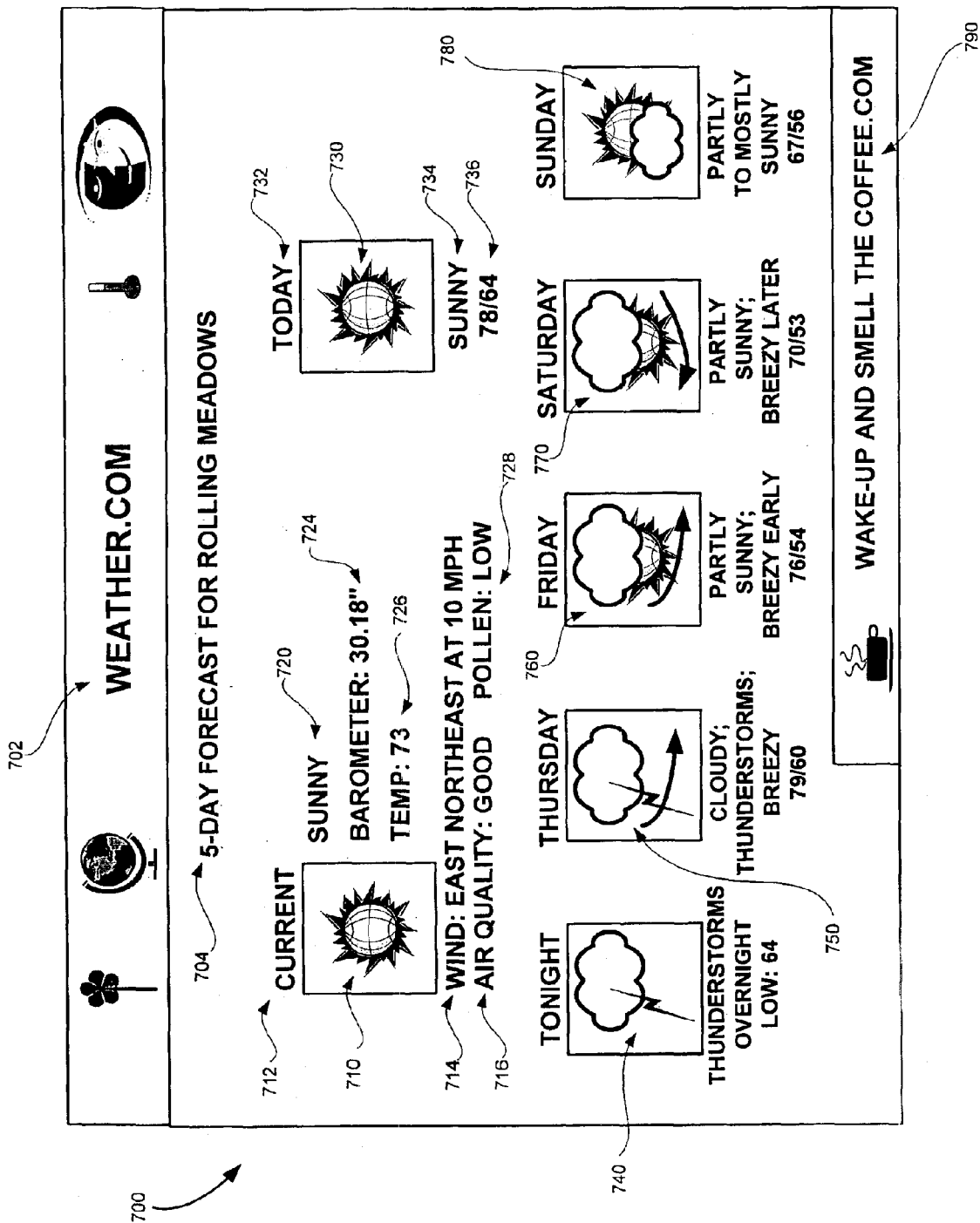
FIG. 13 illustrates an exemplary display page of a SHTML document after processing.

Subsequently, when the weather channel is selected, the thin server process 560 will populate the SHTML template of Table 3 with the data from the XML data document of Table 8 that was inserted into XML database 564. The SHTML document, after processing, is rendered, for example, into the display page 700 shown in FIG. 13.

Display page 700 includes an image logo 702 for the weather channel. The reference to the logo appears in Table 3 as the command line:

```
<!--#config cmdecho="ON" --> <!--#exec cmd="SetXMLPath/" --> <img
    border=0 height=60 src="logo.jpg" width=640>
``` which causes the thin server to retrieve the "logo.jpg" file for the display page.

The location for the forecast is then retrieved and appended to the text "5-DAY FORECAST FOR" by the processing for the SSI statement within the <td> tag in the following line:

```
<td colspan="3" height="40"><b><font color=#000066 face=Arial
size=+1>
    Weather® 5-DAY FORECAST FOR <!--#exec
    cmd="GetXMLPCData Content/Weather/Primary/Locale" --> </font>
    </b> </td>
``` which is processed in thin server 560 by retrieving the text in the .pcdata file with the Content/Weather/Primary/Locale directory in XML database 564 and inserting it after the text defined within the tag. As explained previously, an alternative embodiment utilizes a standard SQL-based database or other suitable database technology for storing and retrieving data for populating the SHTML templates. The resulting text is rendered and displayed as text 704 in display page 700.

The current conditions are then obtained for rendering. A gif file for a current conditions icon is obtained by the following line:

```
<td align=center> <img border=0 src="Icons/<!--#exec cmd=
"GetXMLAttribute Content/Weather/Primary/Current/Conditions
wxcode" -->/<!--#exec cmd="GetXMLAttribute
Content/Weather/Primary/Current/Conditions wxcode" -->.gif">
    </td>
```

The thin process 560 resolves the wxcode from the XML database 564 and inserts it into another "get" command line to indicate where to find the appropriate gif file in an "Icons" directory. Note that the XML document of Table 8 included a tag for conditions of: <Conditions wxcode="01">SUNNY</Conditions>. Thus, the value of wxcode attribute is 01 and, in this case, a sun icon stored as Icons/01/01.gif is retrieved and rendered in space 710. The current condition is obtained by resolving the tag: <td> <b> <font face=Arial> <!--#exec cmd="GetXMLPCData Content/Weather/Primary/Current/Conditions" -->, which results in the text SUNNY being retrieved from the .pcdata file in the "Conditions" child directory of the "Current" directory and displayed in space 720.

Similarly, the text in space 724 is obtained by resolving and rendering the tag: BAROMETER: <!--#exec cmd="GetXMLPCData Content/Weather/Primary/Current/Pressure" -->. And the text TEMP: 73 in space 726 is obtained by resolving and rendering the tag: TEMP: <!--#exec cmd="GetXMLPCData Content/Weather/Primary/Current/Temperature" -->. Recall that these values were parsed from the portion of the XML document of Table 8 that included the tagged values <Temperature unit="F"> 73 </Temperature> and <Pressure unit="INHG"> 30.18 </Pressure>.

The current wind conditions WIND: EAST NORTHEAST AT 10 MPH in space 714 are obtained by resolving the tag:

```
<td colspan=2> <b> <font face=Arial>WIND: <!--#exec
cmd="GetXMLPCData Content/Weather/Primary/Current/Wind_from"-->
    AT <!-#exec cmd="GetXMLPCData
Content/Weather/Primary/Current/Windspeed" -->MPH
    </font> </b> </td>
</tr>
```

Recall that the values for wind direction and wind speed were parsed from the portion of the XML document of Table 8 that included the tagged values <Wind_from> EAST NORTHEAST </Wind_from > and <Windspeed unit="MPH"> 10 </Windspeed>.

The air quality and pollen displayed in spaces 716 and 728, respectively, of display page 700 are obtained by resolving and rendering the following tags:

```
<tr> <!-- Current Air Quality/Pollen -->
    <td colspan=2> <b> <font face=Arial>AIR QUALITY: <i> <font color=#009900>
        <!--#exec cmd="GetXMLPCData Content/Weather/Primary/Current/Airquality" -->
        </font> </i> POLLEN: <i> <font color=#ff0000> <!--#exec cmd="GetXMLPCData Content/Weather/Primary/Current/Pollen" -->
        </font> </i> </font> </b> </td>
</tr>
```

Recall that the values for air quality and pollen were parsed from the portion of the XML document of Table 8 that included the tagged values <Airquality> GOOD </Airquality> and <Pollen> LOW </Pollen>.

Likewise, the information for TODAY is obtained by processing the following portion of the SHTML file:

```
<td align=middle width="25%">
    <table border=0 cellpadding=0 cellspacing=0>
        <tr>
            <td align=middle bgcolor=#ffffff> <font face=Arial size=-1> <b> TODAY
                </b> </font> </td>
        </tr>
        <tr> <!-- Today Forecast Icon -->
            <td align=middle> <img border=0 src="Icons/<!--#exec cmd="GetXMLAttribute Content/Weather/Primary/Day1.1/Conditions wxcode" -->/<!--#exec cmd="GetXMLAttribute Content/Weather/Primary/Day1.1/Conditions wxcode" -->.gif">
                </td>
        </tr>
        <tr> <!-- Today Forecast Conditions/Temperature -->
            <td align=middle bgcolor=#ffffff> <b> <font face=Arial size=-1> <!--#exec cmd="GetXMLPCData Content/Weather/Primary/Day1.1/Conditions" -->
                <br>
                <!--#exec cmd="GetXMLPCData Content/Weather/Primary/Day1.1/High" -->/<!--#exec cmd="GetXMLPCData Content/Weather/Primary/Day1.1/Low" -->
                </font> </b> </td>
        </tr>
    </table>
</td>
```

The text TODAY is rendered into space 732, the icon indicated by the Conditions wxcode for Day 1.1 is inserted into space 730, the current condition from Day1.1/Conditions is inserted into space 734, and the high and low conditions in space 736 are obtained from Day1.1/High and Day1.1/Low, respectively. Recall that the information for TODAY was obtained from the portion of the XML document related to Day_ID="Day 1.1" as follows:

```
<Day _ID="Day1.1" Date="20000816">
    <DayName>TODAY</DayName>
    <Conditions wxcode="03">SUNNY</Conditions>
    <High unit="F">78</High>
    <Low unit="F">64</LOW>
</Day>
```

Likewise, the information relating to TONIGHT (Day_ID="Day1.2") is displayed in connection with space 740, THURSDAY (Day_ID="Day2") is displayed in connection with space 750, FRIDAY (Day_ID="Day3") is displayed in connection with space 760, SATURDAY (Day_ID="Day4") is displayed in connection with space 770, and SUNDAY (Day_ID="Day5") is displayed in connection with space 780.

Further note that an advertisement may be included in space 790 and is populated by the following tag from the SHTML file:

```
<td width="520" height="60" align="center"><img border=0 height=60 src="ad.jpg" width=468>
    </td>
```

The advertisement was also provided in the XML data document of Table 8 as follows:

```
<Ad _ID="Ad1" _Type="Graphic" _Format="gif" _Cache="True"
_Source="http://ad.doubleclick.net/ad/Weather.com/Weather;in=home;
pg=home;sz=468x60;tile=2;ord=81673"
```

-continued

```
_TrackID="23439487">
http://ad.doubleclick.net/jump/Weather.com/Weather;in-home;pg=home;
sz=468x60;tile=2;ord=81673
</Ad>
```

Note that the <Ad tag identifies a URL as the Source attribute for the file for the advertisement and uses the _TrackID (having a unique identifier of 2343987 in this example), defined as an attribute of the Ad tag in the Advertisement.dtd of Table 9.

TABLE 9

Advertisement DTD

```
<!--
    Import the common Ergo element/attribute/entity definitions.
-->
<!ENTITY % ErgoTypesDTD SYSTEM "ErgoTypes.dtd">
```

TABLE 9-continued

Advertisement DTD

```
%ErgoTypesDTD;
<!ELEMENT Ad    (#PCDATA)><!--CDATA
                encapsulated "click-through" URL -->
<!ATTLIST Ad
    _ID     CDATA       #REQUIRED
    _Format (
        bmp |
        gif  |
        jpeg |
        tiff |
        mov  |
        mp1  |
        mp2  |
        swf
    ) "gif"
    Height      CDATA   #IMPLIED
    Width       CDATA   #IMPLIED
    ScalePercent CDATA  #IMPLIED
    %URLEnt;
    %TrackEnt;
>
<!ELEMENT Ads   (Ad+)>
```

Metrics may be maintained indicating each time that the advertisement was output to the user and this metric information may be uploaded to a remote server in connection with the _TrackID.

In the present invention, however, the server process resides in the client device 320 and can be used to provide a user interface for multiple channels and may be applied to multiple user applications. The architecture according to the present invention also permits data to be readily shared across applications.

For example, user application 520 may be configured to use server process 560 to provide a user interface in a manner similar to the way that the server process provides a user interface for channel selection application 402. When user application 520 is activated responsive to, for example, user input, the user application sends a message with template ID="b", for example, to server process 560 through OS 510. Server process 560 retrieves SHTML template "b" from template store 562. Server process 560 resolves the entities in SHTML template "b" by including data objects from XML database 564 identified by the tags in SHTML template "b". Once SHTML template "b" is completed, it is forwarded to HTML browser 570 for rendering into a page for output to the user, as described in greater detail above.

Note that multiple user applications may access the same data objects in XML database 564. If the templates for two different application SHTML templates contain the same tag value, then the same data object will be incorporated into the output for each application. Thus, multiple applications may readily share data from the XML database 564.

For example, if user application 520 is a calendar application that is configured to display the weather for the current day, then the current weather data obtained and stored in XML database 564 can be used by the calendar application. Continuing the example above, the calendar application can obtain the current weather conditions by obtaining the data at directory location Content/Weather/Primary/Current/Conditions. Likewise, if the current temperature is to be displayed, then the temperature data may be obtained from location Content/Weather/Primary/Current/Temperature. The calendar application, if structured to use the thin server 560, may obtain the data by doing a SSI "get" command. Alternatively, it may access the XML database 564 itself and provide its own user interface. So long as the calendar application is structured to look for specific data entities in the same predetermined location used by the weather channel and the remote server providing content to the weather channel, then the data may be shared.

In one alternative embodiment of the present invention, the channel templates, when rendered, may preferably include a user input area where a user may choose to add a downloaded event as a calendar entry to one or more user's databases, such as Palm databases, residing in the client device 320. The user input area provides a brief description of the event next to a calendar icon, with instructions that clicking on the icon will add the event to the users' calendar. The icon has an associated URL that includes a CGI query, wherein one of the CGI query parameters identifies the specific event. The thin server 560 processes the query by passing the XML data object representing the event to the calendar application. Alternatively, a pointer or directory location in XML database 564 for the XML data object for the event may be passed to the calendar application, which subsequently processes the XML data object into a calendar entry.

The calendar application preferably invokes an interpreter that reformats the XML data object into an object suitable for insertion into the selected user database or databases, e.g. reformat the XML data into a Palm calendar event object. The calendar application then invokes a "create new event" input screen using the event data. The user may then select which user database the event will be added to and the user may otherwise edit the entry details before accepting the event.

For example, an XML data object representing a sports event may be included in an XML data document, which contains data for a channel, sent from a remote server to the client device. The XML parser 584 parses the event data object from the data document and inserts it into XML database 564. When the channel is rendered, e.g. selected by the user for display, the event data object is displayed to the user and the user is prompted to select whether the event data object should be inserted into a user calendar database residing on the client device. If the user elects to have the event copied to a calendar database, then the calendar application is activated and prompts the user to indicate a selected calendar database or databases. After the user makes a calendar database selection, the event data object is reformatted, if necessary, and inserted into the selected calendar database or databases. Subsequently, the information from the sports event will appear in the selected calendar database or databases.

The client device according to the present invention may also be employed to synchronize with a personal information device (PID) or personal digital assistant (PDA), such as the Palm™ series of organizer devices available from Palm Computing or similar devices configured to store data. The Palm PID is further configured to synchronize with a database residing in another computer such as a personal computer (PC).

Figure 14:
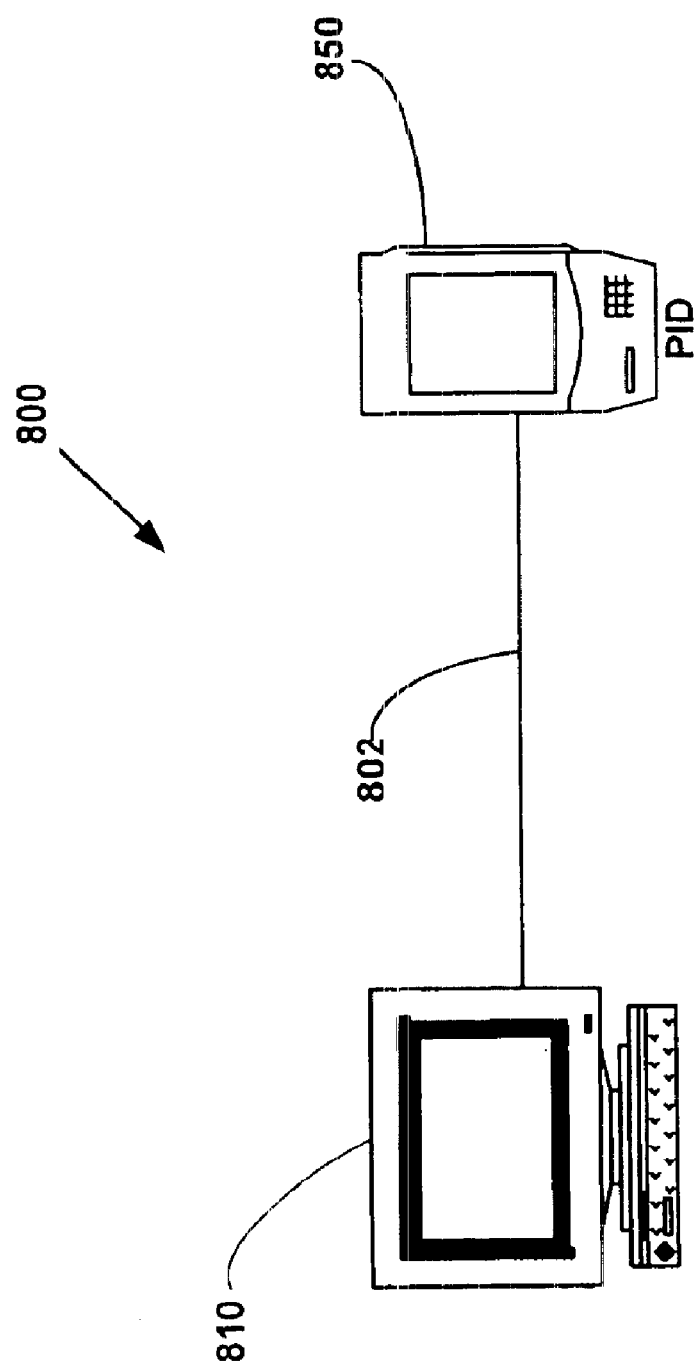
FIG. 14 is a diagram illustrating a PID device connected to a personal computer for the purpose of synchronizing data.

FIG. 14 illustrates an embodiment of an architecture 800 illustrating a PC 810 connected to a PID 850 via a connection 802. One example of how PC 810 is connected to PID 850 is through a cable connected to a serial communications port of the PC and to a port of the PID through a hotsynch cradle. Synchronization of data between the PC and the PID is preferably initiated by depressing a hotsynch button on the hotsynch cradle.

Figure 15:
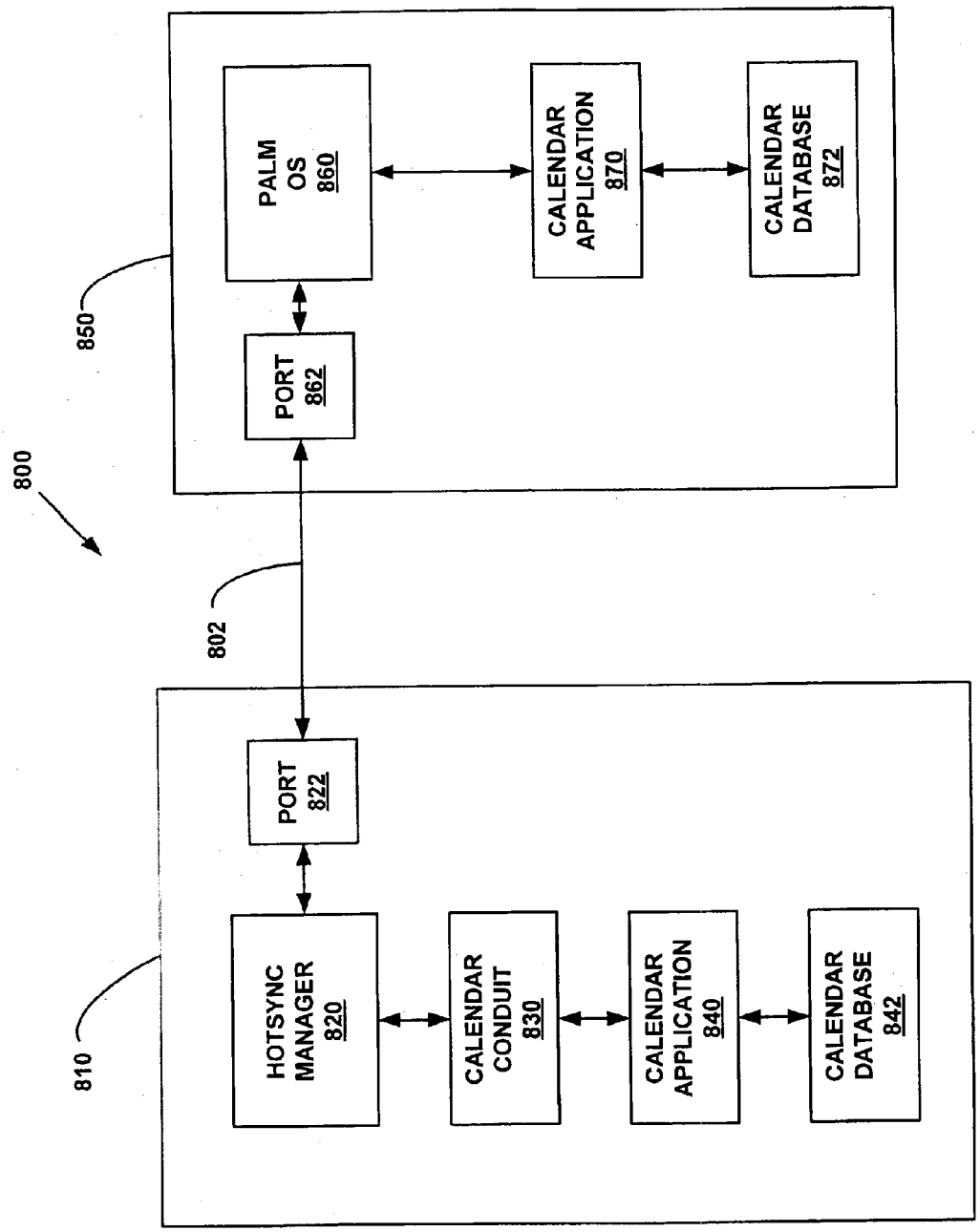
FIG. 15 is a functional block diagram illustrating an embodiment of a software architecture for synchronizing data between the PC and the PID of FIG. 14.

FIG. 15 illustrates an example of the software involved in a hotsynch operation. In prior art PC 810, a hotsynch manager 820 controls the process of synchronizing the PC with a PID. The hotsynch manager 820 executes in background and monitors serial communication port 822 for a signal to begin synchronization. When hotsynch manager 820 detects the signal, the manager calls each conduit that has been installed in the PC. A conduit is a plug-in module for the manager 820 that transfers a specific kind of data between the PC 810 and the PID 850. In the example of FIG. 15, hotsynch manager 820 activates calendar conduit 830 that transfers data for calendar application 840. Calendar conduit 830 synchronizes calendar database 842 with calendar database 872 used by calendar application 870 in PID 850.

Various aspects of the technology behind PIDs and synchronization of PID databases is set forth in U.S. Pat. Nos. 5,392,390; 5,727,202; 5,832,489; 5,884,323; 6,000,000; and 6,006,274, herein incorporated by reference.

Events are transferred in both directions between calendar databases 842 and 872, depending on the user's actions since the last synchronization session. For example, if the user has added an event to the calendar database 872, then the event will be copied into database 842.

The Palm operating system (OS) 860, or a similar OS, is configured to permit the transfer of data.

Synchronization of additional pairs of databases is accomplished by adding a conduit to PC 810 that is configured to synchronize the databases and adding it to the list of conduits to be activated by hotsynch manager 820.

Figure 16:
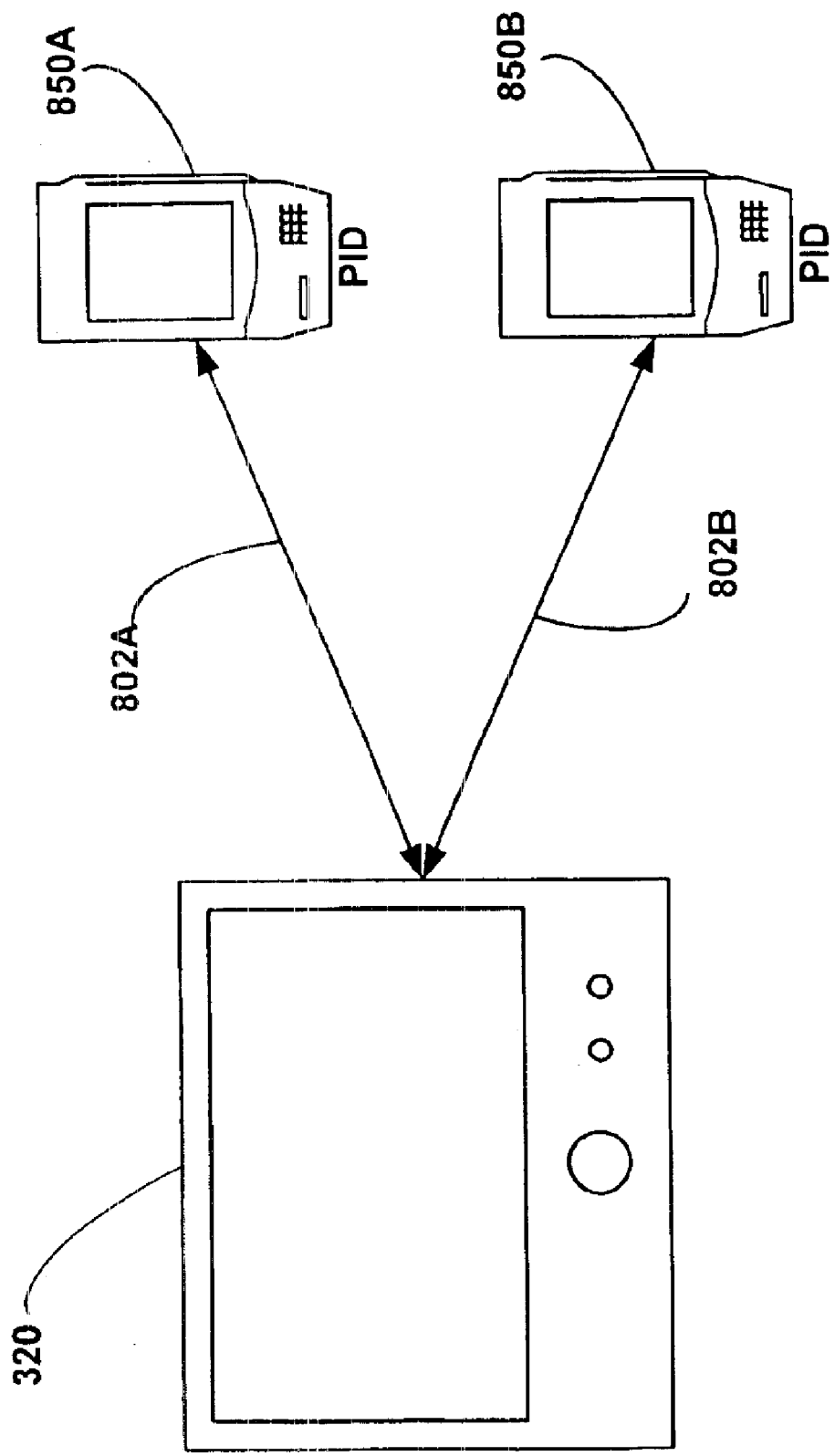
FIG. 16 is a diagram illustrating two PID devices that may be connected to an embodiment of the client device of the present invention for the purpose of synchronizing data.

The present invention is configured to support synchronization with multiple PID devices. FIG. 16 illustrates an example of synchronization of two PIDs to the client device of the present invention. In FIG. 16, a first PID 850A establishes a first connection 802A with the serial port, e.g. serial port 425 of FIGS. 8 and 10, of client device 320, which may be a wired port or a wireless port, such as an infrared port (e.g. IrDA) or a radio frequency port (e.g. Bluetooth), and a synchronization operation is performed in the manner described above with a first client database. Similarly, a second PID 850B establishes a second connection 802B to client device 320 and a synchronization operation is performed in the manner described above with a second client database.

Figure 17:
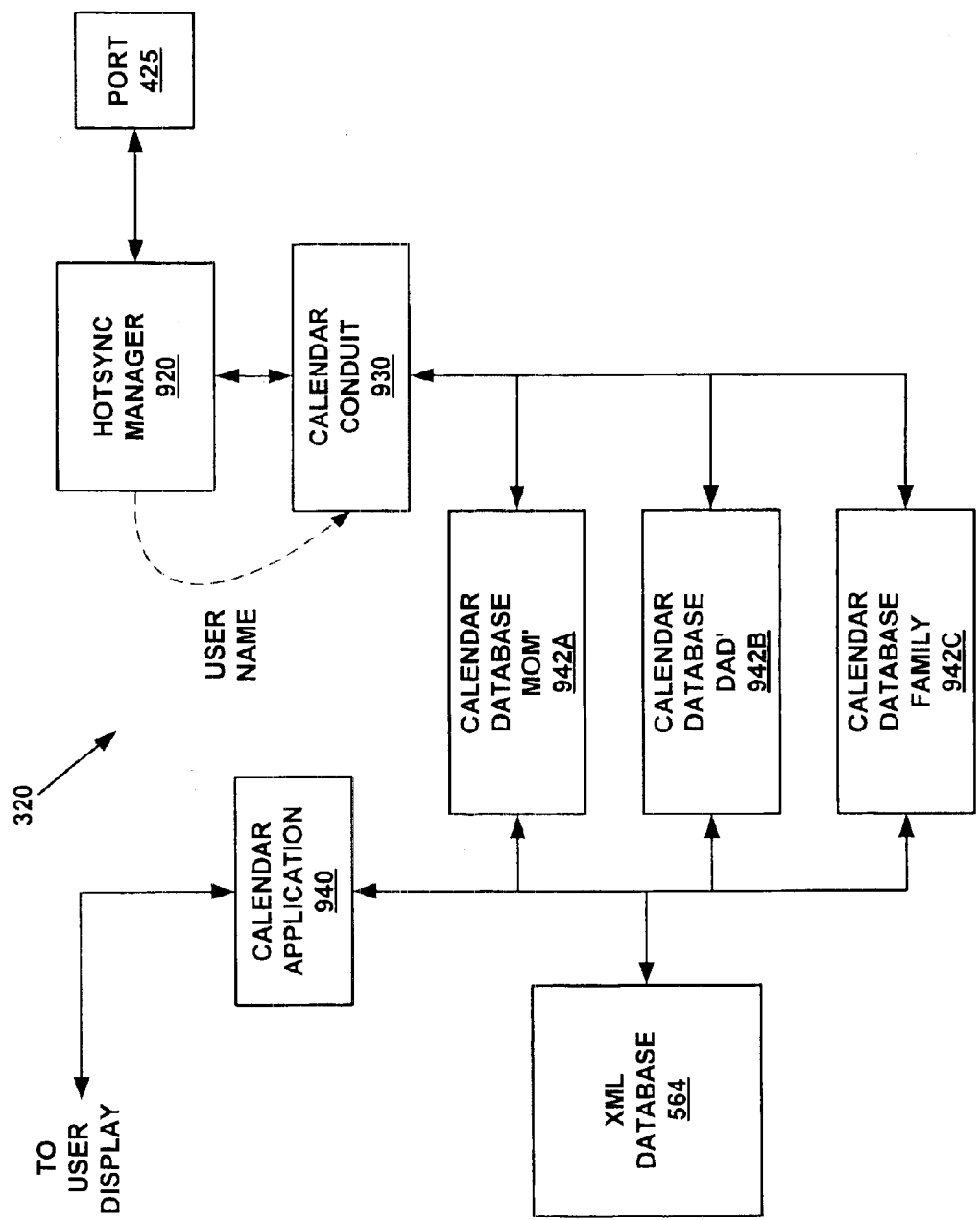
FIG. 17 is a functional block diagram illustrating an embodiment of a software architecture for synchronizing and displaying data in the client device according to the present invention.

FIG. 17 is a simplified software architecture relating to an example of synchronization of databases of client device 320 with the databases of PID devices 850A and 850B. The client device 320 supports databases for multiple PID devices. In the example of FIG. 17, calendar database MOM' 942A supports a calendar database MOM residing in PID 850A and calendar database DAD' 942A supports a calendar database DAD residing in PID 850B. Each of PID devices 850A and 850B is configured with a user name for the device, e.g. MOM for PID 850A and DAD for PID 850B.

The databases 942A–C may be databases as are currently known and used in Palm organizers and similar devices or may be one of the generic databases that are currently available. An example of a generic database suitable for use in the present invention is the GNU database manager (GDBM). GDBM is a library of database functions that use extendible hashing and works similar to the standard UNIX operating system database management functions. These routines are provided to a programmer needing to create and manipulate a hashed database. The basic use of GDBM is to store key/data pairs in a data file. Each key must be unique and each key is paired with only one data item. The keys cannot be directly accessed in sorted order.

The key/data pairs are stored in a GDBM disk file, called a GDBM database. An application must open a GDBM database to be able manipulate the keys and data contained in the database. GDBM allows an application to have multiple databases open at the same time. When an application opens a GDBM database, it is designated as a reader or a writer. A GDBM database opened by at most one writer at a time. However, many readers may open the database simultaneously. Readers and writers cannot open the GDBM database at the same time.

When a PID device is connected to serial port 425 of client device 320 and a hotsynch operation is initiated, the user name for the PID device is obtained by hotsynch manager 920 and passed to conduit 930. Conduit 930 will use the user name to determine which database in the client device should be synchronized to the connected PID device. Continuing with the example above, if the user name for the connected PID is MOM, then calendar conduit 930 will synchronize database 942A with the calendar database in the attached PID, e.g. PID 850A. Likewise, when PID 850B is connected to serial port 425 and a hotsynch operation is initialized, the user name DAD obtained from the PID directs calendar conduit 930 to synchronize calendar database 942B with the calendar database in the connected PID. Note that while the present example is directed toward synchronization of calendar databases, the same approach may be applied to synchronization of other types of databases, such as address databases.

In FIG. 17, client device 320 also includes a common database 942C for the client device itself. Events may be entered into calendar database 942C and managed by calendar application 940 in much the same way that the calendar application in a PID device operates, e.g. calendar display, alarms, etc. However, calendar application 940 is further configured to provide for entering an event into more than one calendar database in client device 320.

Note that transfer can be also accomplished by dialog box/drop down box, or by drag and drop in a multiple-database side-by-side display. That is, DISPLAY AREA 980 may contain multiple columns, each of a different color—one for each user—and events can be easily transferred by drag and drop from one column to another using a stylus on touch screen 340 of FIG. 18.

Figure 18:
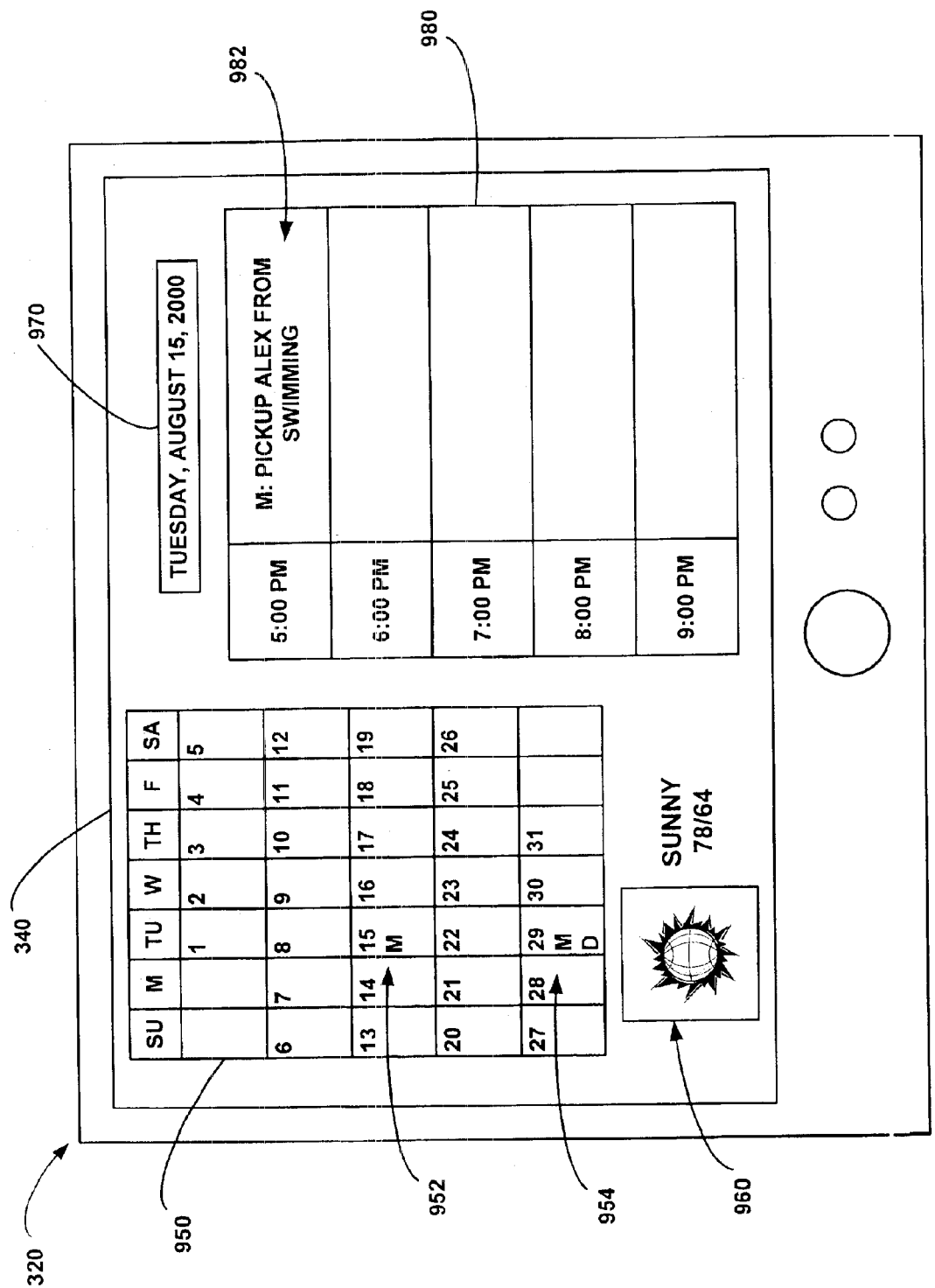
FIG. 18 is a diagram illustrating an embodiment of a graphical user interface for the calendar application of FIG. 17 on the display of the client device according to the present invention.

An event can be designated for entry into any of the calendar databases 942A–C when the event is created or modified using calendar application 940. FIG. 18 is a diagram illustrating an embodiment of a display screen for the calendar application 940. The display screen includes a monthly calendar portion 950 that indicates events residing in client databases 942A–C. In the present invention, events for multiple databases may be indicated by various colored or shaped symbols representing each database.

In the example of FIG. 18, an event exists on Tuesday, Aug. 15, 2000, in the MOM database 942A. A symbol corresponding to database 942A, an "M" in this example, is displayed in box 952, which represents the $15^{th}$ of the month. Similarly, events reside in both databases 942A and 942B on the $29^{th}$ of the month, so two symbols, an "M" and a "D", representing the DAD database 942B, are shown in box 954 representing the $29^{th}$. Note that other types of symbols, such as geometric shapes, symbols of different colors, or combinations thereof, may also be used to indicate the origin of the events being displayed, i.e. the databases for which events are being displayed.

The calendar application user interface of FIG. 18 also includes a weather space 960 for displaying the current days weather conditions. The content for weather space 960 is retrieved by calendar application 940 from XML database 564. This feature of data across multiple applications is discussed in further detail below. A date display box 970 outputs the current date being displayed by the calendar application. An event display space 980 outputs the events for the date shown in display box 970 along with the time for the events. The display space 980, for example, may be scrolled to view other times. For example, a graphical scroll bar (not shown) may be provided, as is known in the art.

In the example of FIG. 18, an event for the 15$^{th}$ was found in calendar database 942A for MOM. A description 982 for the event appears in the corresponding time slot of display area 980. Note that the event in database 942A for the 15$^{th}$ may have originated in the calendar database of PID 850A and been transferred to database 942A from the PID's database through a previous hotsynch operation between PID 850A and client device 320. Further note that other events for a given date, such as events downloaded from channel providers, may be retrieved from XML database 564 and displayed in display area 980.

As noted above, an event may be transferred from among the databases 942A–C and, consequently, transferred into the corresponding PID device database. The event may be assigned to a particular database at the time the event is created in the client device 320 or when an existing entry is modified using the calendar application 940.

Figure 19:
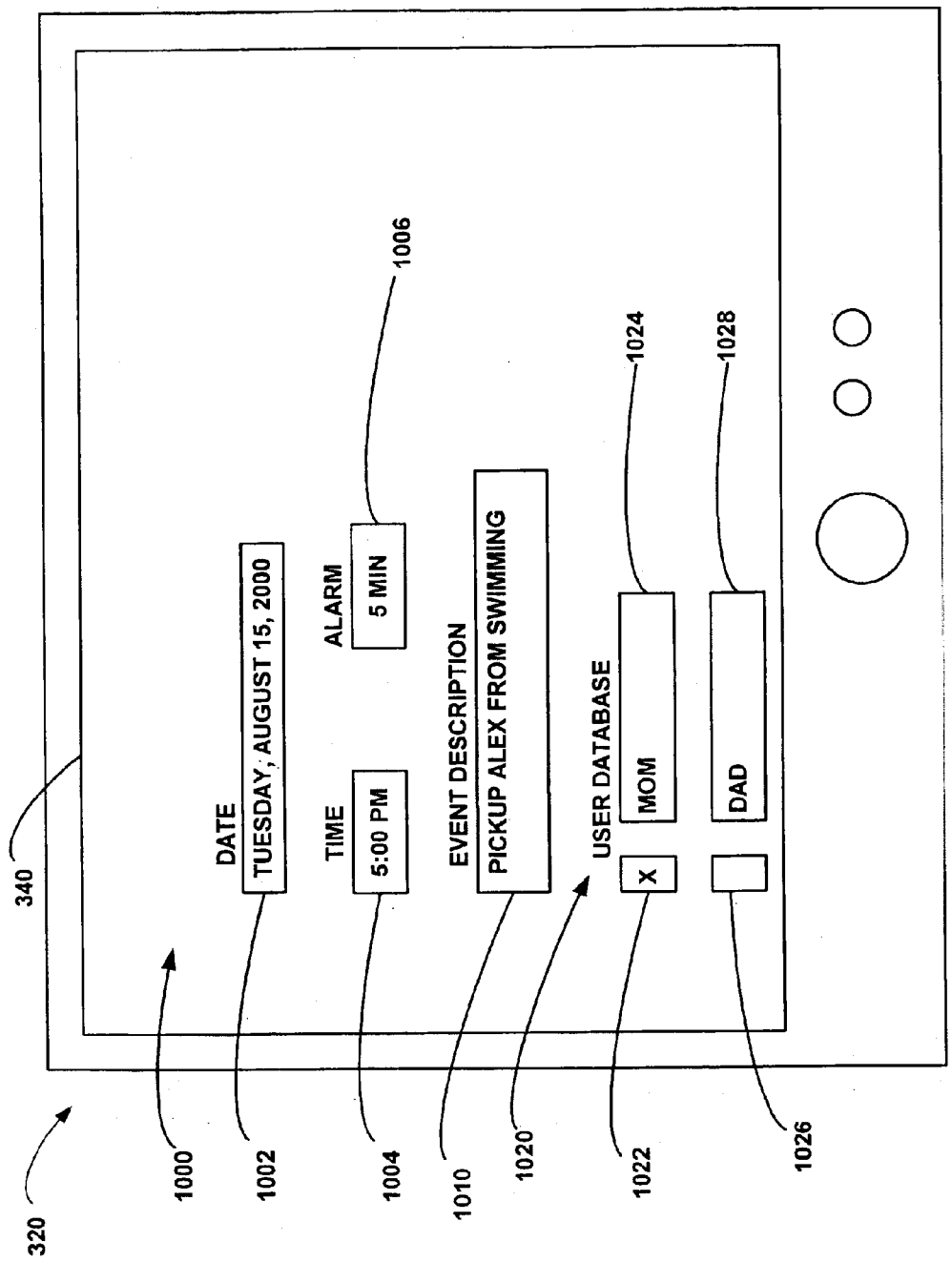
FIG. 19 is a diagram illustrating an embodiment of a graphical user interface for copying an entry using the calendar application of FIG. 17.

FIG. 19 illustrates an embodiment of a data input screen 1000 for modifying the entry 982 shown in FIG. 18. Display screen 1000 includes a date box 1002 indicating the date of the event, a time box 1004 indicating the time, an alarm box 1006 that provides for selection of a warning alarm signaling the event, and a description box 1010 for entering a description of the event. The display screen also includes a user database selection area 1020 having a first activation box 1022 and a first database selection box 1024 for entry of a user name for a database residing on the client device 320. The "X" in database selection box 1024 indicates that the event resides in the database indicated by the user name in box 1024, e.g. MOM database 942A. Also included is a second activation box 1026 and a second database selection box 1028 for entry of a user name for a database residing on the client device 320. The absence of an "X" in database selection box 1026 reflects that the event does not reside in the database indicated by the user name in box 1028, e.g. DAD database 942B. Note that the database selection and activation may take a variety of forms, such as a pull-down menu associated with the box and listing the user names for the available database options.

Alternatively, a "sync to" dialog box may be provided that contains a drop down list of all databases, and an "all" option to copy it to everyone. Or the interface may include a drop down list and, as the user selects a database from the list, it gets added to a list of databases for the event to by synchronized to.

Figure 20:
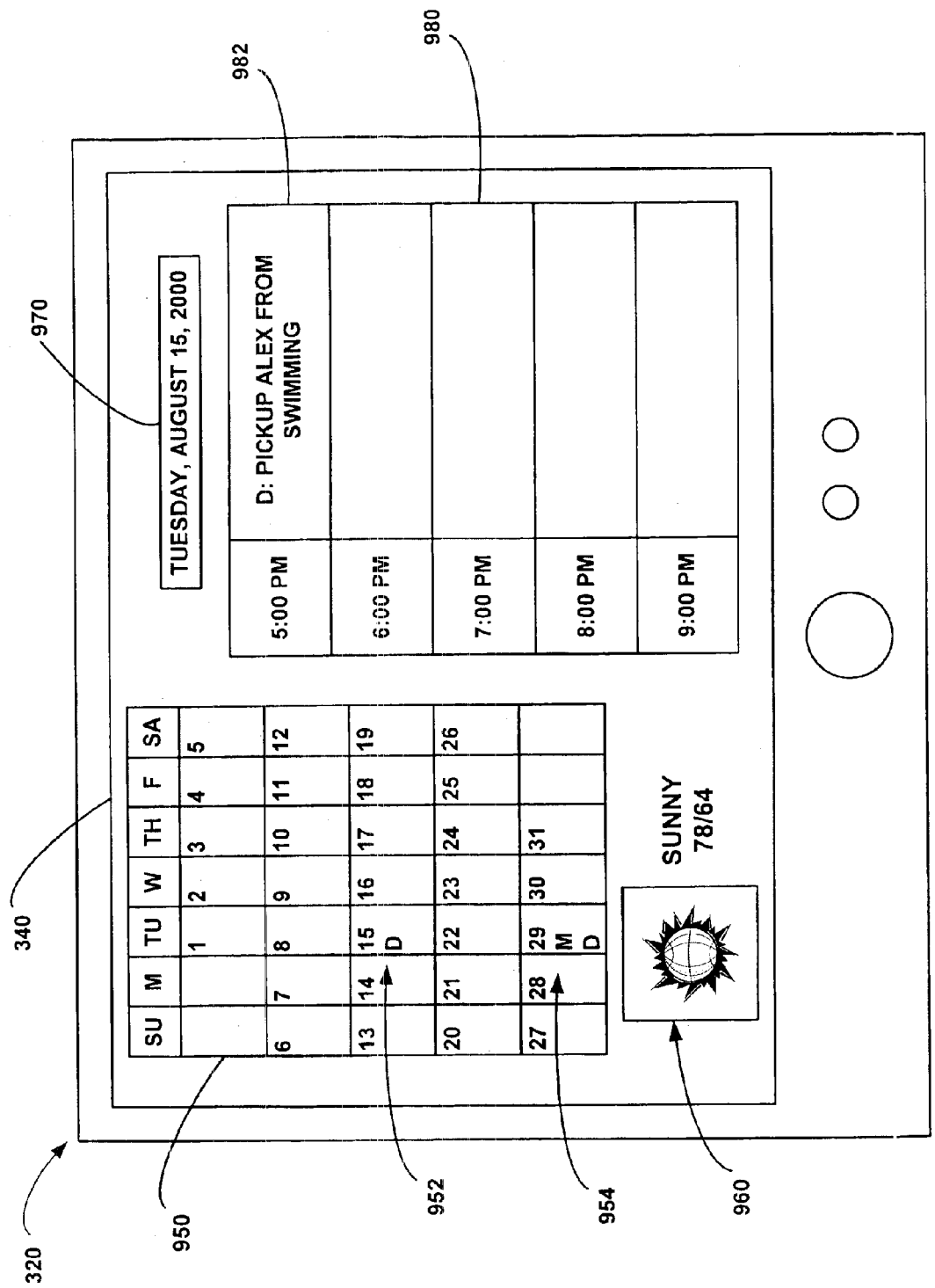
FIG. 20 is a diagram illustrating an embodiment of the graphical user interface for the calendar application of FIG. 17 after the operation of FIG. 19 is performed.

Through a combination of user input signals, such as through a keyboard or a touch-screen, the user can cause the event to be copied or transferred to another database. In the example shown in FIG. 19, the second activation box 1026 may be selected. The first activation box may also be modified to remove the event. Upon completion of the edit session, the activation of box 1026 causes calendar application 940 to insert the event into database 942B. Assuming that the event was removed from database 942A, the event will subsequently be displayed as shown in FIG. 20, where box 952 and the event description 982 both include a "D" symbol to indicate that the event now resides in database 942B.

Figure 21:
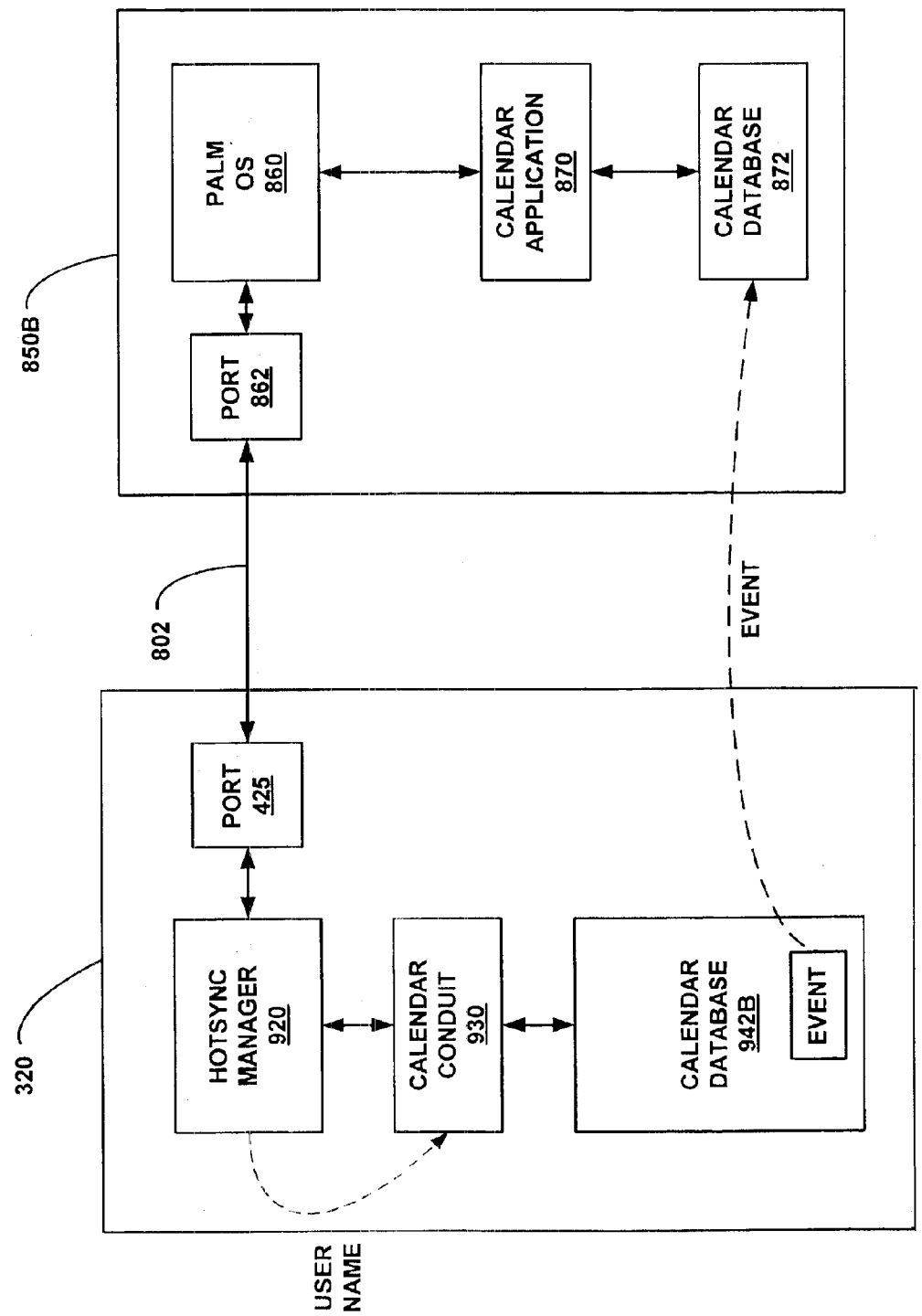
FIG. 21 is a functional block diagram illustrating an embodiment of a software architecture during a subsequent synchronization operation between the client device and a PID device.

At this point, a subsequent synchronization of client device 320 with PID 850B, DAD's PID, will result in the event being transferred into the calendar database of the PID, as illustrated in the example of FIG. 21. Here, the user of PID 850B connects the PID to port 425 of client device 320 and initiates a hotsynch operation. The user name of PID 850B, e.g. DAD, is obtained from PID 850B by hotsynch manager 920, which activates calendar conduit 930 and passes the USER NAME value to the conduit. Conduit 930 maps the USER NAME to calendar database 942B, which contains the event introduced through the actions discussed in connection with FIG. 19, and proceeds to synchronize calendar database 942B of client device 320 with calendar database 872 of PID 850B. Thus, in the course of a routine synchronization of PID 850B with client device 320, calendar application 940 according to the present invention has enabled the transfer of an event from the database for one PID to the database of another PID.

In an alternative preferred embodiment, boxes 1022 and 1026, and boxes 1024 and 1028 are used only during a transfer operation to designate databases that should receive copies of the event. Thus, upon acceptance of the event (or acceptance of event modification), calendar application 940 immediately replicates the event in the designated databases. In this embodiment, the original event and the event copies that were created in the designated database(s) are independent database entries and do not include attributes that provide global information designating which databases contain the event. Similarly, boxes 1022, 1024, 1026 and 1028 may be replaced with a "sync to" field having a drop down box that lists all of the databases on the client device, and also includes an "all" option to designate all of the databases. When a database is selected, it is added to the "sync to" field. When the event modifications are accepted, the event is copied to all the databases designated in the "sync to" field. This mechanism provides for simpler data management that does not require global event tracking across multiple databases.

Figure 22:
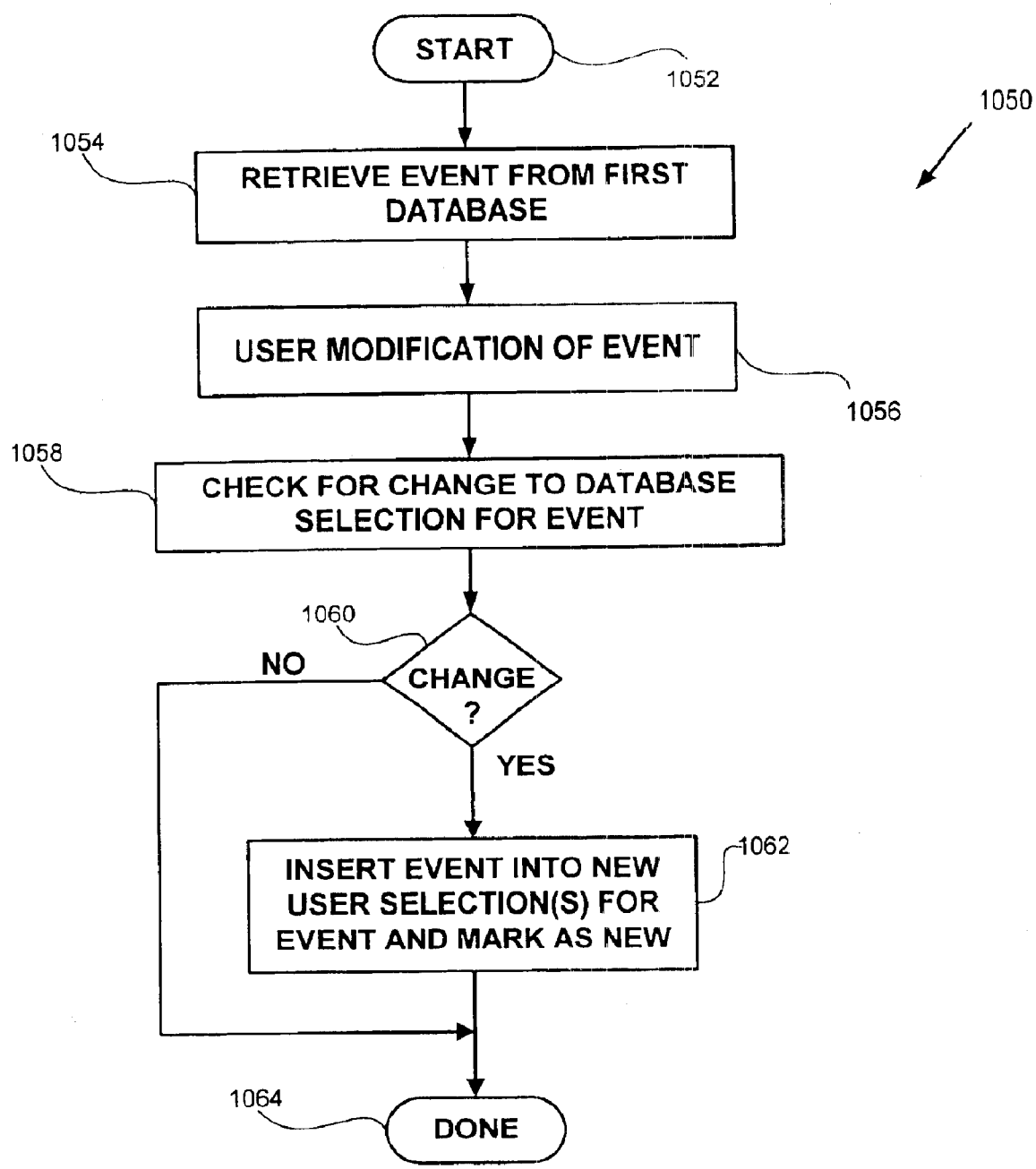
FIG. 22 is a control flow diagram illustrating an embodiment of a process in the calendar application of FIG. 17 for copying an event from one database to another database responsive to the user actions taken with respect to FIG. 19.

FIG. 22 is a control flow diagram illustrating a process 1050 performed by an embodiment of the calendar application 940 to edit an event as described above in the context of FIG. 19. Process 1050 is entered at step 1052 when the user selects an event for editing, though the process may be adapted to also create a new entry using calendar application 940 of client device 320. At step 1054, the event is retrieved from the first database where the event currently resides, e.g. the calendar database 942A. The user modifies the event at 1056, such as the user selection described with respect to FIG. 19 above. At step 1058, the process checks for a change to the database selection for the event, e.g. the selection of activation box 1026 of FIG. 19 to select the DAD database indicated in database selection box 1028. If a change is detected, then control flow branches at step 1060 to step 1062, where the event is inserted into the new user selections, or, if the user selects more than one new database for the event, all the new databases indicated by the user's selection, and the inserted event entry is marked as new. In the alternative embodiment utilizing a "sync to" field, step 1058 checks to see whether there are entries in the "sync to" field.

Figure 23:
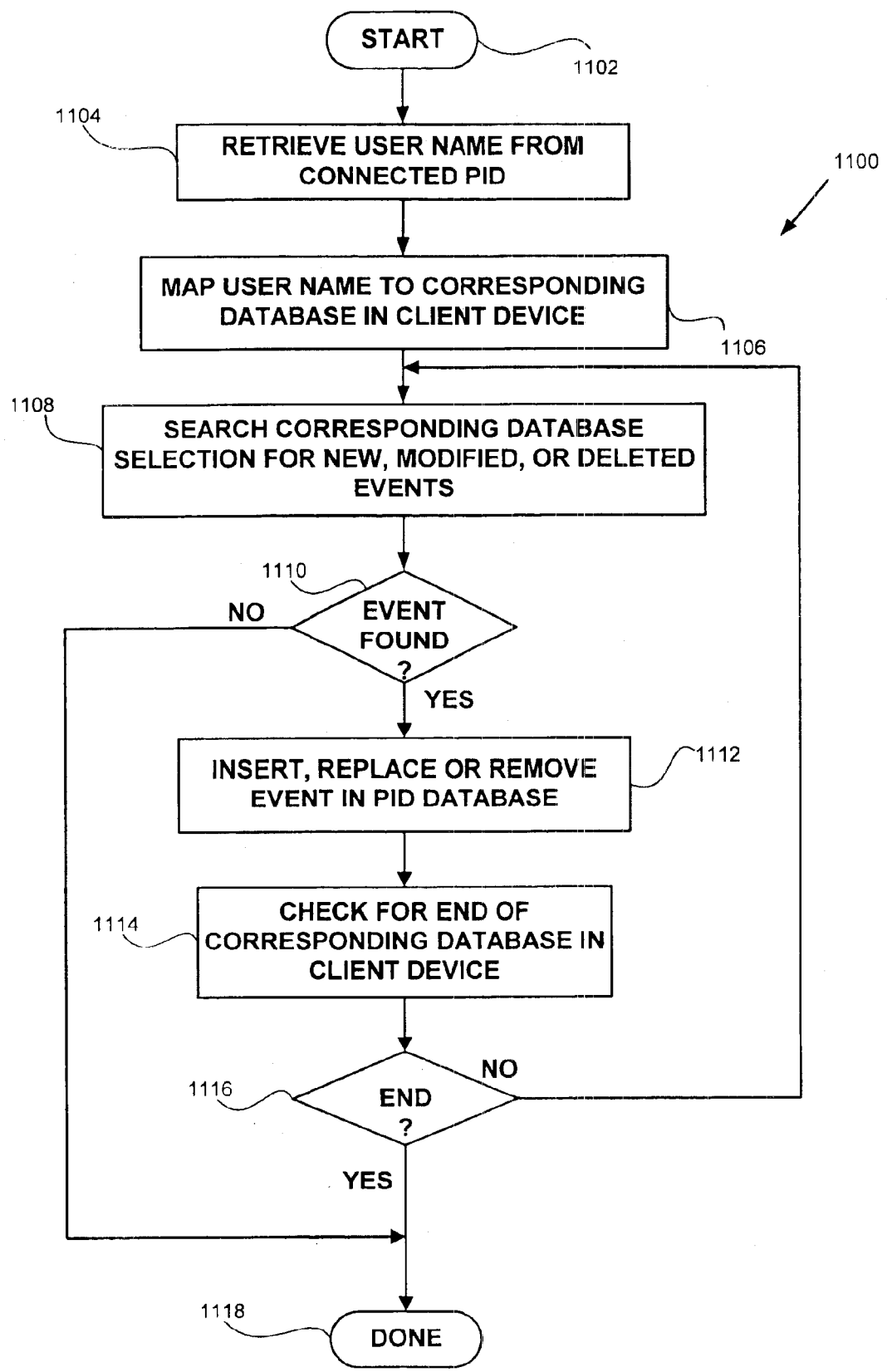
FIG. 23 is a control flow diagram illustrating an embodiment of a synchronization process performed subsequent to the process of FIG. 22.

FIG. 23 is a control flow diagram illustrating an embodiment of a synchronization process 1100 performed in client device 320 by hotsynch manager 920 in combination with calendar conduit 930. Process 1100 is entered at step 1102 when the hotsynch signal is received in client device 320. At step 1104, the user name, e.g. DAD, for the attached PID device is retrieved and, at step 1106, the user name is mapped to the corresponding database in client device 1106, e.g. calendar database 942B. At step 1108, the corresponding database is searched for new, modified, or deleted events.

If a new, modified, or deleted event is found, then, at step 1110, control flow branches to step 1112, where the event is inserted, replaced, or removed, respectively, in the calendar database of the attached PID. The end of the database is then checked, at step 1114. If the end of the database has not been reached, then control flow branches at step 1116 back to step 1108 to search for another new, modified, or deleted event. Otherwise, control flow branches at either step 1110 or step 1116 to step 1118, where the hotsynch process completes.

Figure 24:
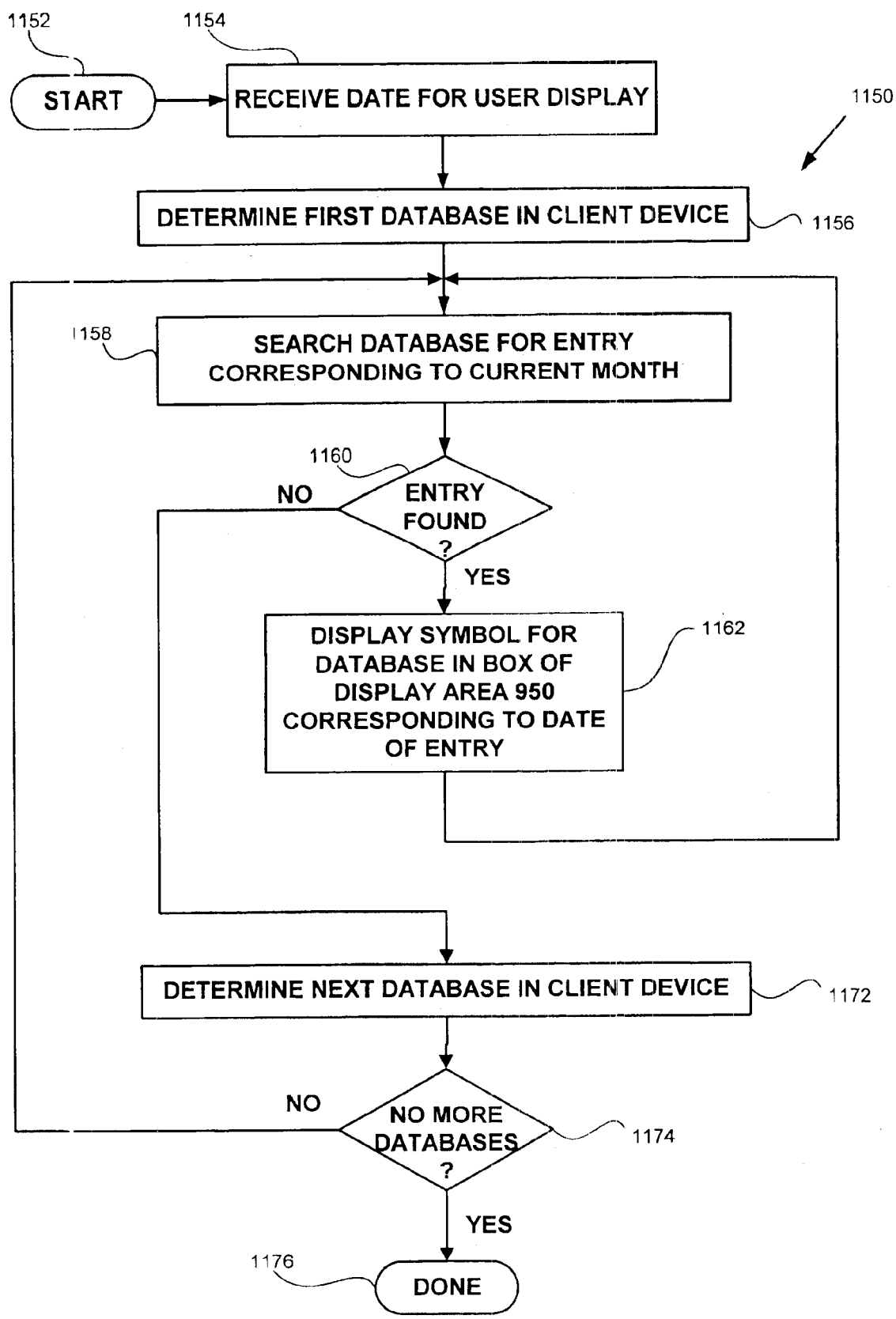
FIG. 24 is a control flow diagram illustrating an embodiment of a display process in the calendar application of FIG. 17 for displaying events from multiple calendar databases.

As touched upon briefly above with respect to FIG. 18, another feature of calendar application 940, according to the present invention, is that it may be configured to display data from multiple databases. FIG. 24 is a control flow diagram illustrating an embodiment of a display process 1150 according to the present invention. Process 1150 may be entered at step 1152 when calendar application is activated by the user or when the user selects a new data for the current display, e.g. by changing the date value in space 970 shown in FIG. 18. The date currently displayed in space 970 is received at step 1154 for use in later processing. At step 1156, a first database residing in client device 320 is determined; e.g. through a list or table containing entries for the databases and perhaps combined with a table for mapping usernames to databases as discussed above. When the first database is determined, e.g. calendar database 942A, processing proceeds, at step 1158, to search this database for an entry corresponding to the current month, as determined from the date value obtained in step 1154. If an entry is found, then control flow branches, at step 1160, to step 1162, where a symbol representing the database currently being searched is displayed in a box in month within display area 950 corresponding to a date of the entry. For example, the event shown in slot 982 of FIG. 18 is found in calendar database 942A with a date value of August 15 and an "M" is displayed in box 952 corresponding to the 15$^{th}$ of the month. Control flow then returns to step 1158 for further searching of the database. Thus, if another event is encountered, it will also be displayed, e.g. resulting in the M displayed in box 954 of FIG. 18.

Note that many other embodiments of the process of FIG. 24 are possible. For example, a single database may be maintained containing the data for the multiple PID devices where each entry includes an identifier for the PID database to which the entry corresponds. In this case, step 1156 could be eliminated and the process would proceed to search at step 1158 for entries relating to the current month, though the search may proceed on the basis of the current day or week, etc., depending upon the scope of the data being displayed, e.g. if a weekly calendar is displayed in area 950 of FIG. 20, then the current weeks events may be displayed. The symbol displayed at step 1162 would correspond to the identifier value for the PID database.

If the end of the first database is reached without encountering an entry corresponding to the date, then control flow proceeds to step 1172, where the next database to be searched is determined, e.g. calendar database 942B. If all the calendar databases in the client device 320 have been processed, then control flow branches at step 1174 to step 1176 where the process completes. Otherwise, control flow branches at step 1174 back to step 1158 for processing of the next database. Thus, for example, processing of calendar database 942B proceeds resulting in the D displayed in box 954.

As one of ordinary skill in the art will readily appreciate, the display area 980 may be generated in a number of alternative ways. For example, the process of FIG. 24 may be adapted at step 1158 to search for a database entry or entries having the current displayed date and displaying the entry using a corresponding symbol in a portion of display area 980 corresponding to the time of the database entry. As still another example, display area 980 may include a column for each database stored in the client device and the content of the database entry may be displayed in the column corresponding to the database and in the time slot for the entry. Yet another approach may involve displaying symbols in display area 950 for entries in the various databases and displaying the content of a selected database entry in display area 980, e.g. a symbol in display area 950 may be selected, such as through a stylus or mouse pointing to the symbol, and the content of the entry automatically displayed in display area 980. The format of display area 980 may also be varied. For example, instead of displaying events in timeslots, all events for the current day may be displayed or summarized in display area 980 along with a symbol or similar indication of the database from which the entry was obtained.

Figure 25:
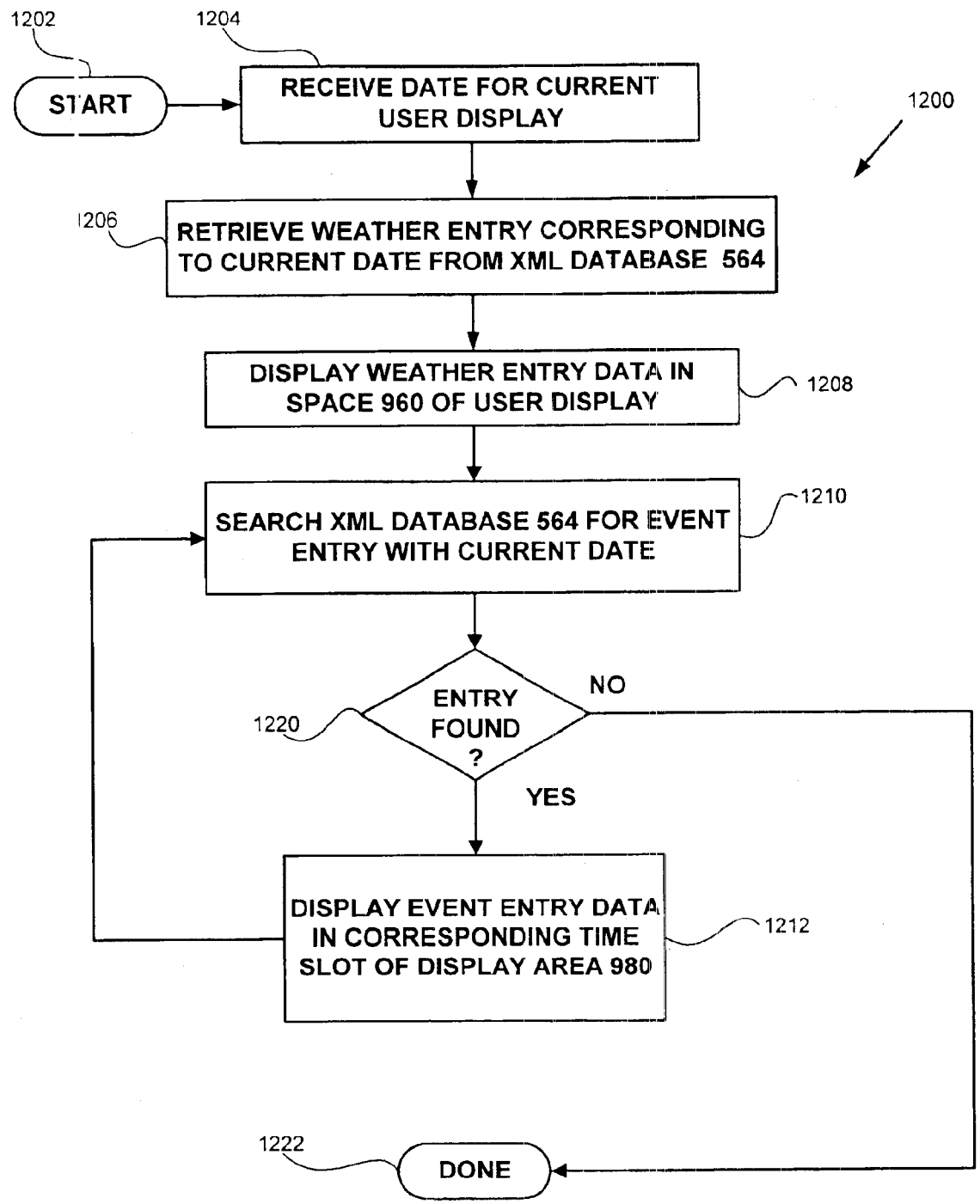
FIG. 25 is a control flow diagram illustrating an embodiment of an application knitting process in the calendar application of FIG. 17 for displaying data from the XML database of FIG. 11 on the graphical user interface of FIG. 18.

As was also noted briefly above with respect to FIG. 18, the present invention may also be adapted to display data stored in XML database 564 of FIG. 11 as a result of the execution of other applications, such as the weather channel data discussed above with respect to channel selection application 402. This sharing of data between applications may be viewed as "application knitting". FIG. 25 is a control flow diagram of a process 1200 for displaying shared data from XML database 564 through calendar application 940. Similar to process 1150 of FIG. 24, process 1200 is entered upon activation by the user of calendar application 940 or user selection of a new date value in space 970 of FIG. 18. The date value currently displayed in space 970 is received at step 1204 and used at step 1206 to retrieve the weather entry corresponding to the date value from XML database 564. For example, if the date displayed in space 970 is the current date, then the weather data found in XML database 564 at the directory location Content/Weather/Primary/Day1.1/Conditions. See the discussion above related to Table 3. Using the weather.dtd, the calendar application 940, in this embodiment, may be adapted to use the wxcode value to obtain the icon for display in space 960 of FIG. 18. Also, the "SUNNY" text from conditions is displayed along with high and low temperature values stored for Day1.1 in XML database 564.

If the date displayed in space 970 is not the current date, e.g. not today's date, then calendar application 940 must compute the relationship of the displayed date to the current date and determine if it relates to one of the next five days, e.g. Day2, Day3, Day4, or Day5, for which data may exist in XML database 564. If it does relate to one of the next five days, then the weather data for the displayed date is obtained from XML database 564. For example, if the displayed date relates to two days from the current date, then the forecasted weather data for that date is retrieved from Content/Weather/Primary/Day2/Conditions. At step 1208, the weather data corresponding to the displayed date is output in space 960.

The calendar application 940 may also be adapted to display dated events, such as sales or sports events, that may reside in XML database 564. The calendar application does not need to use the channel browser application 402 to render its display screens. The operating system 510 is provided with a set of graphical user interface (GUI) objects that are used by the calendar application. The data for the calendar application, however, may be stored in XML database 564 according to the Calendar.dtd specification of Table 9 below. Calendar entries may be downloaded in XML data documents from a remote server during the update process described above. By conforming to a common DTD file, the remote server providing content in the form of XML data documents may place dated events into XML database 564 that may be subsequently referenced by calendar application 940 in client device 320. Table 9 below illustrates an example of the DTD file, Calendar.dtd, that describes a format for use in downloading dated event data.

TABLE 9

Calendar.dtd

```
<!--
    Import the common Kojak element/attribute/entity definitions.
-->
<!ENTITY % KojakTypesDTD SYSTEM "KojakTypes.dtd">
%KojakTypesDTD;
<!-- StartTime and EndTime use the same format as %TimeEnt; -->
<!ELEMENT TimeEntry  EMPTY>
<!ATTLIST TimeEntry
    %DateEnt;
    StartTime    CDATA     #IMPLIED
    EndTime      CDATA     #IMPLIED
>
<!--
    Format for Days attribute is:
        For RepeatType of Weekly: "Sun,Mon,Tue,Wed,Thu,Fri,Sat"
where only the days that are enabled are present.
        For RepeatType of MonthlyByDay: "1"–"31".
    If EndDate = "–1" then the event repeats forever.
    Format for EndDate is the same as %DateEnt;
-->
<!ELEMENT Repeat (#PCDATA)> <!-- Interval -->
<!ATTLIST Repeat
    RepeatType (
        None      |
        Daily     |
        Weekly    |
        MonthlyByDay  |
        MonthlyByDate |
        Yearly    |
    ) #REQUIRED
    EndDate    CDATA    #IMPLIED
    Days       CDATA    #IMPLIED
>
<!--
    _ID for Exception should be of the form Exception1 . . . ExceptionN
    PCDATA for Exception has the same format as %DateEnt;
-->
<!ELEMENT Exception     (#PCDATA)>
<!ATTLIST Exception
    _ID     CDATA     #REQUIRED
>
<!-- Definition of an alarm for the Calendar -->
<!ELEMENT Alarm (#PCDATA)>
<!ATTLIST Alarm
    Units (
        Minutes|
        Hours |
        Days
    ) #REQUIRED
>
<!ELEMENT Description (#PCDATA)>
<!--
    Definition of a Calendar Entry.
    The ID attribute is the unique identifier for the entry.
-->
<!ELEMENT CalendarEntry (
    DBKey,
    DBName,
    RecordId,
        RecordIndex,
        RecordAttributes,
    TimeEntry,
    Description?,
    Repeat?,
        Exception*,
    Alarm?,
    Note?
)>
```

TABLE 9-continued

Calendar.dtd

```
<!ATTLIST CalendarEntry
    _ID        CDATA     #REQUIRED
    _Version CDATA     #FIXED "0.3"
    %TimeStampEnt;
>
<!-- Definition of a Calendar -->
<!ELEMENT Calendar (CalendarEntry*)>
```

At step 1210, XML database 564 is searched for an event entry having the same date as the currently displayed date. For example, the DateEnt attribute of the TimeEntry element, described in Calendar.dtd, for each entry may be compared against the date value for the date currently displayed in box 970 of FIG. 18. If an entry with a matching date is found, then control flow branches at step 1220 to step 1212, where the event entry is displayed in a time slot of display area 980 corresponding to the time of the entry derived from the StartTime and Endtime attributes of the TimeEntry element. The event may also be represented by a symbol in the box in display area 950 corresponding to the date of the event. Control flow then returns to step 1210 to search XML database 564 for another event for the date.

If the end of XML database 564 is encountered during the search at step 1210 without finding an entry, then control flow branches at step 1220 to step 1222 and process 1200 completes.

Figure 26:
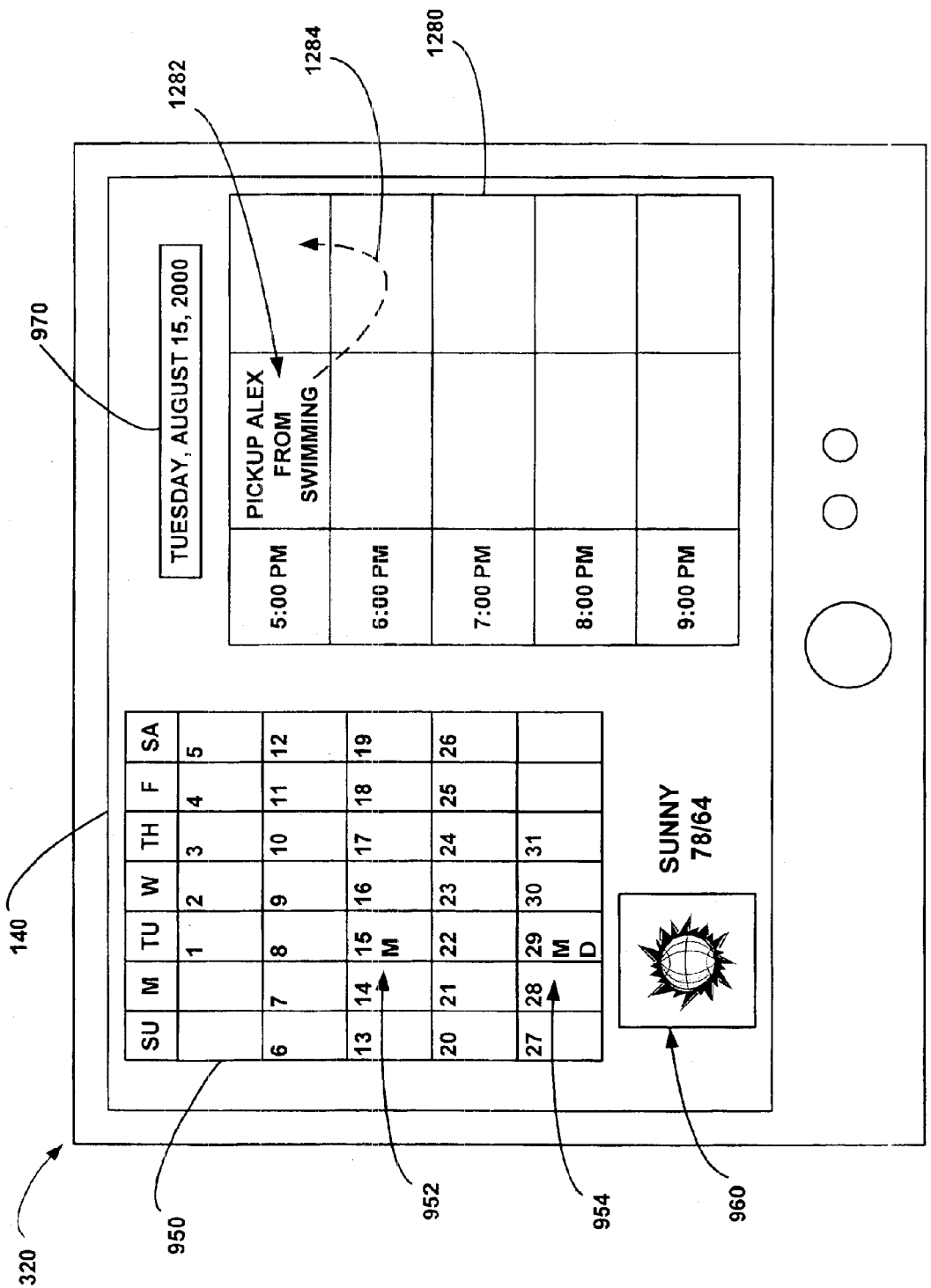
FIG. 26 is a diagram illustrating another embodiment of a graphical user interface of calendar application 940 of FIG. 17, where the user interface has different columns for different databases and a user may drag and drop an event from one database to another.

In an alternative to the approach taken to a graphical interface for calendar application 940 shown in FIGS. 18–20, a multiple column approach may be taken that allows events to be dragged and dropped from one database to another. FIG. 26 illustrates an embodiment of a multicolumn graphical user interface, wherein events from a first database, e.g. calendar database 942A, are displayed in a first column in display space 1280 and events from a second database, e.g. calendar database 942B, are displayed in a second column of display space 1280. An event 1282 from the first database is shown in a 5:00 p.m. timeslot of the first column. Using a stylus or cursor, the user may drag and drop event 1282 from the first column to the second column, as indicated by arrow 1284. An embodiment of calendar application 940 may be adapted to respond to the user's action by copying the data corresponding to event 1282 into calendar database 942B, i.e. the database corresponding to the second column of display area 1280. The event will be copied into a PID in a subsequent synchronization operation in the manner described above with respect to FIG. 20.

Note that a similar approach may be taken to copying events between other types of databases. For example, the approach discussed above may be adapted to copy an address object from a first PID address database in the client device to a second PID address database in the client device, thereby leading to the insertion of the copied address object into the address of a PID corresponding to the second PID address database during a subsequent hotsynch operation.

Also note that the address categories for the PID address databases my include, for example, phone numbers, addresses, email addresses, websites, and snapshots (digital images). By the user selecting, e.g. clicking, on a particular category, the name from the address is displayed along with the corresponding phone, email, website, or snapshot information corresponding to the selected category. The address databases may also feature different formats for different types of information. For example, a format for "contacts" may show the name, phone number, address and email information from a database entry. A "web page favorites" format may show a list of a user's favorite links to the web or a list of most often or most recently selected links to the web. Selecting a link launches the HTML browser 570 with a URL for the link to access the web page for the link. A "clips" format may show a list of digital images or video clips that may be similarly selected and displayed through a video application. Other possible format examples include audio or email messages.

The present invention provides a shared user interface for multiple applications in a client device. The present invention also provides for data to be readily shared among multiple applications.

In view of the wide variety of embodiments to which the principles of the invention can be applied, it should be understood that the illustrated embodiment is exemplary only, and should not be taken as limiting the scope of the present invention. For example, one of ordinary skill in the art will readily appreciate that various elements of the present invention can be practiced with software, hardware, or a combination thereof.

The claims should not be read as limited to the described order or elements unless stated to that effect. Therefore, all embodiments that come within the scope and spirit of the following are claimed as the invention.

We claim:

1. A software architecture for a client device, the architecture comprising:
 a data store for storing a predefined data structure having a first data object and a predefined first template having a first identifier value and a first field, where the first field of the first template is tagged as corresponding to the first data object of the data structure;
 a first application process configured to output information to a user of the client device in a format defined by the first template, where the first application process, responsive to a user command, is configured to format and send a template population request message that includes an identifier field having the first identifier value for the first template, and is further configured to render the first template, when populated with data, for display to a user of the client device;
 a server process within the client device, the server process being configured to receive the template population request message from an application and, responsive thereto, use the value from the template identifier value from the template population request message to retrieve a corresponding template from the data store, use the tag from the first field of the corresponding template to retrieve a value from a corresponding data object of the data structure corresponding to the tag value from the corresponding template, and return the corresponding template populated with the value from the data object to the application that sent the template population request message.

2. The architecture of claim 1, where:
 the data store includes a predefined second template having a second identifier value and a first field, where the first field of the second template is tagged as corresponding to the first data object of the data structure;
 the architecture further includes a second application process configured to output information to the user of the client device in a format defined by the second template, where the second application process, responsive to a user command, is configured to format and send the template population request message having the second identifier value for the second template in the identifier field of the message, and is further configured to render the first template, when populated with data, for display to the user of the client device.

3. The architecture of claim 2, where:
 the data structure further comprises an XML data structure; and
 the server process is configured to obtain data from the XML data structure in the data store using a Server Side Include (SSI) command.

4. The architecture of claim 2, where an automatic update process for communicating with a remote server is further configured to automatically download and store the data value in the first data object of the data structure in the data store at a predetermined periodic time interval.

5. The architecture of claim 4, where the periodic time intervals include times of low use by the user of the client device.

6. The architecture of claim 4, where the periodic time intervals includes times of low use by the user of the communication link.

7. The architecture of claim 4, where:
 the data structure further comprises an XML data structure;
 the server process is configured to obtain data from the XML data structure in the data store using a Server Side Include (SSI) command; and
 the automatic update process is configured to receive an XML data document containing the value for the first data object, which the automatic update process is configured to parse the value for the first data object from the XML data document and insert the value for the first data object into the data structure.

8. The architecture of claim 2, where a remote server defines the data value in the first data object of the data structure in the data store according to a first predetermined data type definition and the first application process accesses the first data object of the data structure in the data store according to the first predetermined data type definition.

* * * * *